(12) United States Patent
Itoga

(10) Patent No.: US 8,813,148 B2
(45) Date of Patent: Aug. 19, 2014

(54) DATA SUPPLY DEVICE, DATA OUTPUT DEVICE, DATA OUTPUT SYSTEM, DATA DISPLAY SYSTEM, DATA SUPPLY METHOD, DATA OUTPUT METHOD, AND PROGRAM

(75) Inventor: Toshiyuki Itoga, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 592 days.

(21) Appl. No.: 12/680,057

(22) PCT Filed: Sep. 30, 2008

(86) PCT No.: PCT/JP2008/067760
§ 371 (c)(1),
(2), (4) Date: Mar. 25, 2010

(87) PCT Pub. No.: WO2009/044743
PCT Pub. Date: Apr. 9, 2009

(65) Prior Publication Data
US 2010/0263016 A1    Oct. 14, 2010

(30) Foreign Application Priority Data

Oct. 2, 2007  (JP) ................ 2007-259172
Oct. 2, 2007  (JP) ................ 2007-259173
Oct. 2, 2007  (JP) ................ 2007-259174

(51) Int. Cl.
*H04N 7/173*       (2011.01)
*H04N 21/438*      (2011.01)
*H04N 5/46*        (2006.01)
*H04N 21/4143*     (2011.01)
*H04N 21/462*      (2011.01)
*H04N 21/4786*     (2011.01)
*H04N 21/431*      (2011.01)
*H04N 21/41*       (2011.01)
*H04N 21/4782*     (2011.01)
*H04N 21/426*      (2011.01)
*H04N 7/16*        (2011.01)

(52) U.S. Cl.
CPC ............. *H04N 5/46* (2013.01); *H04N 21/4383* (2013.01); *H04N 21/4143* (2013.01); *H04N 21/4622* (2013.01); *H04N 21/4786* (2013.01); *H04N 21/4316* (2013.01); *H04N 21/4113* (2013.01); *H04N 21/4782* (2013.01); *H04N 21/4263* (2013.01); *H04N 7/163* (2013.01); *Y10S 707/99952* (2013.01)
USPC ............... 725/109; 725/78; 725/80; 725/110; 725/112; 725/113; 725/133; 725/141; 707/999.201

(58) Field of Classification Search
USPC ..................... 725/78, 80, 133, 141, 109–113; 707/999.201
See application file for complete search history.

(56) References Cited

U.S. PATENT DOCUMENTS

| | | | |
|---|---|---|---|
| 2002/0059641 A1 | 5/2002 | Tsujimura et al. | |
| 2003/0121042 A1 * | 6/2003 | Franken et al. | 725/51 |
| 2003/0131355 A1 * | 7/2003 | Berenson et al. | 725/46 |
| 2007/0067808 A1 * | 3/2007 | DaCosta | 725/62 |
| 2007/0203955 A1 * | 8/2007 | Pomerantz | 707/201 |
| 2007/0266322 A1 * | 11/2007 | Tretter et al. | 715/716 |
| 2008/0229207 A1 | 9/2008 | Kataoka | |

FOREIGN PATENT DOCUMENTS

| | | |
|---|---|---|
| CN | 1353537 A | 6/2002 |
| JP | 2003-219308 A | 7/2003 |
| JP | 2003-219392 A | 7/2003 |
| JP | 2003-274301 A | 9/2003 |
| JP | 2004-48132 A | 2/2004 |
| JP | 2005-244807 A | 9/2005 |
| JP | 2006-67198 A | 3/2006 |
| JP | 2006/062161 A1 | 6/2006 |

* cited by examiner

*Primary Examiner* — Joshua Taylor
(74) *Attorney, Agent, or Firm* — Birch, Stewart, Kolasch & Birch, LLP

(57) ABSTRACT

A PC (11) of the present invention comprises a one-segment broadcast tuner (16), a display output I/F (18) for transmitting, to a TV (21), data of a broadcast program received by the one-segment broadcast tuner (16), and a PC-side relay coordination control section (14) for transmitting a channel code for (i) causing the TV (21) to receive, via a digital tuner (26) or an analog tuner (27), a broadcast program containing same content as the broadcast program being received by the one-segment broadcast tuner (16), and (ii) causing the TV (21) to output data of the broadcast program. Therefore, in a case where an output of the TV (21) is switched from the broadcast program being received by the one-segment broadcast tuner (16) to the broadcast program being received by the digital tuner (26) or the analog tuner (27), a user of the PC (11) can continuously watch a broadcast program containing same content as before the output switching. This makes it possible to continuously watch, after an output switching, a broadcast program containing same content as before the output switching.

15 Claims, 37 Drawing Sheets

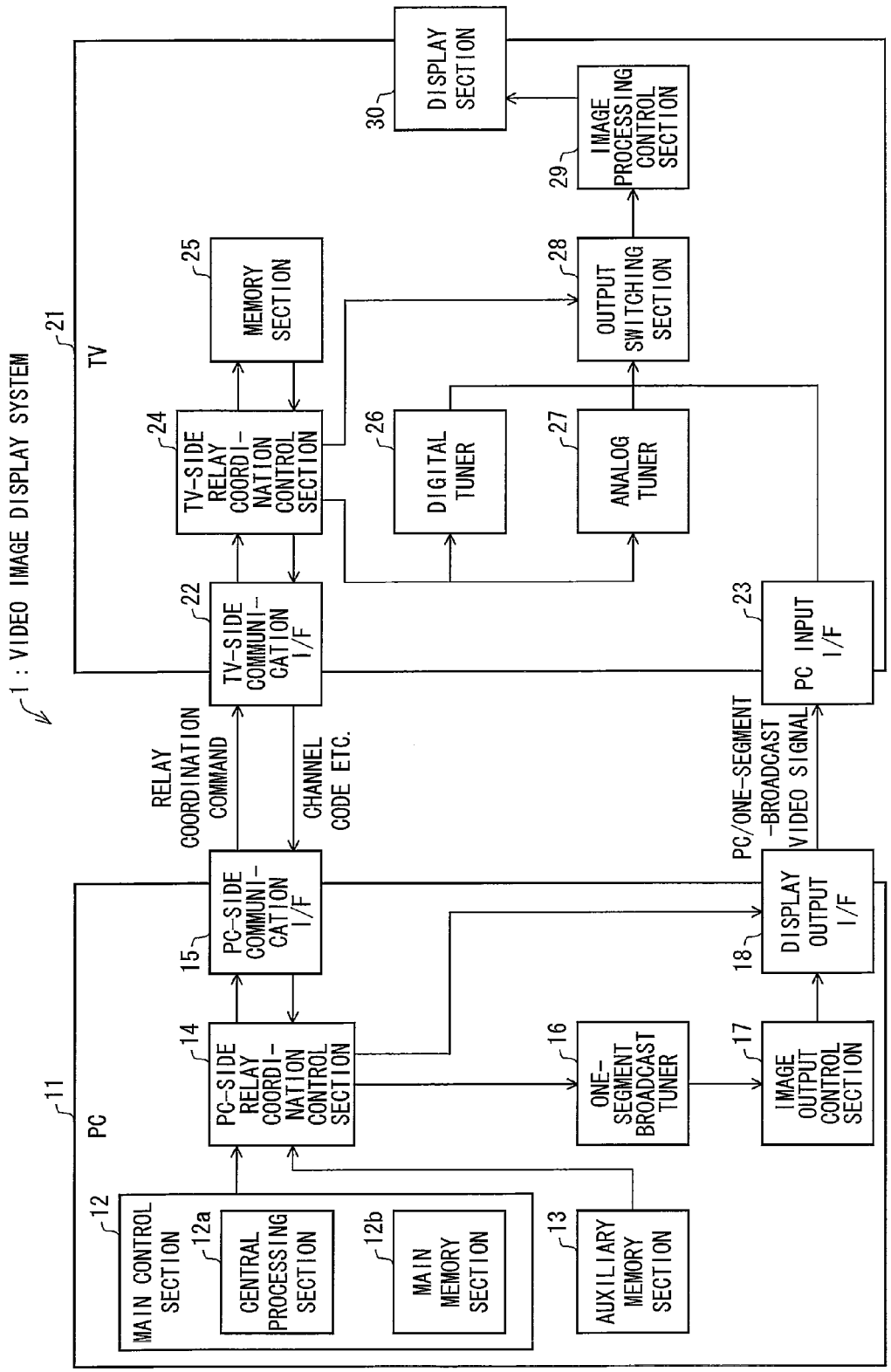

F I G. 3
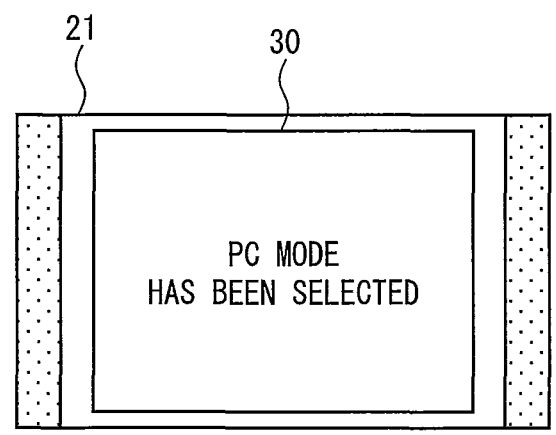

FIG. 12 (a)
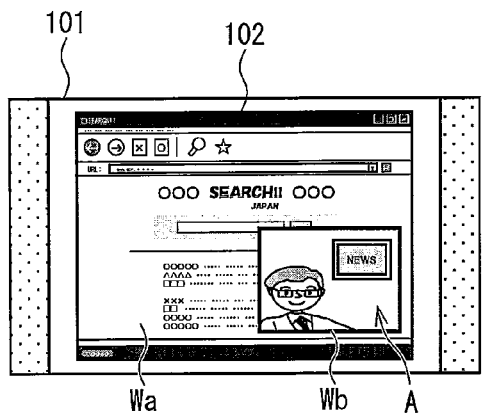
FIG. 12 (b)
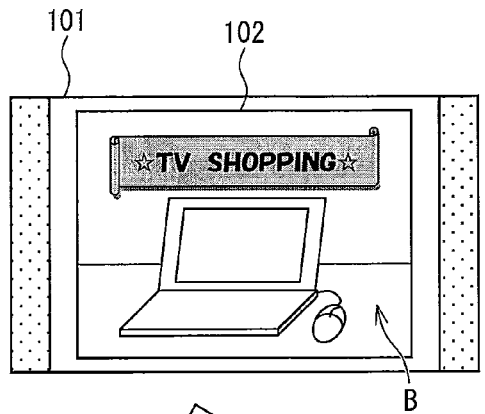
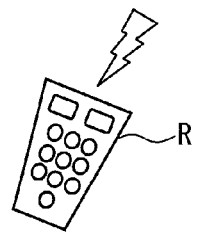
FIG. 12 (c)
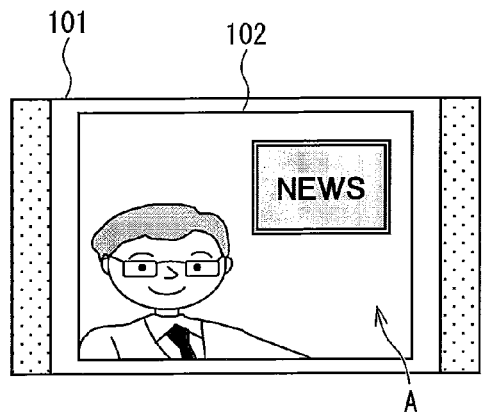

F I G. 1 6
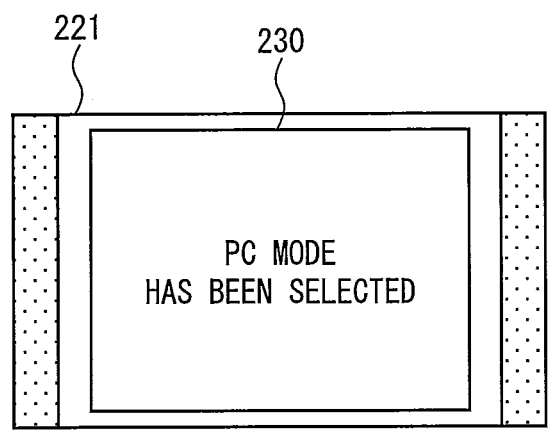

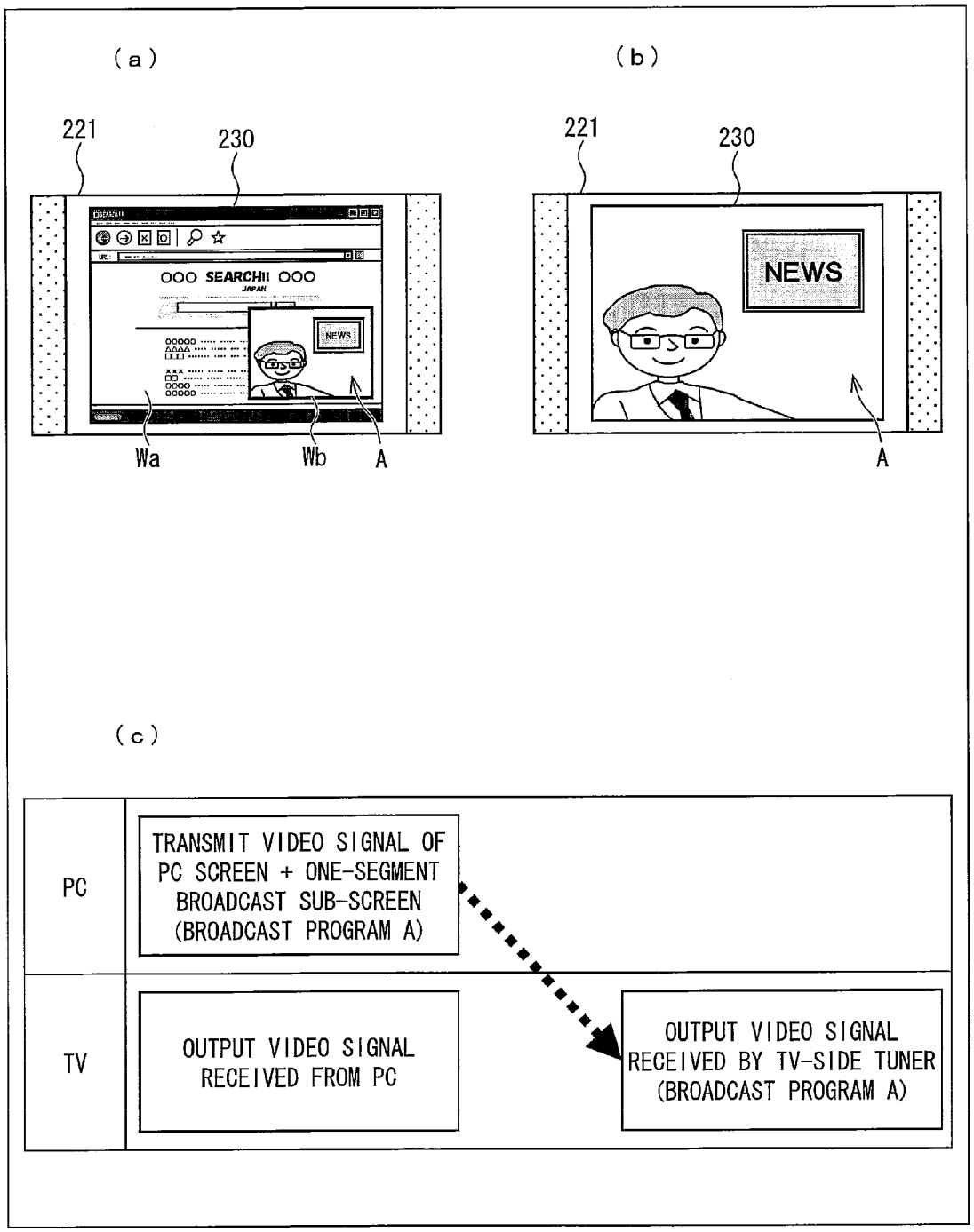

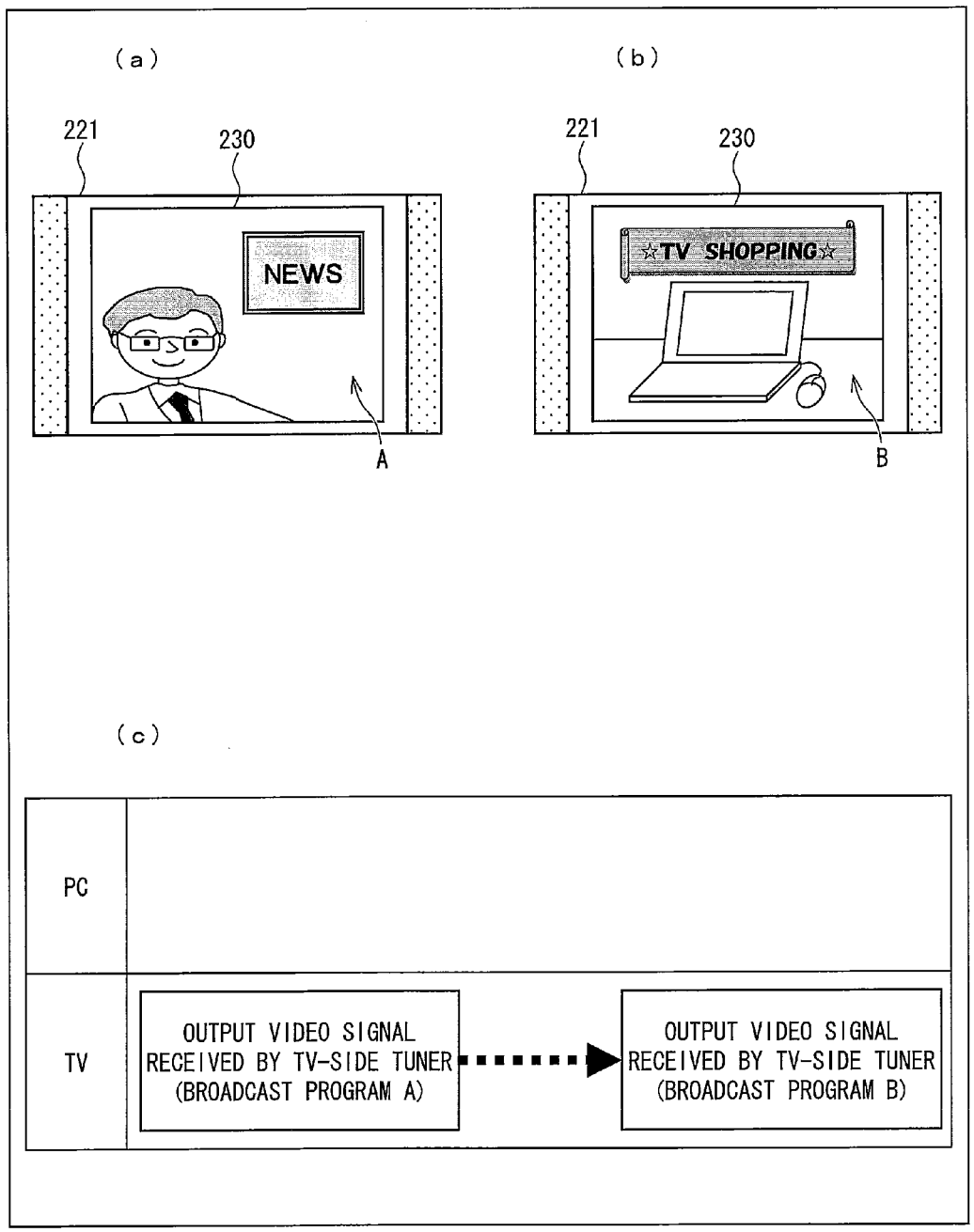

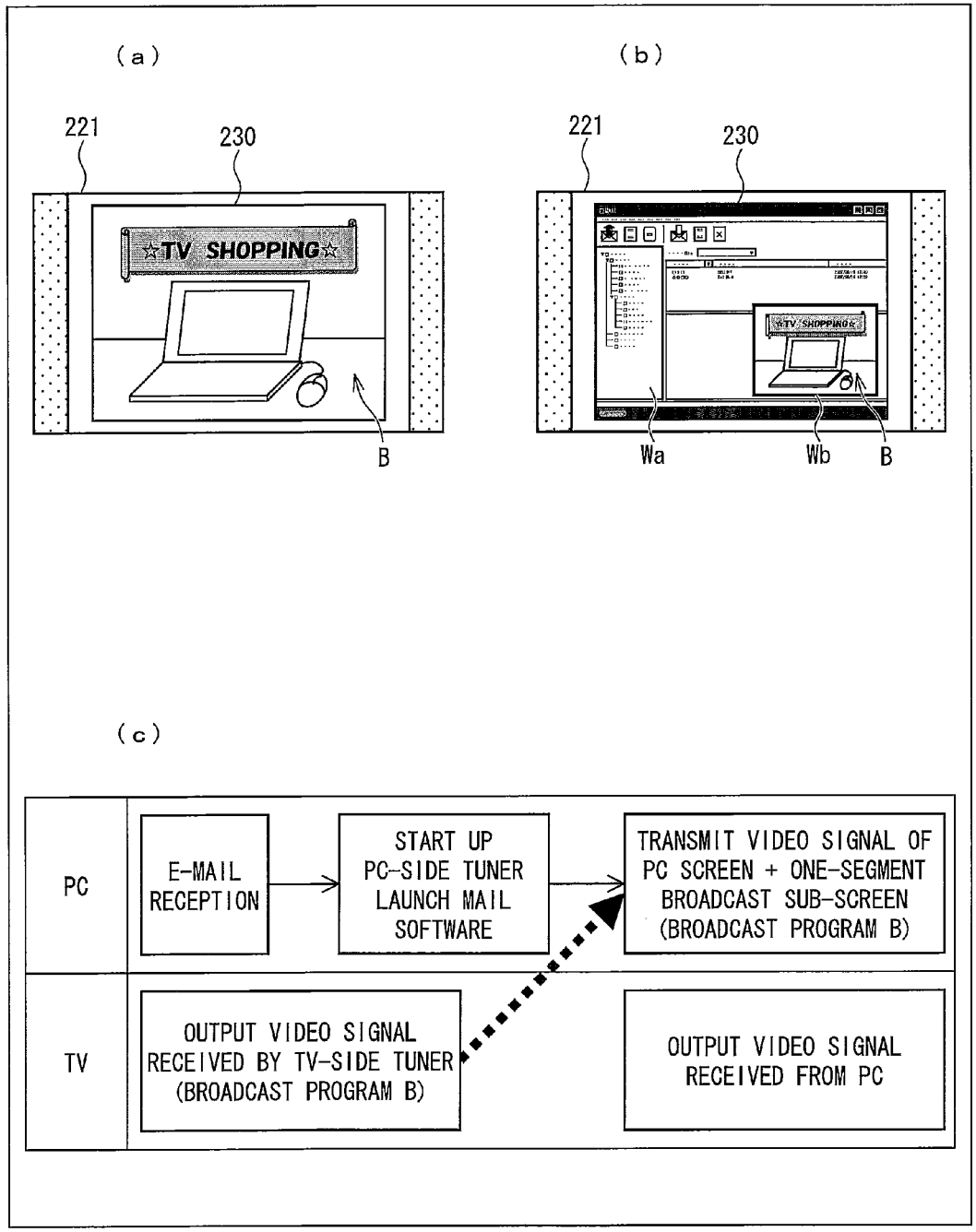

DATA SUPPLY DEVICE, DATA OUTPUT DEVICE, DATA OUTPUT SYSTEM, DATA DISPLAY SYSTEM, DATA SUPPLY METHOD, DATA OUTPUT METHOD, AND PROGRAM

TECHNICAL FIELD

The present invention relates to a data supply apparatus etc. for supplying, to a data output apparatus, data which is outputted by the data output apparatus.

BACKGROUND ART

Conventionally, Personal computers (hereinafter, referred to as PCs) have been generally provided with their own display apparatuses specialized as a display for personal computer. However, systems using TVs as display apparatuses of PCs are widely used recent years. In such a system, a TV can output various kinds of data transmitted from a PC to the TV. In addition, switching outputs of the TV allows the TV to output a broadcast received by the TV. The system is efficient for the reason that there is no need to separately provide a display apparatus to the PC.

In addition, recent years, digital broadcasting services such as terrestrial digital broadcasting and one-segment broadcasting (one-segment partial reception service for portable phones and mobile terminals) are provided, and PCs are widely used which have digital tuners so as to receive a digital broadcast. Such a PC allows a user to execute functions (such as e-mail, Internet connection, document creation, etc.) of the PC while the user watches a digital broadcast.

Such a system using a TV as a display apparatus of a PC can also adopt a PC capable of receiving a digital broadcast. In the arrangement, it is possible to cause the TV to output a digital broadcast (e.g., a one-segment broadcast) received by the PC, in a case where the TV is used as a display apparatus of the PC (hereinafter, a mode in which a TV is used as a display apparatus of a PC is referred to as a PC mode). Needless to say, in a case where a user of the system only would like to watch TV broadcast, it is also possible to switch the TV to output a broadcast received by the TV (hereinafter, a mode in which a broadcast received by a TV is displayed by the TV is referred to as a TV mode).

CITATION LIST

Patent Literature 1
Japanese Patent Application Publication, Tokukai, No. 2006-67198 A (Publication Date: Mar. 9, 2006)
Patent Literature 2
Japanese Patent Application Publication, Tokukai, No. 2005-244807 A (Publication Date: Sep. 8, 2005)

SUMMARY OF INVENTION

Assume that a broadcast program (e.g., a broadcast program of the one-segment broadcasting) received by the PC in the PC mode is outputted to the TV. In case where an output to the TV is switched from an output from a PC to an output from a TV, the system is switched from the PC mode to the TV mode. As a result, outputted to the TV is a broadcast program received by the TV (e.g., a broadcast program of the terrestrial digital broadcast).

In this case, the broadcast program outputted to the TV can be different from the broadcast program received by the PC. In such a case, the output switching from the PC side to the TV side causes an interruption of the broadcast program while a user of the system watches the broadcast program. In addition, the user has to perform a bothersome operation: after the output switching he has to switch channels in order to find the broadcast program that he has watched in the PC mode.

The following describes this with reference to (a) through FIG. 12(c). FIG. 12(a) is a diagram illustrating a state in which a video image of a broadcast program received by the PC is displayed. That is, FIG. 12(a) illustrates one example of a video image displayed on the TV in the PC mode. As illustrated in FIG. 12(a), windows Wa and Wb are displayed on a display section 102 of a TV 101. The windows Wa and Wb are displayed in accordance with video signals supplied by a PC (not illustrated). As illustrated in FIG. 12(a), a web page is displayed in the window Wa while a video image of a broadcast program A of the one-segment broadcasting is displayed in the window Wb.

FIG. 12(b) is a diagram illustrating a state in which a video image of a broadcast program received by the TV 101 is displayed. That is, FIG. 12(b) illustrates one example of a video image displayed on the TV 101 in the TV mode. As illustrated in FIG. 12(b), a video image of a broadcast program B is displayed on the display section 102. After an output to be supplied to the TV 101 is thus switched from an output from the PC to an output from a TV 101, a broadcast program outputted by the TV 101 can be different from a one-segment broadcast program watched before the switching.

In order that the user may continuously watch the broadcast program A, it is necessary to switch channels of the TV 101 by using, e.g., a remote control R, as illustrated in FIG. 12(b). FIG. 12(c) is a diagram illustrating one example of a video image displayed on the TV 101 after channels of the TV 101 are switched. As a result of the user's channel switching, a tuner of the TV 101 receives the broadcast program A, thereby displaying the broadcast program A on the display section 102, as illustrated in FIG. 12(c).

As described above, according to the conventional art, a channel selection can be required so that a broadcast program outputted in the PC mode may be also outputted in the TV mode after the PC mode is switched to the TV mode. In addition, while performing the channel selection, the user undergoes an interruption of the broadcast program.

Similarly, the same problem is caused in a case where the TV mode is switched to the PC mode. The following describes this with reference to (a) through FIG. 13(c). FIG. 13(a) is a diagram illustrating a state in which a video image of a broadcast program received by the TV is displayed. As illustrated in FIG. 13(a), the broadcast program A is displayed on the display section 102 of the TV 101. The broadcast program A is a broadcast program received by the tuner provided to the TV 101.

FIG. 13(b) is a diagram illustrating a state in which a video image of a broadcast program received by the PC is displayed. That is, FIG. 13(b) illustrates one example of a video image displayed on the TV 101 after the TV mode is switched to the PC mode. As illustrated in FIG. 13(b), the video image of the broadcast program B is displayed in the window Wb on the display section 102. In a case where the TV mode is thus switched to the PC mode, a broadcast program outputted in the PC mode can thus be different from a broadcast program outputted in the TV mode.

In order that the user may continuously watch the broadcast program B also in the PC mode, it is necessary to switch channels of the PC by using, e.g., a keyboard K, as is illustrated in FIG. 13(b). FIG. 13(c) is a diagram illustrating one example of a video image displayed on the TV 101 after the broadcast program received by the PC is switched to another broadcast program. The user's channel switching causes the tuner of the PC to receive the broadcast program B, thereby displaying the broadcast program B on the display section 102 as is illustrated in FIG. 13(c).

As described above, in a case where an output mode is switched between the TV mode and the PC mode in the conventional system, a broadcast program to be outputted can differ. This leads to problems in that outputting of a broadcast program is interrupted at the output switching, and a user is required to switch channels in order to watch the same broadcast program as the broadcast program that he has watched before the output switching.

Patent Literature 1 discloses a system made up of a portable receiver and a fixed receiver for receiving a terrestrial digital broadcast. Specifically, the system of the Patent Literature 1 is arranged such that, upon a predetermined button operation performed on the portable receiver while a TV program is watched on the portable receiver, information on the TV program is transmitted to the fixed receiver. In addition, the system of Patent Literature 1 is arranged such that, upon a predetermined button operation performed on the fixed receiver while a TV program is watched on the fixed receiver, information of the TV program is transmitted to the portable receiver.

With the arrangement, a user of the system of Patent Literature 1 performs a simple operation so as to watch, on the fixed receiver, the TV broadcast program that he watches on the portable receiver. This is useful in a case where, for example, the user watches on the fixed receiver, after going back home or the like, a TV program that he has watched on the portable receiver while going out. Similarly, the user of the system of Patent Literature 1 performs a simple operation so as to watch, on the portable receiver, the TV broadcast program that he watches on the fixed receiver. This is useful in a case where, for example, the user watches on the portable receiver, while going out, a TV broadcast program that he watched on the fixed receiver.

However, even if the art of Patent Literature 1 is applied to a system using a TV as a display apparatus of a PC, a user is required to perform a button operation in order to continuously watch a same broadcast program before and after the output switching.

As described above, the conventional art requires that a user perform channel selection or the like in order to continuously watch the same broadcast program before and after switching between the PC mode and the TV mode is carried out. Furthermore, the conventional art has a problem in that the user undergoes an interruption of the broadcast program while performing the channel selection.

The present invention was made in view of the problems. A primary object of the present invention is to realize a data supply apparatus etc. which allows a user to continuously watch a same broadcast program before and after output switching is carried out.

In order to attain the object, a data supply apparatus of the present invention for supplying data to a data output apparatus, the data output apparatus comprising a first tuner and outputting at least one of (i) data of a broadcast program received by the first tuner and (ii) data of a broadcast program received by a second tuner, the data supply apparatus comprises: the second tuner; broadcast program data transmitting means for transmitting, to the data output apparatus, the data of the broadcast program received by the second tuner; and relay coordination control means for transmitting broadcast program switching information to the data output apparatus, the broadcast program switching information (i) causing the first tuner to receive data of a broadcast program containing same content as the broadcast program received by the second tuner, and (ii) causing the data output apparatus to output the data thus received by the first tuner.

In order to attain the object, a data supply method of the present invention, the method of a data supply apparatus for supplying data to a data output apparatus, the data output apparatus comprising a first tuner and outputting at least one of data of a broadcast program received by the first tuner and data of a broadcast program received by a second tuner, the data supply method comprises: transmitting, to the data output apparatus, the data of the broadcast program received by the second tuner; and performing relay coordination control, which transmits broadcast program switching information to the data output apparatus, the broadcast program switching information (i) causing the first tuner to receive data of a broadcast program containing same content as the broadcast program received by the second tuner, and (ii) causing the data output apparatus to output the data thus received by the first tuner.

According to the arrangement, the data of the broadcast program received by the second tuner is transmitted to the data output apparatus. This allows the data output apparatus to output the data of the broadcast program received by the second tuner.

The relay coordination control means or the relay coordination control step transmits the broadcast program switching information from the data supply apparatus to the data output apparatus. After receiving the broadcast program switching information, the data output apparatus receives, via the first tuner, the broadcast program containing the same content as the broadcast program received by the second tuner, and outputs the received broadcast program.

That is, according to the arrangement, the broadcast program containing the same content is outputted from the data output apparatus when an output to be supplied to the data output apparatus is switched from the broadcast program received by the second tuner to the broadcast program received by the first tuner.

As a result, in a case where the output of the data output apparatus is switched from the broadcast program received by the second tuner to the broadcast program received by the first tuner, a user of the data supply apparatus can continuously watch, without performing any operation, the broadcast program containing the same content as the broadcast program that he watched before the switching.

In order to attain the object, a data supply apparatus of the present invention for supplying data to a data output apparatus, the data output apparatus comprising a first tuner and outputting at least one of (i) data of a broadcast program received by the first tuner and (ii) data of a broadcast program received by a second tuner, the data supply apparatus comprises: the second tuner; currently-tuned broadcast program information receiving means for receiving currently-tuned broadcast program information indicating a broadcast program received by the data output apparatus via the first tuner and currently outputted from the data output apparatus; relay coordination control means for causing the second tuner to receive data of a broadcast program indicated by the currently-tuned broadcast program information; and broadcast program data transmitting means for transmitting, to the data output apparatus, the data of the broadcast program thus received by the second tuner.

In order to attain the object, a data supply method of the present invention, the method of a data supply apparatus for supplying data to a data output apparatus, the data output apparatus comprising a first tuner and outputting at least one of data of a broadcast program received by the first tuner and data of a broadcast program received by a second tuner, the data supply method comprises: receiving currently-tuned broadcast program information indicating a broadcast program received by the data output apparatus via the first tuner and currently outputted from the data output apparatus; performing relay coordination control, which causes the second tuner to receive data of a broadcast program indicated by the currently-tuned broadcast program information; and transmitting, to the data output apparatus, the data of the broadcast program thus received by the second tuner.

According to the arrangement, by the currently-tuned broadcast program information receiving means or in the currently-tuned broadcast program information receiving step, the data supply apparatus receives the currently-tuned broadcast program information indicating the broadcast program received via the first tuner and outputted by the data output apparatus. Then, the data of the broadcast program indicated by the currently-tuned broadcast program information is received via the second tuner and transmitted to the data output apparatus.

That is, according to the arrangement, the data output apparatus can output that broadcast program received by the second tuner which contains the same content as the broadcast program received via the first tuner and outputted by the data output apparatus.

As a result, in a case where the output of the data output apparatus is switched from the broadcast program received by the first tuner to the broadcast program received by the second tuner, the user of the data supply apparatus can continuously watch the broadcast program containing the same content as the broadcast program that he watched before the switching.

The relay coordination control means preferably transmits, if the data supply apparatus receives a predetermined input operation of a user of the data supply apparatus, to the data output apparatus, currently-tuned broadcast program request information for causing the data output apparatus to transmit the currently-tuned broadcast program information to the data supply apparatus.

According to the arrangement, the user performs the predetermined input operation on the data supply apparatus so that the currently-tuned broadcast program request information may be transmitted to the data output apparatus. Then, the currently-tuned broadcast program information indicating the broadcast program received by the first tuner is received by the data supply apparatus. As a result, the broadcast program containing the same content as the broadcast program received by the first tuner is received by the second tuner, and transmitted to the data output apparatus.

That is, according to the arrangement, the data of that broadcast program received by the second tuner which contains the same content as the broadcast program received by the first tuner is transmitted to the data output apparatus at a timing when the user performs the predetermined input operation. As a result, the user merely performs the predetermined input operation so as to watch, also after the output switching, the broadcast program containing the same content as the broadcast program that he watched before the output switching.

Further, the relay coordination control means preferably (i) receives, from the data output apparatus, the currently-tuned broadcast program information and mode switching information for designating at least one of an audio mode and a caption mode of the broadcast program which is to be received by the second tuner, and (ii) sets the at least one of the audio mode and the caption mode, on the basis of the mode switching information thus received, so that the broadcast program to be received by the second tuner is to be outputted in the at least one of the audio mode and the caption mode thus designated.

According to the arrangement, the relay coordination control means receives the currently-tuned broadcast program information and the mode switching information, and, on the basis of the mode switching information, the relay coordination control means designates at least one of the audio mode and the caption mode of the broadcast program which is received by the second tuner. Accordingly, at least one of the audio mode and the caption mode of the broadcast program which is received by the second tuner can be matched with an audio mode and/or a caption mode of the broadcast program received by the first tuner.

That is, according to the arrangement, in a case where the output of the data output apparatus is switched from the data of the broadcast program received by the first tuner to the data of the broadcast program received by the second tuner, at least one of an audio mode and a caption mode remains the same before and after the output switching.

As a result, the user is not required to designate the audio mode or the caption mode again in a case where the output to be supplied to the data output apparatus is switched from the data of the broadcast program received by the first tuner to the data of the broadcast program received by the second tuner.

In order to attain the object, a data output apparatus of the present invention for outputting at least one of a broadcast program received by a first tuner and a broadcast program received by a second tuner, the data output apparatus comprises: the first tuner; broadcast program receiving means for receiving data of the broadcast program received by a data supply apparatus via the second tuner, the second tuner being provided to the data supply apparatus; currently-tuned broadcast program information receiving means for receiving broadcast program switching information from the data supply apparatus, the broadcast program switching information indicating the broadcast program received by the broadcast program receiving means from the data supply apparatus; and output control means for (i) causing the first tuner to receive data of a broadcast program indicated by the broadcast program switching information received by the currently-tuned broadcast program information receiving means, and (ii) outputting, instead of the data of the broadcast program received by the broadcast program receiving means, the data thus received by the first turner.

In order to attain the object, a data output method of the present invention, the method of a data output apparatus for outputting at least one of a broadcast program received by a first tuner and a broadcast program received by a second tuner, the data output method comprises: (a) receiving data of the broadcast program received by a data supply apparatus via the second tuner, the second tuner being provided to the data supply apparatus; (b) receiving broadcast program switching information from the data supply apparatus, the broadcast program switching information indicating the broadcast program received from the data supply apparatus in the step (a); and (c) performing output control, which (i) causes the first tuner to receive data of a broadcast program indicated by the broadcast program switching information received in the step (b), and (ii) outputs, instead of the data of the broadcast program received by the broadcast program receiving means, the data of the broadcast program thus received by the first turner.

According to the arrangement, the data output apparatus can output the broadcast program received via the first tuner provided to the data output apparatus. In addition, the data output apparatus can receive and output the data of the broadcast program received by the data supply apparatus via the second tuner.

According to the arrangement, the data output apparatus receives the broadcast program switching information from the data supply apparatus. Then, the data output apparatus causes the first tuner to receive the data of the broadcast program indicated by the broadcast program switching information thus received, and outputs the data instead of the data of the broadcast program received by the broadcast program receiving means or in the broadcast program receiving step.

That is, according to the arrangement, the data output apparatus receives the broadcast program switching information from the data supply apparatus so as to output that broadcast program received by the first tuner which contains the same content as the broadcast program received via the second tuner and outputted from the data output apparatus.

As a result, in a case where the output of the data output apparatus is switched from the broadcast program received by the first tuner to the broadcast program received by the second tuner, the user of the data output apparatus can continuously watch the broadcast program containing the same content as the broadcast program that he watched before the switching.

In order to attain the object, a data output apparatus of the present invention for outputting at least one of a broadcast program received by a first tuner and a broadcast program received by a second tuner, the data output apparatus comprises: the first tuner; currently-tuned broadcast program information transmitting means for transmitting currently-tuned broadcast program information indicating the broadcast program received by the first tuner and currently outputted from the data output apparatus; broadcast program receiving means for receiving data of the broadcast program received by a data supply apparatus via the second tuner, the second tuner being provided to the data supply apparatus; and output control means for outputting, instead of the data of the broadcast program received by the first tuner, the data of the broadcast program thus received by the broadcast program receiving means.

In order to attain the object, a data output method of the present invention, the method of a data output apparatus for outputting at least one of a broadcast program received by a first tuner and a broadcast program received by a second tuner, the data output method comprises: (a) transmitting currently-tuned broadcast program information indicating the broadcast program received by the first tuner and currently outputted from the data output apparatus; (b) receiving data of the broadcast program received by a data supply apparatus via the second tuner, the second tuner being provided to the data supply apparatus; and (c) performing output control, which outputs, instead of the data of the broadcast program received by the first tuner, the data of the broadcast program received in step (b).

According to the arrangement, the data output apparatus can output the broadcast program received by the first tuner provided to the data output apparatus. In addition, the data output apparatus can receive and output the broadcast program received via the second tuner by the data supply apparatus.

According to the arrangement, the data output apparatus transmits the currently-tuned broadcast program information to the data supply apparatus. This allows the data supply apparatus to receive the broadcast program containing the same content as the broadcast program received via the first tuner and outputted from the data output apparatus, and transmit the broadcast program thus received to the data output apparatus. Then, the data output apparatus outputs the data transmitted from the data supply apparatus, instead of the data received via the first tuner and outputted from the data output apparatus.

That is, according to the arrangement, the data output apparatus transmits the currently-tuned broadcast program information to the data supply apparatus so as to output that broadcast program received by the second tuner which contains the same content as the broadcast program received by the first tuner and outputted from the data output apparatus.

As a result, in a case where the output of the data output apparatus is switched from the broadcast program received by the first tuner to the broadcast program received by the second tuner, the user of the data output apparatus can continuously watch the broadcast program containing the same content as the broadcast program that he watched before the switching.

The conventional system above has a problem in that a user cannot know an event occurred in the TV mode on the PC side. For example, in a case where the conventional system is in the TV mode, and the PC receives an e-mail, the user cannot recognize even the reception of the e-mail, without switching the TV mode to the PC mode. Therefore, the user is required to switch the TV mode to the PC mode in order to check the reception of an e-mail. In addition, there is a problem in that the user undergoes an interruption of a broadcast program received in the TV mode, due to the switching.

The following describes this with reference to FIG. 25. (*a*) through FIG. 25(*c*) are diagrams illustrating one example of a transition between video images displayed on the TV before and after the output modes of the TV are switched in the conventional system using the TV as a display apparatus of the PC.

FIG. 25(*a*) illustrates one example of a video image displayed in the TV mode. As illustrated in FIG. 25(*a*), the video image of the broadcast program A is displayed on the display section 102 of the TV 101. In a case where a user of the conventional system switches a state illustrated in FIG. 25(*a*) (i.e., TV mode) to the PC mode by using an input device such as a remote control so as to check the reception of an e-mail, the display section 102 functions as a display apparatus of the PC.

In order to check the reception of an e-mail, the user is required to launch e-mail software. FIG. 25(*b*) illustrates one example of a video image which is displayed on the display section 102 in a case where the e-mail software is launched in the PC mode. As illustrated in FIG. 25(*b*), a window of the e-mail software is displayed on the display section 102 of the TV 101.

In order to continuously watch, after checking the reception of an e-mail, the rest of the broadcast program that the user watched in the TV mode, the user is required to switch again the PC mode to the TV mode by using an input device such as a remote control. FIG. 25(*c*) illustrates one example of a video image which is displayed on the display section 102 in a case where the TV mode is selected again. As illustrated in FIG. 25(*c*), the video image of the broadcast program A is displayed on the display section 102 again.

As described above, in the conventional system, a broadcast program outputted in the TV mode is not outputted after a switching from the TV mode to the PC mode. Therefore, the user has to stop watching the broadcast program every time he checks the reception of an e-mail.

Recent years, digital broadcasting services such as the terrestrial digital broadcasting and the one-segment broadcasting (one-segment partial reception service for portable phones and mobile terminals) are provided, and PCs are widely used which have tuners so as to receive a broadcast.

Such a PC can execute its functions (such as e-mail, Internet connection, document creation, etc.) while outputting a broadcast.

Also in the conventional system, it is possible to use a PC capable of receiving a broadcast. In this case, also in the PC mode, it is possible to cause the TV to output a broadcast (e.g., a one-segment broadcast) received by the PC. In a case where the user of the conventional system would like only to watch TV, needless to say, it is possible to cause the TV to output a broadcast received by the TV, by switching outputs to the TV.

However, the tuner of the PC is different from the tuner of the TV. Therefore, a broadcast program which is outputted in the PC mode is not always the same as a broadcast program outputted in the TV mode. Therefore, even though a tuner is provided to the PC, a user can still undergo an interruption of a broadcast program in a case where the TV mode is switched to the PC mode so that the user may check the reception of an e-mail.

Patent Literature 1 discloses a system made up of a portable receiver and a fixed receiver for receiving a terrestrial digital broadcast. Specifically, the system of the Patent Literature 1 is arranged such that, upon a predetermined button operation performed on the portable receiver while a TV program is watched on the portable receiver, information on the TV program is transmitted to the fixed receiver. In addition, the system of Patent Literature 1 is arranged such that, upon a predetermined button operation performed on the fixed receiver while a TV program is watched on the fixed receiver, information of the TV program is transmitted to the portable receiver.

With the arrangement, a user of the system of Patent Literature 1 performs a simple operation so as to watch, on the fixed receiver, the TV program that he watches on the portable receiver. This is useful in a case where, for example, the user watches on the fixed receiver, after going back home or the like, a TV broadcast program that he watched on the portable receiver while going out. Similarly, the user of the system of Patent Literature 1 performs a simple operation so as to watch, on the portable receiver, the TV program that he watches on the fixed receiver. This is useful in a case where, for example, the user watches on the portable receiver, while going out, a TV broadcast program that he watched on the fixed receiver.

However, even if the art of Patent Literature 1 is applied to a system using a TV as a display apparatus of a PC, a user is required to perform a button operation in order to continuously watch a same broadcast program before and after the output switching.

In addition, the art of Patent Literature 1 is not originally assumed to be applied to a system using a TV as a display apparatus of a PC. Therefore, Patent Literature 1 describes nothing about checking the reception of an e-mail in the TV mode.

Patent Literature 2 discloses an art for checking the reception of an e-mail while watching TV. Specifically, an operation system disclosed in Patent Literature 2 has a sub-display, in addition to a main display for displaying a video image of a TV program. The system displays, on the sub-display, information indicating the reception of an e-mail, thereby allowing a user to check the reception of an e-mail while watching TV.

However, the art of the Patent Literature 2 cannot be applied to a conventional common TV because the art requires the sub-display. In addition, provision of the sub-display is not preferable because manufacturing costs of TVs are increased.

As described above, in the conventional system, the user cannot know, in the TV mode, an event occurred on the PC-side, such as the reception of an e-mail. In addition, the conventional system requires that a user perform a channel selection or the like in order to continuously watch a same broadcast program before and after a switching from the TV mode to the PC mode is carried out. Furthermore, the conventional system has a problem in that the user undergoes an interruption of the broadcast program while performing channel selection.

The present invention was made in view of the problems. A secondary object of the present invention is to realize a data supply apparatus etc. which allow a user to easily know an occurrence of an event, and which eliminate an interruption of a TV program that the user watches.

In order to attain the object, a data supply apparatus of the present invention for supplying second data to a display apparatus, the display apparatus comprising a first tuner and displaying (i) first data containing data of a broadcast program received by the first tuner or (ii) second data containing data of a broadcast program received by a second tuner and being different from the first data, the data supply apparatus comprises: the second tuner; switching signal transmitting means for transmitting a switching signal for causing, in response to a predetermined event, the display apparatus to display the second data instead of the first data; a currently-tuned broadcast program information receiving section for receiving currently-tuned broadcast program information indicating the broadcast program received via the first tuner and currently displayed by the display apparatus; relay coordination control means for causing the second tuner to receive data of a broadcast program indicated by the currently-tuned broadcast program information; and a data transmitting section for transmitting the second data to the display apparatus.

In order to attain the object, a data supply method of the present invention, the method of a data supply apparatus for supplying second data to a display apparatus, the display apparatus comprising a first tuner and displaying (i) first data containing data of a broadcast program received by the first tuner or (ii) second data containing data of a broadcast program received by a second tuner and being different from the first data, the data supply method comprises: transmitting a switching signal for causing, in response to a predetermined event, the display apparatus to display the second data instead of the first data; receiving currently-tuned broadcast program information indicating the broadcast program received via the first tuner and currently displayed by the display apparatus; performing relay coordination control for causing the second tuner to receive data of a broadcast program indicated by the currently-tuned broadcast program information; and transmitting the second data to the display apparatus.

According to the arrangement, in a case where a predetermined event occurs while the display apparatus displays the first data, the second tuner receives the broadcast program containing the same content as the broadcast program received by the first tuner. Then, the display apparatus displays the second data containing the data of the broadcast program received by the second tuner.

The second data is different from the first data. Accordingly, the display apparatus displays different (video) images before and after the occurrence of the predetermined event. Therefore, the user of the data supply apparatus can recognize the occurrence of the predetermined event, from the switching between the images displayed on the display apparatus.

The second data contains the data of the broadcast program containing the same content as the broadcast program received by the first tuner. As a result, without being interrupted, the user can watch the broadcast programs containing common content before and after the occurrence of the event.

The display apparatus is preferably a prevalent TV (TV receiver). The data supply apparatus is preferably, e.g., a PC (Personal Computer) capable of various types of data processing and data outputting.

The predetermined event is not particularly limited, provided that it occurs on the data supply apparatus. Therefore, the predetermined event can be suitably set in accordance with an arrangement of the data supply apparatus. For example, the predetermined event can be the reception of an e-mail in a case where the data supply apparatus has a function of receiving an e-mail. In this case, when the data supply apparatus receives an e-mail, data which is displayed on the display apparatus is switched from the first data to the second data. This allows a user to recognize the reception of an e-mail.

The conventional system has a problem of a low operability in switching between the TV mode and the PC mode. For example, in a case where the TV mode is switched to the PC mode, the user of the conventional system is required to operate, after turning on power of the PC, a remote control or the like so as to switch the output from the TV to the output from the PC.

The following describes this with reference to FIG. 37. FIG. 37(a) is a diagram illustrating one example of a video image displayed in the TV mode. As illustrated in FIG. 37(a), the video image of the broadcast program A is displayed on the display section 102 of the TV 101. By turning on the power of the PC 103 in a state illustrated in FIG. 37(a) (i.e., in the TV mode), data outputted from the PC 103 is transmitted to the TV 101.

FIG. 37(b) is a diagram illustrating one example of a video image displayed after the power of the PC 103 is turned on in the TV mode. As illustrated in FIG. 37(b), the TV 101 is still in the TV mode after the power of the PC 103 is turned on. Accordingly, the broadcast program A is continuously displayed on the display section 102. Therefore, in order to cause the display section 102 to display the data outputted from the PC 103, the user has to switch the TV mode to the PC mode, by using an input device such as the remote control R.

FIG. 37(c) is a diagram illustrating one example of a video image which is displayed on the display section 102 in a case where the TV mode is switched to the PC mode after the power of PC 103 is turned on. As illustrated in FIG. 37(c), the data outputted from the PC 103 (a window showing a web page on the Internet) is displayed on the display section 102.

As described above, according to the conventional art, a user turns on the power of the PC 103 first as is illustrated in FIG. 37(a), and then, switches the TV mode to the PC mode by using the remote control R as is illustrated in FIG. 37(b). As a result, the data outputted from the PC 103 is displayed on the display section 102 as is illustrated in FIG. 37(c). That is, a switching from the TV mode to the PC mode conventionally requires the following two steps: a start-up of the PC and a switching operation of switching to the PC mode. This leads to a low operability.

In addition, in the conventional system, data is not transmitted from the PC to the TV in a case where the power of the PC is turned off in the PC mode. Accordingly, no video image is displayed on the TV. Therefore, in order to watch TV after turning off the power of the PC, a user is required to switch the PC mode to the TV mode by using a remote control or the like. As described above, the conventional system has a problem in that switching between the PC mode and the TV mode is bothersome for the user.

A possible solution to the problem is to automatically select the PC mode when the power of the PC is turned on. However, in a case where the PC mode is automatically selected when the power of the PC is turned on, a broadcast program outputted in the TV mode cannot be outputted in the PC mode. This leads to a problem in that a user undergoes an interruption of the broadcast program.

Recent years, digital broadcasting services such as the terrestrial digital broadcasting and one-segment broadcasting (one-segment partial reception service for portable phones and mobile terminals) are provided, and PCs are widely used which have tuners so as to receive a broadcast. Such a PC can execute its functions (such as e-mail, Internet connection, document creation, etc.) while outputting a broadcast.

Also in the conventional system, it is possible to use a PC capable of receiving a broadcast. In this case, also in the PC mode, it is possible to cause the TV to output a broadcast (e.g., a one-segment broadcast) received by the PC. In a case where the user of the conventional system would like only to watch TV, needless to say, it is possible to cause the TV to output a broadcast received by the TV, by switching outputs to the TV.

However, the tuner of the PC is different from the tuner of the TV. Therefore, a broadcast program which is outputted after the TV mode is switched to the PC mode is not always the same as a broadcast program outputted in the TV mode. Therefore, even though a tuner is provided to the PC, a user can still undergo an interruption of a broadcast program in a case where the power of the PC is turned on so that the TV mode is switched to the PC mode.

Patent Literature 1 discloses a system made up of a portable receiver and a fixed receiver for receiving a terrestrial digital broadcast. Specifically, the system of the Patent Literature 1 is arranged such that, upon a predetermined button operation performed on the portable receiver while a TV program is watched on the portable receiver, information on the TV program is transmitted to the fixed receiver. In addition, the system of Patent Literature 1 is arranged such that, upon a predetermined button operation performed on the fixed receiver while a TV program is watched on the fixed receiver, information of the TV program is transmitted to the portable receiver.

With the arrangement, a user of the system of Patent Literature 1 performs a simple operation so as to watch, on the fixed receiver, the TV program that he watches on the portable receiver. This is useful in a case where, for example, the user watches on the fixed receiver, after going back home or the like, a TV broadcast program that he watched on the portable receiver while going out. Similarly, the user of the system of Patent Literature 1 performs a simple operation so as to watch, on the portable receiver, the TV program that he watches on the fixed receiver. This is useful in a case where, for example, the user watches on the portable receiver, while going out, a TV broadcast program that he watched on the fixed receiver.

However, even if the art of Patent Literature 1 is applied to a system using a TV as a display apparatus of a PC, a user is required to perform a button operation in order to continuously watch a same broadcast program before and after the output switching.

As described above, in the conventional system, switching between the PC mode and the TV mode is bothersome for the user. In addition, the conventional system requires that a user perform a channel selection or the like in order to continuously watch a same broadcast program before and after a switching between the PC mode to the TV mode is carried out. Furthermore, the conventional system has a problem in that the user undergoes an interruption of the broadcast program while performing channel selection.

The present invention was made in view of the problems. An object of the present invention is to realize a data supply apparatus etc. which allow a user to smoothly switch between the PC mode and the TV mode, and which eliminates an interruption of a TV program that the user watches.

In order to attain the object, a data supply apparatus of the present invention for supplying second data to a display apparatus, the display apparatus comprising a first tuner and displaying (i) first data containing data of a broadcast program received by the first tuner or (ii) second data containing data of a broadcast program received by a second tuner, the data supply apparatus comprises: the second tuner; data transmitting means for transmitting the second data containing the data of the broadcast program received by the second tuner to the display apparatus; currently-tuned broadcast program information receiving means for receiving currently-tuned broadcast program information for designating the broadcast program received via the first tuner and currently displayed by the display apparatus; switching signal transmitting means for transmitting a switching signal for causing, when the data supply apparatus starts, the display apparatus to display the second data transmitted by the data transmitting means instead of the first data; and relay coordination control means for causing the second tuner to receive data of a broadcast program containing same content as the broadcast program designated by the currently-tuned broadcast program information.

In order to attain the object, a data supply method of the present invention, the method of a data supply apparatus for supplying second data to a display apparatus, the display apparatus comprising a first tuner and displaying (i) first data containing data of a broadcast program received by the first tuner or (ii) second data containing data of a broadcast program received by a second tuner, the data supply method is arranged such that: the data supply apparatus comprises the second tuner; the data supply method comprises: (a) transmitting the second data containing the data of the broadcast program received by the second tuner to the display apparatus; (b) receiving currently-tuned broadcast program information for designating the broadcast program received via the first tuner and currently displayed by the display apparatus; (c) transmitting a switching signal for causing, when the data supply apparatus starts, the display apparatus to display the second data transmitted in the step (a) instead of the first data; and (d) performing relay coordination control, which causes the second tuner to receive data of a broadcast program containing same content as the broadcast program designated by the currently-tuned broadcast program information.

According to the arrangement, when the data supply apparatus is started up, the data supply apparatus transmits, to the display apparatus, the switching signal for causing the display apparatus to display the second data transmitted from the data transmitting means instead of the first data.

That is, according to the arrangement, a user of the data supply apparatus merely performs an operation required for starting up the data supply apparatus, so as to cause the display apparatus to display the second data. Such an operation for starting up the data supply apparatus is, for example, turning on the power of the data supply apparatus, or performing an input operation for causing the data supply apparatus to return from a standby state.

Further, according to the arrangement, the currently-tuned broadcast program information for designating the broadcast program received via the first tuner and outputted on the display apparatus is received by the data supply apparatus, and the data of the broadcast program designated by the currently-tuned broadcast program information is received via the second tuner of the data supply apparatus. Then, the data of the broadcast program received by the second tuner is transmitted to the display apparatus and displayed on the display apparatus.

That is, according to the arrangement, when data to be displayed by the display apparatus is switched from the first data to the second data, the display apparatus displays the broadcast program containing the same content as the broadcast program displayed before the switching. Therefore, according to the arrangement, the user merely starts up the data supply apparatus by turning on the power of the data supply apparatus or by doing the like, so as to cause the display apparatus to display the second data outputted from the data supply apparatus, and so that the user can continuously watch the broadcast program containing the same content as the broadcast program that the user watched before the data supply apparatus is started up.

The data of the broadcast program refers to video data contained in a broadcast wave received by the first or second tuner. In a case where the broadcast wave contains, other than the video data, data such as audio data, such data is transmitted to the display apparatus as data of the broadcast program. This, and provision of data output means such as an audio output apparatus (e.g., a speaker) to the display apparatus allows the display apparatus to output the video data of the broadcast program and data such as audio data.

The display apparatus is preferably a prevalent TV (TV receiver). The data supply apparatus is preferably, e.g., a PC (Personal Computer) capable of various types of data processing and data outputting.

A broadcast program received by the second tuner is not necessarily identical with a broadcast program received by the first tuner. This is because the first tuner and the second tuner are separate tuners, and accordingly, they cannot receive identical broadcast programs in some cases.

For example, assume that the first tuner is a tuner for receiving a terrestrial digital broadcast and the second tuner is a tuner for receiving a one-segment broadcast. In this case, broadcast programs of the one-segment broadcasting correspond to broadcast programs of the terrestrial digital broadcasting, respectively, and a one-segment broadcasting program is not identical in its content with a corresponding terrestrial digital broadcasting program, although they contain common content. In such a case, the one-segment broadcasting program corresponding to the terrestrial digital broadcasting program, i.e., containing the same content as the terrestrial digital broadcasting program, is received by the second tuner. In other words, the second tuner receives a broadcast program of a same broadcast station as that of a broadcast program received by the first tuner.

In the present invention, it is essential that a broadcast program being watched by a user is not interrupted. Therefore, a broadcast program received by the second tuner has only to contain same content as a broadcast program received by the first tuner even if the broadcast programs are broadcasted by different broadcast stations. For example, in a case where a broadcast program of a sport game or the like is received by the first tuner, a broadcast program which is received by the second tuner can be any broadcast program even if the broadcast programs are broadcasted from different broadcast stations, provided that the broadcast programs show the same sport game.

In order to attain the object, a data supply apparatus of the present invention for supplying second data to a display apparatus, the display apparatus comprising a first tuner and displaying (i) first data containing data of a broadcast program received by the first tuner or (ii) second data containing data of a broadcast program received by a second tuner, the data supply apparatus comprises: the second tuner; and broadcast program switching information transmitting means for transmitting broadcast program switching information to the display apparatus when the data supply apparatus stops operating, the broadcast program switching information (i) causing the first tuner to receive data of a broadcast program containing same content as the broadcast program received by the second tuner, and (ii) causing the display apparatus to display, as the first data, the data of the broadcast program thus received by the first tuner.

In order to attain the object, a data supply method of the present invention, the method of a data supply apparatus for supplying second data to a display apparatus, the display apparatus comprising a first tuner and displaying (i) first data containing data of a broadcast program received by the first tuner or (ii) second data containing data of a broadcast program received by a second tuner, wherein: the data supply apparatus comprises the second tuner; the data supply method comprises: transmitting broadcast program switching information to the display apparatus when the data supply apparatus stops operating, the broadcast program switching information (i) causing the first tuner to receive data of a broadcast program containing same content as the broadcast program received by the second tuner, and (ii) causing the display apparatus to display, as the first data, the data of the broadcast program thus received by the first tuner.

According to the arrangement, when the data supply apparatus stops operating, the data supply apparatus transmits, to the data output apparatus, the broadcast program switching information for (i) causing the display apparatus to receive the data of the broadcast program containing the same content as the broadcast program being received by the second tuner, and (ii) causing the display apparatus to display, as the first data, the data of the broadcast program thus received by the first tuner.

That is, according to the arrangement, a user of the data supply apparatus merely performs an operation necessary for stopping the data supply apparatus from operating, so as to cause the display apparatus to display the first data. A possible operation necessary for stopping the data supply apparatus from operating is, for example, turning off the power of the data supply apparatus, or performing an input operation for putting the data supply apparatus into the standby state. Further, the data supply apparatus may automatically enter the standby state when a predetermined condition is satisfied (for example, when a predetermined time period has elapsed while no input operation is performed). In this case, a user is not required to perform any operation.

According to the arrangement, the data of the broadcast program containing the same content as the broadcast program received by the data supply apparatus via the second tuner and transmitted to the display apparatus is received via the first tuner provided to the display apparatus and displayed on the display apparatus.

That is, according to the arrangement, when data displayed by the display apparatus is switched from the second data to the first data, the display apparatus displays the broadcast program containing the same content as the broadcast program that the user watched before the switching. Therefore, according to the arrangement, the user merely stops the data supply apparatus from operating by turning off the power of the data supply apparatus or by doing the like, so as to cause the display apparatus to display the first data received via the first tuner of the display apparatus, and so that the user can continuously watch the broadcast program containing the same content as the broadcast program that the user watched before the user stops the data supply apparatus from operating.

As described above, a broadcast program received by the first tuner is not necessarily identical with a broadcast program received by the second tuner but the broadcast programs only have to contain common content because the first tuner and the second tuner are separate tuners.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1

FIG. 1 is a block diagram illustrating an embodiment of the present invention, which block diagram illustrates an arrangement of a main part of a video image display system.

FIG. 2 is a flowchart illustrating one example of video image display processing which is carried out by the video image display system.

FIG. 3

FIG. 3 is a diagram illustrating one example of data indicating that the output mode is set to a PC mode in the video image display system.

FIG. 4 is a diagram illustrating the embodiment of the present invention. (a) of FIG. 4 illustrates one example of a video image displayed on a display section before a PC-TV relay coordination process is carried out. (b) of FIG. 4 illustrates one example of a video image displayed on the display section after the PC-TV relay coordination process is carried out. (c) of FIG. 4 shows main operations which are carried out by a PC and a TV before and after the PC-TV relay coordination process is carried out.

FIG. 5 is a diagram illustrating the embodiment of the present invention. (a) of FIG. 5 illustrates one example of a video image displayed on the display section before channels are switched. (b) of FIG. 5 illustrates one example of a video image displayed on the display section after the channels are switched. (c) of FIG. 5 shows main operations which are carried out by the PC and the TV before and after the channels are switched.

FIG. 6 is a diagram illustrating the embodiment of the present invention. (a) of FIG. 6 illustrates one example of a video image displayed on the display section before a TV-PC relay coordination process is carried out. (b) of FIG. 6 illustrates one example of a video image displayed on the display section after the TV-PC relay coordination process is carried out. (c) of FIG. 6 shows main operations which are carried out by the PC and the TV before and after the TV-PC relay coordination process is carried out.

FIG. 7 is a diagram illustrating the embodiment of the present invention. (a) of FIG. 7 illustrates one example of a video image displayed on the display section before channels are switched. (b) of FIG. 7 illustrates one example of a video image displayed on the display section after the channels are switched. (c) of FIG. 7 shows main operations which are carried out by the PC and the TV before and after the channels are switched.

FIG. 8 is a flowchart showing one example of the PC-TV relay coordination process in the video image display system.

FIG. 9 is a flowchart showing one example of the TV-PC relay coordination process in the video image display system.

FIG. 10 is a flowchart showing one example of the PC-TV relay coordination process in another video image display system.

FIG. 11 is a flowchart showing one example of the TV-PC relay coordination process in the another video image display system.

FIG. 12(a)

FIG. 12(a) is a diagram illustrating a conventional art, which diagram illustrating a state in which a video image of a broadcast program received by a PC is displayed.

FIG. 12(b)

FIG. 12(b) is a diagram illustrating the conventional art, which diagram illustrating a state in which a video image of a broadcast program received by a TV is displayed.

FIG. 12(c)

FIG. 12(c) is a diagram illustrating the conventional art, which diagram illustrating a state after the broadcast program received by the PC is switched.

FIG. 13(a) is a diagram illustrating the conventional art, which diagram illustrating a state in which a video image of a broadcast program received by the TV is displayed.

FIG. 13(b) is a diagram illustrating the conventional art, which diagram illustrating a state in which a video image of a broadcast program received by the PC is displayed.

FIG. 13(c) is a diagram illustrating the conventional art, which diagram illustrating a state after the broadcast program received by the PC is switched.

FIG. 14 is a block diagram illustrating an embodiment of the present invention, which block diagram illustrates an arrangement of a main part of a video image display system.

FIG. 15 is a flowchart illustrating one example of video image display processing which is carried out by the video image display system.

FIG. 16

FIG. 16 is a diagram illustrating one example of data indicating that the output mode is set to the PC mode in the video image display system.

FIG. 17

FIG. 17 is a diagram illustrating the embodiment of the present invention. (a) of FIG. 17 illustrates one example of a video image displayed on the display section before the PC-TV relay coordination process is carried out. (b) of FIG. 17 illustrates one example of a video image displayed on the display section after the PC-TV relay coordination process is carried out. (c) of FIG. 17 shows main operations which are carried out by a PC and a TV before and after the PC-TV relay coordination process is carried out.

FIG. 18

FIG. 18 is a diagram illustrating the embodiment of the present invention. (a) of FIG. 18 illustrates one example of a video image displayed on the display section before channels are switched. (b) of FIG. 17 illustrates one example of a video image displayed on the display section after the channels are switched. (c) of FIG. 17 shows main operations which are carried out by the PC and the TV before and after the channels are switched.

FIG. 19

FIG. 19 is a diagram illustrating the embodiment of the present invention. (a) of FIG. 19 illustrates one example of a video image displayed on the display section before the TV-PC relay coordination process is carried out. (b) of FIG. 19 illustrates one example of a video image displayed on the display section after the TV-PC relay coordination process is carried out. (c) of FIG. 19 shows main operations which are carried out by the PC and the TV before and after the TV-PC relay coordination process is carried out.

FIG. 20 is a diagram illustrating the embodiment of the present invention. (a) of FIG. 20 illustrates one example of a video image displayed on the display section before channels are switched. (b) of FIG. 20 illustrates one example of a video image displayed on the display section after the channels are switched. (c) of FIG. 20 shows main operations which are carried out by the PC and the TV before and after the channels are switched.

FIG. 21 is a flowchart showing one example of the PC-TV relay coordination process in the video image display system.

FIG. 22 is a flowchart showing one example of the TV-PC relay coordination process in the video image display system.

FIG. 23 is a flowchart showing one example of the PC-TV relay coordination process in another video image display system.

FIG. 24 is a flowchart showing one example of the TV-PC relay coordination process in further another video image display system.

FIG. 25(a) is a diagram illustrating a conventional art, which diagram illustrating one example of a video image displayed in the TV mode.

FIG. 25(b) is a diagram illustrating the conventional art, which diagram illustrating one example of a video image displayed on the display section when e-mail software is launched in the PC mode.

FIG. 25(c) is a diagram illustrating the conventional art, which diagram illustrating one example of a video image displayed after the TV mode is selected again.

FIG. 26 is a block diagram illustrating an embodiment of the present invention, which block diagram illustrates an arrangement of a main part of a video image display system.

FIG. 27 is a flowchart illustrating one example of video image display processing which is carried out by the video image display system.

FIG. 28 is a diagram illustrating one example of data indicating that the output mode is set to a PC mode in the video image display system.

FIG. 29 is a diagram illustrating the embodiment of the present invention. (a) of FIG. 29 illustrates one example of a video image displayed on the display section before the PC-TV relay coordination process is carried out. (b) of FIG. 29 illustrates one example of a video image displayed on the display section after the PC-TV relay coordination process is carried out. (c) of FIG. 29 shows main operations which are carried out by a PC and a TV before and after the PC-TV relay coordination process is carried out.

FIG. 30 is a diagram illustrating the embodiment of the present invention. (a) of FIG. 30 illustrates one example of a video image displayed on the display section before channels are switched. (b) of FIG. 30 illustrates one example of a video image displayed on the display section after the channels are switched. (c) of FIG. 30 shows main operations which are carried out by the PC and the TV before and after the channels are switched.

FIG. 31 is a diagram illustrating the embodiment of the present invention. (a) of FIG. 31 illustrates one example of a video image displayed on the display section before the TV-PC relay coordination process is carried out. (b) of FIG. 31 illustrates one example of a video image displayed on the display section after the TV-PC relay coordination process is carried out. (c) of FIG. 31 shows main operations which are carried out by the PC and the TV before and after the TV-PC relay coordination process is carried out.

FIG. 32 is a diagram illustrating the embodiment of the present invention. (a) of FIG. 32 illustrates one example of a video image displayed on the display section before channels are switched. (b) of FIG. 32 illustrates one example of a video image displayed on the display section after the channels are switched. (c) of FIG. 32 shows main operations which are carried out by the PC and the TV before and after the channels are switched.

FIG. 33 is a flowchart showing one example of the PC-TV relay coordination process in the video image display system.

FIG. 34 is a flowchart showing one example of the TV-PC relay coordination process in the video image display system.

FIG. 35 is a flowchart showing one example of the PC-TV relay coordination process in another video image display system.

FIG. 36 is a flowchart showing one example of the TV-PC relay coordination process in the another video image display system.

FIG. 37(a) is a diagram illustrating a conventional art, which diagram illustrating one example of a video image displayed in the TV mode.

FIG. 37(b) is a diagram illustrating the conventional art, which diagram illustrating one example of a video image displayed on a display section in a case where a PC is stared up in the TV mode.

FIG. 37(c) is a diagram illustrating the conventional art, which diagram illustrating one example of a video image displayed in a case where an output of a display section is switched, in the TV mode.

REFERENCE SIGNS LIST

Figure 2:
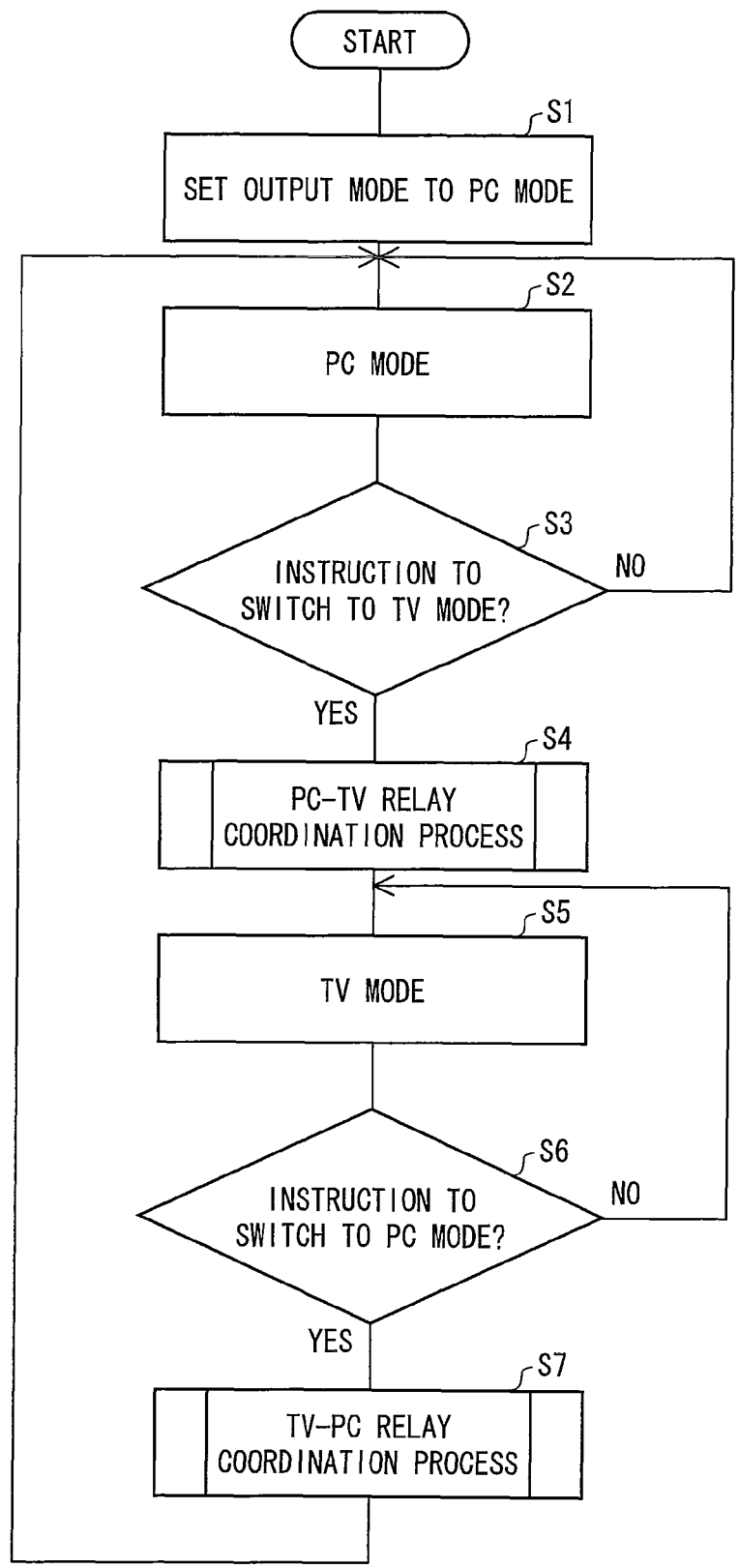
FIG. 2

1 Video image display system (Data output system)
11 PC (Data supply apparatus)
14 PC-side relay coordination control section (Relay coordination control means)
15 PC-side communication I/F (Currently-tuned broadcast program information receiving means)
16 One-segment broadcast tuner (second tuner)
18 Display output I/F (Broadcast program data transmitting means)
21 TV (Data output apparatus)
22 TV-side communication I/F (Currently-tuned broadcast program information receiving means and currently-tuned broadcast program information transmitting means)
23 PC input I/F (broadcast program receiving means)
24 TV-side relay coordination control section (output control means)
26 Digital tuner (first tuner)
27 Analog tuner (first tuner)
201 Video image display system (data display system)
211 PC (data supply apparatus)
214 PC-side relay coordination control section (relay coordination control means and switching signal transmitting means)
215 PC-side communication I/F (currently-tuned broadcast program information receiving section)
216 One-segment broadcast tuner (second tuner)
218 Display output I/F (data transmitting section)
219 PC event detection section (event detection means and e-mail display control means)
221 TV (display apparatus)
301 Video image display system (data display system)
311 PC (data supply apparatus)
314 PC-side relay coordination control section (relay coordination control means, switching signal transmitting means, and broadcast program switching information transmitting means)
315 PC-side communication I/F (currently-tuned broadcast program information receiving means)
316 One-segment broadcast tuner (second tuner)
318 Display output I/F (data transmitting means)
321 TV (display apparatus)

DESCRIPTION OF EMBODIMENTS

[First Embodiment]

The following describes one embodiment of the present invention, with reference to FIGS. 1 through 9. First, the following describes an overview of a video image display system of the present embodiment, with reference to FIG. 1. FIG. 1 is a block diagram illustrating an arrangement of a main part of a video image display system 1. As illustrated in FIG. 1, the video image display system 1 includes a PC 11 and a TV 21.

The PC 11 is a general-purpose computer. As illustrated in FIG. 1, the PC 11 includes a main control section 12, an auxiliary memory section 13, a PC-side relay coordination control section (relay coordination control means) 14, a PC-side communication I/F (currently-tuned broadcast program information receiving means) 15, a one-segment broadcast tuner 16, an image output control section 17, and a display output I/F (broadcast program data transmitting means) 18. The PC 11 includes, e.g., input devices such as a mouse and a keyboard although they are not illustrated. Accordingly, a user of the video image display system 1 can operate the PC 11 by use of the input devices.

The main control section 12 performs overall control of functions of the PC 11. As illustrated in FIG. 1, the main control section 12 includes a central processing section 12a and a main memory section 12b. The main memory section 12b includes a ROM (Read Only Memory) and a RAM (Random Access Memory) which are not illustrated. The ROM stores data minimally required for an operation of the PC 11, for example, program data of a BIOS (Basic Input Output System), program data of an OS (Operating System), and the like. The RAM functions as a working memory which is used in information processing which is carried out by the main control section 12.

That is, a function of the main control section 12 is realized in such a manner that the central processing section 12*a* performs program execution, computation, etc. by use of the RAM of the main memory section 12*b* as a working memory. In addition to illustrated components, the main control section 12 includes components, such as timer means (e.g., a clock), which are necessary for the central processing section 12*a* to perform program execution, a computation, etc.

The auxiliary memory section 13 is a device which is used for purposes such as supplement of a capacity of the main memory section 12*b*. The auxiliary memory section 13 stores a program, data, etc. which are necessary for an operation of the PC 11. The auxiliary memory section 13 can be any device which can store the program and data in such a manner that the program and data can be read out by the components of the PC 11 such as the main control section 12. For example, a hard disk or the like can be adopted as the auxiliary memory section 13. The auxiliary memory section 13 may be a storage medium which can be attached to and detached from the PC 11.

The PC-side relay coordination control section 14 controls switching between an output from a PC 11 and an output from a TV 21. In addition, the PC-side relay coordination control section 14 carries out a PC-TV relay coordination process and a TV-PC relay coordination process. In each of the processes, a broadcast program received by the one-segment broadcast tuner 16 is matched with a broadcast program received by the TV. Details of the processes are described later.

The PC-side communication I/F 15 is an interface for communication between the PC 11 and the TV 21. Specifically, as illustrated in FIG. 1, a relay coordination command etc. for matching a channel of the PC 11 with a channel of the TV 21 are transmitted via the PC-side communication I/F 15 to the TV 21. On the other hand, a channel code etc. to be described later are transmitted from the TV 21 to the PC-side communication I/F 15. In this Specification, the PC-side communication I/F 15 is assumed to be an HDMI (High-Definition Multimedia Interface) terminal.

A method for the communication between the PC 11 and the TV 21 is not particularly limited but may be a publicly-known communication method. For example, the communication between the PC 11 and the TV 21 can be enabled by use of RS232C, i.Link®, Bluetooth®, ZigBee®, Wi-Fi®, UWB (Ultra Wide Band), IrDA, or the like. The PC-side communication I/F 15 can be changed in accordance with a communication method.

The one-segment broadcast tuner 16 is a tuner for receiving a one-segment broadcast. Specifically, the one-segment broadcast tuner 16 demodulates an electric wave on a channel specified, by the PC-side relay coordination control section 14, among broadcast waves received by an antenna (not illustrated), thereby generating video data. Then, the one-segment broadcast tuner 16 transmits the video data thus generated to the image output control section 17.

The PC 11 has a tuner for receiving a broadcast, and the tuner is not limited to the one-segment broadcast tuner 16. However, video data outputted from the tuner of the PC 11 is outputted from the PC 11, together with data which is outputted from the PC 11, such as video data related to application software being executed by the main control section 12.

Therefore, from a viewpoint of those processing capabilities of the PC 11 and the TV 21 which are required for displaying video data, it is preferable that the video data to be outputted from the tuner of the PC 11 be small in data amount.

For this reason, the PC 11 preferably includes the one-segment broadcast tuner 16 for receiving a one-segment broadcast, which is smaller in data amount than a terrestrial digital broadcast. From this viewpoint, the tuner provided to the PC 11 may be one which receives mobile broadcasting, which is broadcasting for portable receivers. Further, the tuner provided to the PC 11 may be one which receives radio broadcasting. In this case, data such as a sound or the like of the radio broadcasting is outputted from a speaker (not illustrated) or the like of the TV 21.

The image output control section 17 carries out predetermined image processing on the video data received from the one-segment broadcast tuner 16, and then, transmits the video data to the display output I/F 18. Specifically, since the video data is encoded by a predetermined method (e.g., MPEG-2, H.264, or the like), the image output control section 17 decodes the video data, and transmits the video data to the display output I/F 18.

The display output I/F 18 is an interface for transmitting, to the TV 21, data to be outputted by the TV 21, such as the video data received from the image output control section 17. Hereinafter, the data to be transmitted from the display output I/F 18 to the TV 21 is referred to as PC output data. The display output I/F 18 is not particularly limited, provided that the video data can be transmitted from the display output I/F 18 to the TV 21. As is the case with the PC-side communication I/F 15, the display output I/F 18 can be modified in various ways according to a method for transmitting the video data. Although FIG. 1 illustrates the display output I/F 18 and the PC-side communication I/F 15 as separate blocks for explanation, the display output I/F 18 and the PC-side communication I/F 15 may be integrated into one.

The TV 21 is an apparatus for receiving a broadcast wave so as to display a video image. As illustrated in FIG. 1, the TV 21 includes a TV-side communication I/F (currently-tuned broadcast program information receiving means and currently-tuned broadcast program information transmitting means) 22, a PC input I/F (broadcast program receiving means) 23, a TV-side relay coordination control section (output control means) 24, a memory section 25, a digital tuner (first tuner) 26, an analog tuner (first tuner) 27, an output switching section 28, an image processing control section 29, and a display section 30.

The TV-side communication I/F 22 is an interface for communicating with the PC 11. The PC input I/F 23 is an interface for receiving video data etc. outputted from the PC 11. The TV-side communication I/F 22 and the PC input I/F 23 are arranged so as to communicate with the PC-side communication I/F 15 and the display output I/F 18, respectively.

The TV-side relay coordination control section 24 controls switching between an output from the PC 11 and an output from the TV 21. In addition, the TV-side relay coordination control section 24 carries out a PC-TV relay coordination process and a TV-PC relay coordination process. In each of the processes, a broadcast program which is received by the one-segment broadcast tuner 16 is matched with a broadcast program which is received by the digital tuner 26 or by the analog tuner 27. Details of the processes are described later.

The memory section 25 is a device for storing a program, data, etc. which are necessary for an operation of the TV 21. The memory section 25 is a component which can store the program and data so that components of the TV 21, such as the TV-side relay coordination control section 24, may read out the program and data. The memory section 25 includes a channel memory for storing channel information indicative of (i) a channel at which the digital tuner 26 or the analog tuner 27 is receiving a broadcast or (ii) a channel at which the digital tuner 26 or the analog tuner 27 has last received a broadcast.

The digital tuner 26 is a tuner for receiving a terrestrial digital broadcast. The analog tuner 27 is a tuner for receiving a terrestrial analog broadcast. Hereinafter, the digital tuner 26 and the analog tuner 27 are referred to as TV-side tuners. In addition, data received by a TV-side tuner is referred to as TV-received data. The TV-side tuners demodulates an electric wave on a channel specified by the TV-side relay coordination control section 24, among broadcast waves received by an antenna (not illustrated), thereby generating video data. Then, the TV-side tuner transmits the video data thus generated to the output switching section 28.

Although the present embodiment shows an example in which the TV 21 includes the two tuners: the digital tuner 26 and the analog tuner 27, the TV 21 sufficiently has at least one tuner for receiving a broadcast. The TV-side tuners are not limited to a tuner for receiving a terrestrial digital broadcast and a tuner for receiving a terrestrial analog broadcast. For example, a TV-side tuner may be a BS tuner or a CS tuner.

The output switching section 28 is component for switching data to be outputted to the display section 30. Specifically, in accordance with an instruction from the TV-side relay coordination control section 24, the output switching section 28 transmits, to the image processing control section 29, either the TV-received data being received by a TV-side tuner or PC output data being received by the PC input I/F 23.

The image processing control section 29 carries out predetermined image processing on the video data received from the output switching section 28, and then, outputs the video data to the display section 30. By the image processing performed the image processing control section 29, the video data received from the output switching section 28 is caused to be displayable on the display section 30.

The display section 30 is an apparatus for displaying an image, and displays a video image in accordance with the data received from the image processing control section 29. The display section 30 can be, e.g., a CRT (Cathode Ray Tube) display apparatus, an LC (Liquid Crystal) display apparatus, an EL (Electro Luminescence) display apparatus, or the like.

Although the present embodiment describes only outputting of an (video) image for the same of easy explanation, data such as a sound is also outputted in the same manner as the video image. For example, in a case where data such as sound data is transmitted from the PC 11 to the TV 21 while the output switching section 28 is configured to output data received from the PC 11 (i.e., set to a PC mode), the sound data is outputted from a speaker (not illustrated) provided to the TV 21. On the other hand, in a case where the output switching section 28 is configured to output the TV-received data (i.e., set to a TV mode), the sound data contained in the TV-received data is outputted from the speaker.

[Flow of Video Image Display Processing]

The following describes a flow of video image display processes of the video image display system 1, with reference to FIG. 2. FIG. 2 is a flowchart showing one example of the video image display processes. As shown in FIG. 2, the example assumes that an output mode is set to the PC mode first (S1). The PC mode refers to a state in which a video signal (PC output data) transmitted from the PC 11 is outputted to the display section 30.

A method for setting an output mode to the PC mode is not particularly limited but is such that, for example, the PC mode is selected when power of the PC 11 is turned on. Specifically, an OS is started up at a start-up of the PC 11. Therefore, for example, if the PC-side relay coordination control section 14 detected that the OS is started up, the PC-side relay coordination control section 14 transmits, to the TV 21 via the PC-side communication I/F 15, a PC mode switching signal for instructing that an output from the TV 21 be switched to an output from the PC 11.

In a case where the PC 11 is started up before the PC mode is selected, and the PC-side relay coordination control section 14 detects a predetermined input operation of an input device such as a mouse and a keyboard, the PC-mode switching signal is transmitted to the TV 21 via the PC-side communication I/F 15. The arrangement in which an output mode is set to the PC mode upon a user's input operation related to use of the PC 11 allows the user to smoothly switch to the PC mode. Also, an output mode may be set to the PC mode in a case where, for example, a predetermined input operation for switching to the PC mode is performed (e.g., a predetermined switching button is pressed).

After an output mode is set to the PC mode (S2), the display section 30 functions as a display apparatus of the PC 11. That is, in the PC mode, PC output data outputted via the display output I/F 18 of the PC 11 is displayed on the display section 30. Specifically, a video image etc. generated by various application programs executed on the PC 11 are displayed on the display section 30.

The PC-side relay coordination control section 14 may output data indicating that the output is in the PC mode, when the PC-mode is selected. For example, as illustrated in FIG. 3, the following text "PC mode has been selected" is displayed on the display section 30. This allows a user to recognize that the output is in the PC mode. The data indicating that the output is in the PC mode is stored in the auxiliary memory section 13 in advance, for example. Then, the PC-side relay coordination control section 14 for example, reads out the data and transmits the data to the TV 21 via the display output I/F 18, when the PC-mode switching signal is transmitted to the TV 21.

The information indicating that the output is in the PC mode is not particularly limited but can be anything, provided that a user can recognize that the output is in the PC mode. For example, a sound or the like may be used to notify a user that the output is in the PC mode.

In the PC mode, the PC-side relay coordination control section 14 checks whether or not an instruction to switch to the TV mode is issued (S3). The TV mode refers to a state in which the TV-received data is outputted to the display section 30. Once the output mode is set to the PC mode, the PC mode continues until the PC-side relay coordination control section 14 determines that the instruction to switch to the TV mode is issued.

A method for setting an output mode to the TV mode is not particularly limited. For example, the PC-side relay coordination control section 14 determines that the instruction to switch to the TV mode is issued, in a case where a selection operation is performed, by use of an input device such as a mouse, on that video image of a broadcast received by the PC-side tuner which is displayed on the display section 30. Alternatively, the PC-side relay coordination control section 14 may determine that the instruction to switch to the TV mode is issued, in a case where, for example, a predetermined input operation for switching to the TV mode is performed (e.g., a predetermined switching button is pressed).

Alternatively, the PC-side relay coordination control section 14 may switch the PC mode to the TV mode, on the basis of content of a broadcast program being received by the PC-side tuner. For example, the PC-side relay coordination control section 14 may switch the PC mode to the TV mode in a case where the PC-side relay coordination control section 14 determines that a broadcast program being received by the PC-side tuner is an emergency broadcast. Accordingly, the emergency broadcast is displayed on an entire surface of the display section 30. As a result, a user does not miss the emergency broadcast.

In general, a sound volume increases in a scene of a climax of a broadcast program (e.g., in a scoring scene of a sport program). In view of this, the PC-side relay coordination control section 14 may switch the PC mode to the TV mode in a case where a sound volume of a broadcast program being received by the PC-side tuner exceeds a predetermined value. As a result, a user can watch the broadcast program in the TV mode, without missing a scene of a climax of the broadcast program.

If the PC-side relay coordination control section 14 determines that the instruction to switch to the TV mode is issued (YES in S3), the PC-side relay coordination control section 14 carries out the PC-TV relay coordination process (S4). By carrying out the PC-TV relay coordination process, the PC mode is switched to the TV mode. As a result, the TV-received data is displayed on the display section 30.

Figure 4:
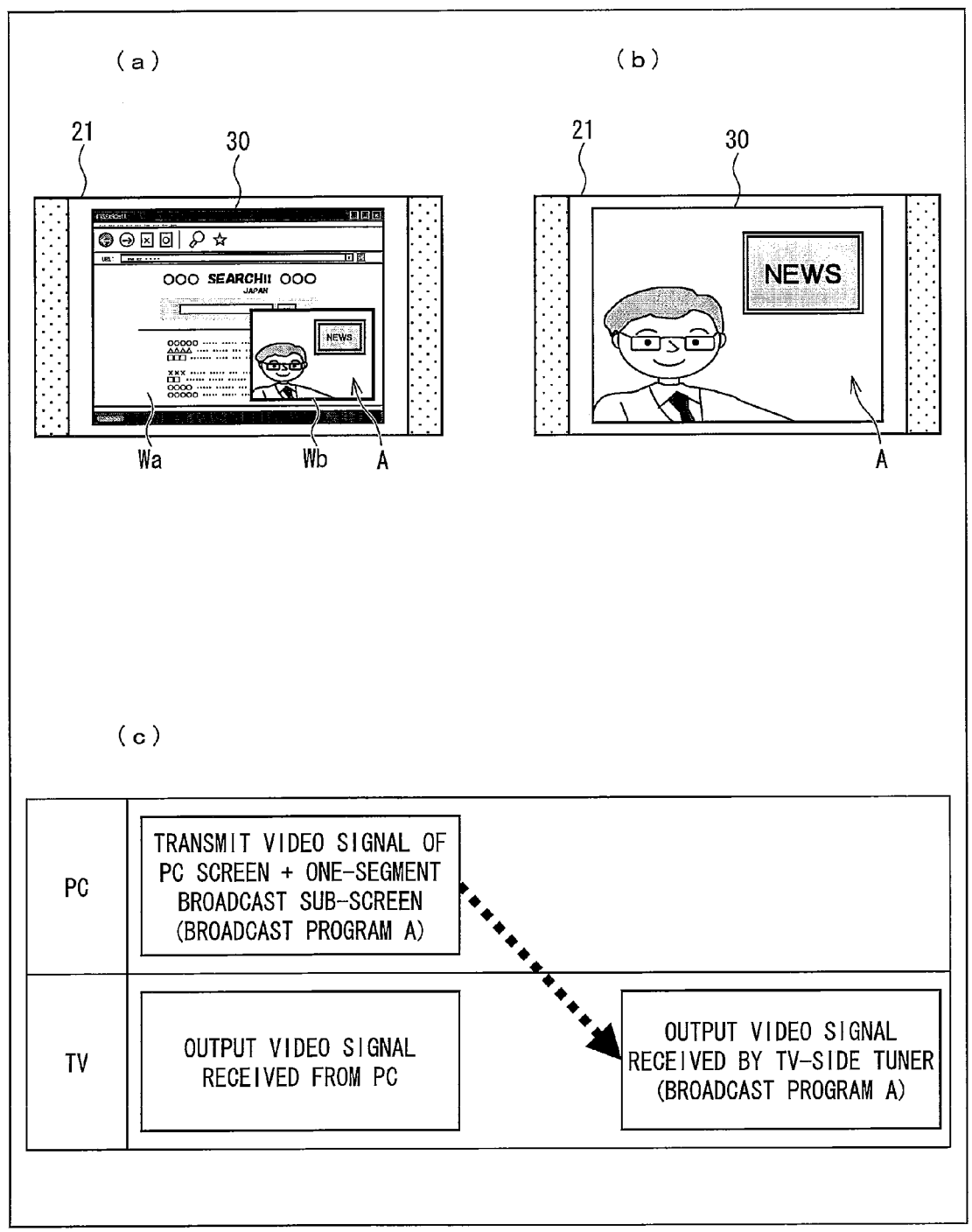
FIG. 4

With reference to FIG. 4, the following describes a transition between video images which are displayed on the display section 30 before and after the PC-TV relay coordination process is carried out. (a) of FIG. 4 is a diagram illustrating one example of a video image which is displayed on the display section 30 before the PC-TV relay coordination process is carried out. (b) of FIG. 4 is a diagram illustrating one example of a video image which is displayed on the display section 30 after the PC-TV relay coordination process is carried out. (c) of FIG. 4 is a diagram showing those main operations of the PC 11 and the TV 21 which are carried out before and after the PC-TV relay coordination process is carried out.

As illustrated in (a) of FIG. 4, windows Wa and Wb are displayed on the display section 30 before the PC-TV relay coordination process is carried out, i.e., in the PC mode. The window Wa is displayed in such a manner that the PC 11 executes a program. In the illustrated example, a web page is displayed in the window Wa. On the other hand, a one-segment broadcast received by the one-segment broadcast tuner 16 is displayed in the window Wb. The example assumes that a one-segment broadcast of a broadcast program A is received by the one-segment broadcast tuner 16. Accordingly, in the PC mode, the one-segment broadcast of the broadcast program A is displayed in the window Wb, as illustrated in (a) of FIG. 4.

In this case, as shown in (c) of FIG. 4, the PC 11 outputs a video signal of a PC screen (window Wa) and a video signal of a one-segment broadcast sub-screen (window Wb). The TV 21 outputs the video signals received from the PC 11. As a result, a video image as illustrated in (a) of FIG. 4 is displayed on the display section 30.

After the PC-TV relay coordination process is carried out, a video image of the broadcast program A is displayed on the display section 30, as illustrated in (b) of FIG. 4. As shown in (c) of FIG. 4, the PC 11 does not output any video signal at this stage. On the other hand, the TV 21 outputs a video signal received by a TV-side tuner (the digital tuner 26 or the analog tuner 27). That is, in the case of (a) of FIG. 4, the broadcast program A received by the one-segment tuner 16 of the PC 11 is displayed on the display section 30 while, in the case of (b) of FIG. 4, the broadcast program A received by the TV-side tuner is displayed on the display section 30.

As described above, in the video image display system 1, carrying out the PC-TV relay coordination process allows the broadcast program displayed on the display section 30 to remain the same even though the PC mode is switched to the TV mode. As a result, even though the PC mode is switched to the TV mode, a user can continuously watch the same broadcast program as before the switching, without being interrupted.

If the output mode is set to the TV mode (S5), the display section 30 functions as a display apparatus of the TV 21. That is, in this case, a video image outputted from the TV-side tuner is displayed on the display section 30. Specifically, displayed on the display section 30 is that video image of a digital broadcast which is outputted from the digital tuner 26, that video image of an analog broadcast which is outputted from the analog tuner 27, or the like.

Also in the TV mode, the PC-side relay coordination control section 14 determines whether or not an instruction to switch to the PC mode is issued (S6). That is, in the video image display system 1 of the present embodiment, the PC-side relay coordination control section 14 determines both whether or not to switch the TV mode to the PC mode and whether or not to switch the PC mode to the TV mode. The TV mode continues until the PC-side relay coordination control section 14 determines that the instruction to switch to the PC mode is issued. In the TV mode, a user can select a channel to be received by the TV 21, by use of an input device such as a remote control.

Figure 5:
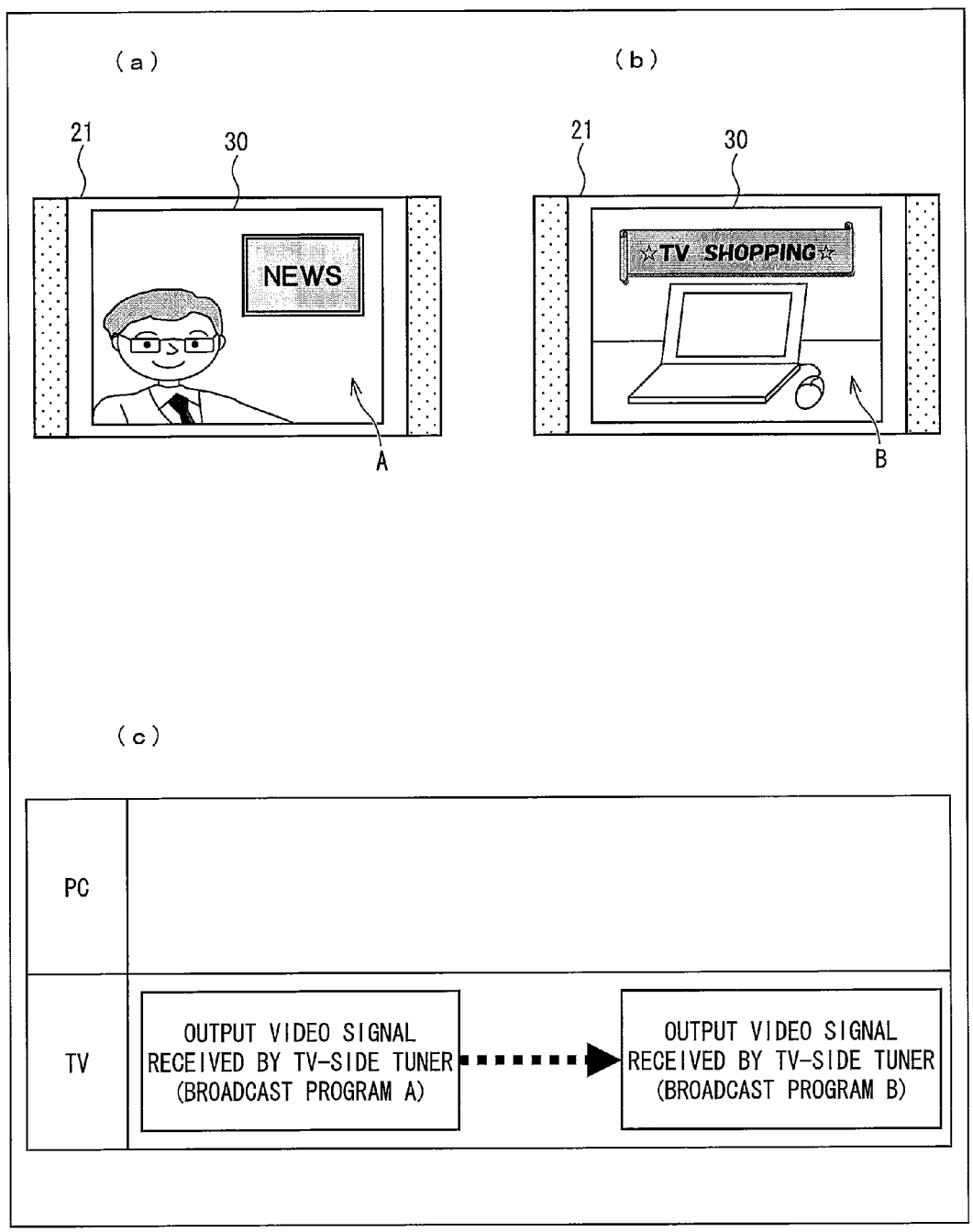
FIG. 5

With reference to FIG. 5, the following describes a transition between video images which are displayed on the display section 30 before and after channels are switched in the TV mode. (a) of FIG. 5 is a diagram illustrating one example of a video image which is displayed on the display section 30 before the channels are switched. (b) of FIG. 5 is a diagram illustrating one example of a video image which is displayed on the display section 30 after the channels are switched. (c) of FIG. 5 is a diagram showing those main operations of the PC 11 and the TV 21 which are carried out before and after the channels are switched.

As illustrated in (a) of FIG. 5, the broadcast program A is displayed on the display section 30 before the channels are switched. The broadcast program A is a broadcast program received by the TV-side tuner. As illustrated in (b) of FIG. 5, a broadcast program B is displayed on the display section 30 after the channels are switched. That is, FIG. 5 assumes that the channels are switched so that the broadcast program A is switched to the broadcast program B.

As shown in (c) of FIG. 5, the PC 11 does not output any video signal before and after the channel are switched. On the other hand, the TV 21 outputs a video signal of the broadcast program A before the channels are switched, and outputs a video signal of the broadcast program B after the channels are switched. As a result, the video images as illustrated in (a) and (b) of FIG. 5 are displayed on the display section 30. As described above, the PC 11 is not involved in the channel switching carried out in the TV mode, and the video images which are displayed on the display section 30 are switched by the process carried out in the TV 21.

A mode switching button for switching between the PC mode and the TV mode is provided onto a surface of a main body of the PC 11, to a remote control for operating the PC 11 and/or the TV 21, or to the like.

If the PC-side relay coordination control section 14 determines that the instruction to switch to the TV mode is issued (Yes in S6), the PC-side relay coordination control section 14 carries out the TV-PC relay coordination process (S7). By carrying out the TV-PC relay coordination process, the TV mode is switched to the PC mode. As a result, data outputted from the PC 11 is displayed on the display section 30.

Figure 6:
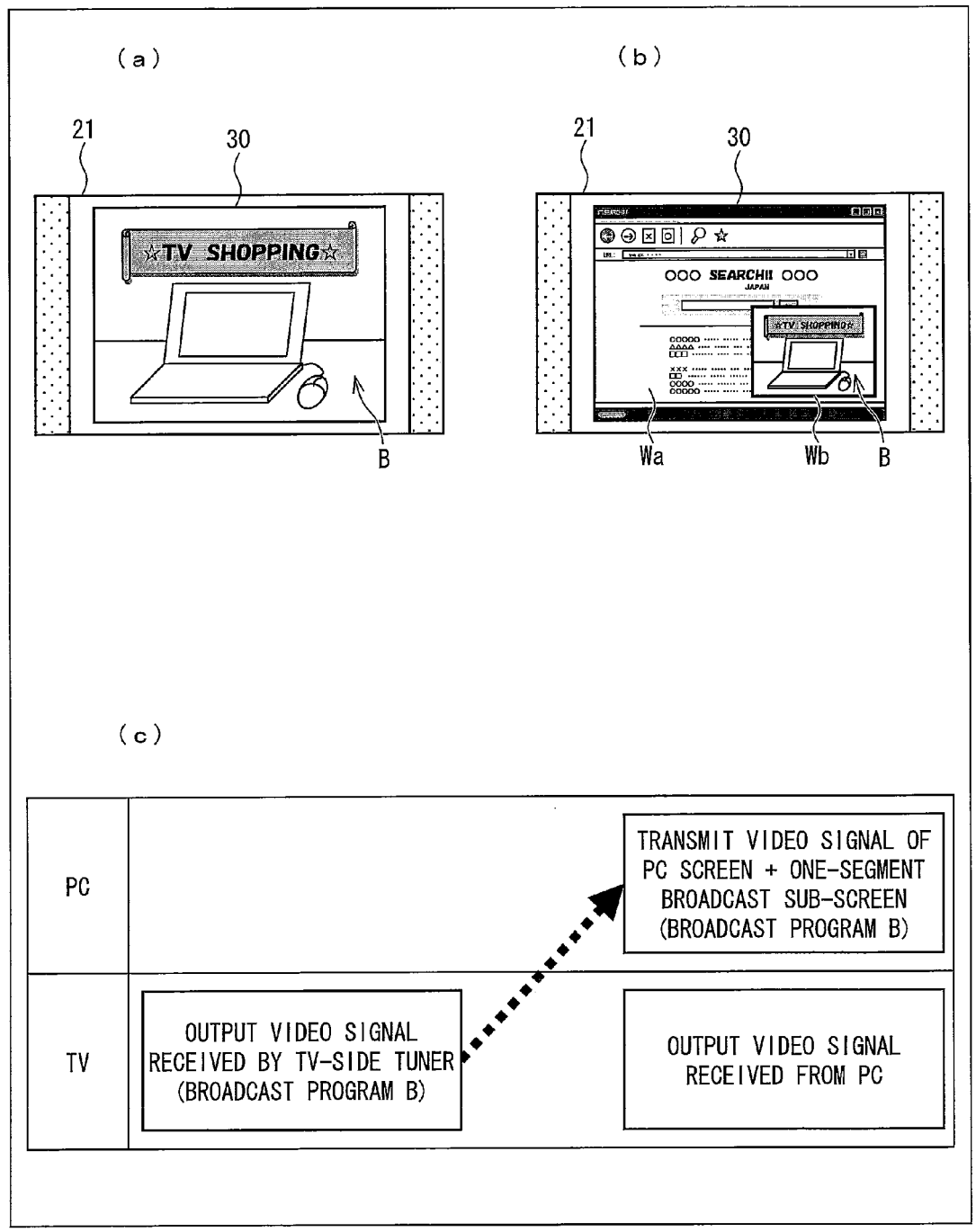
FIG. 6

With reference to FIG. 6, the following describes a transition between video images which are displayed on the display section 30 before and after the TV-PC relay coordination process. (a) of FIG. 6 is a diagram illustrating one example of a video image which is displayed on the display section 30 before the TV-PC relay coordination process is carried out. (b) of FIG. 6 is a diagram illustrating one example of a video image which is displayed on the display section 30 after the TV-PC relay coordination process is carried out. (c) of FIG. 6 is a diagram showing those main operations of the PC 11 and the TV 21 which are carried out before and after the TV-PC relay coordination process is carried out.

As illustrated in (a) of FIG. 6, displayed on the display section 30 before the TV-PC relay coordination process is carried out is that video image of the broadcast program B which is outputted from the TV-side tuner. After the TV-PC relay coordination process is carried out, the windows Wa and Wb are displayed on the display section 30, as illustrated in (b) of FIG. 6. As illustrated in (b) of FIG. 6, the video image of the broadcast program B is displayed in the window Wb.

As shown in (c) of FIG. 6, while the video image illustrated in (a) of FIG. 6 is displayed on the display section 30, the PC 11 does not output any video signal, and the TV 21 outputs the video signal of the broadcast program B received by the TV-side tuner. On the other hand, while the video image illustrated in (b) of FIG. 6 is displayed on the display section 30, the PC 11 outputs the video signal of the PC screen (window Wa) and also outputs a video signal of the one-segment broadcast sub-screen (window Wb). In this case, a video image which is displayed in the window Wb is that of a one-segment broadcast of the broadcast program B. The TV 21 outputs the video signals received from the PC 11.

As described above, in the video image display system 1, carrying out the TV-PC relay coordination process allows a broadcast program displayed on the display section 30 to remain the same even though the TV mode is switched to the PC mode. As a result, even though the TV mode is switched to the PC mode, a user can continuously watch the same broadcast program as before the switching, without being interrupted.

Figure 7:
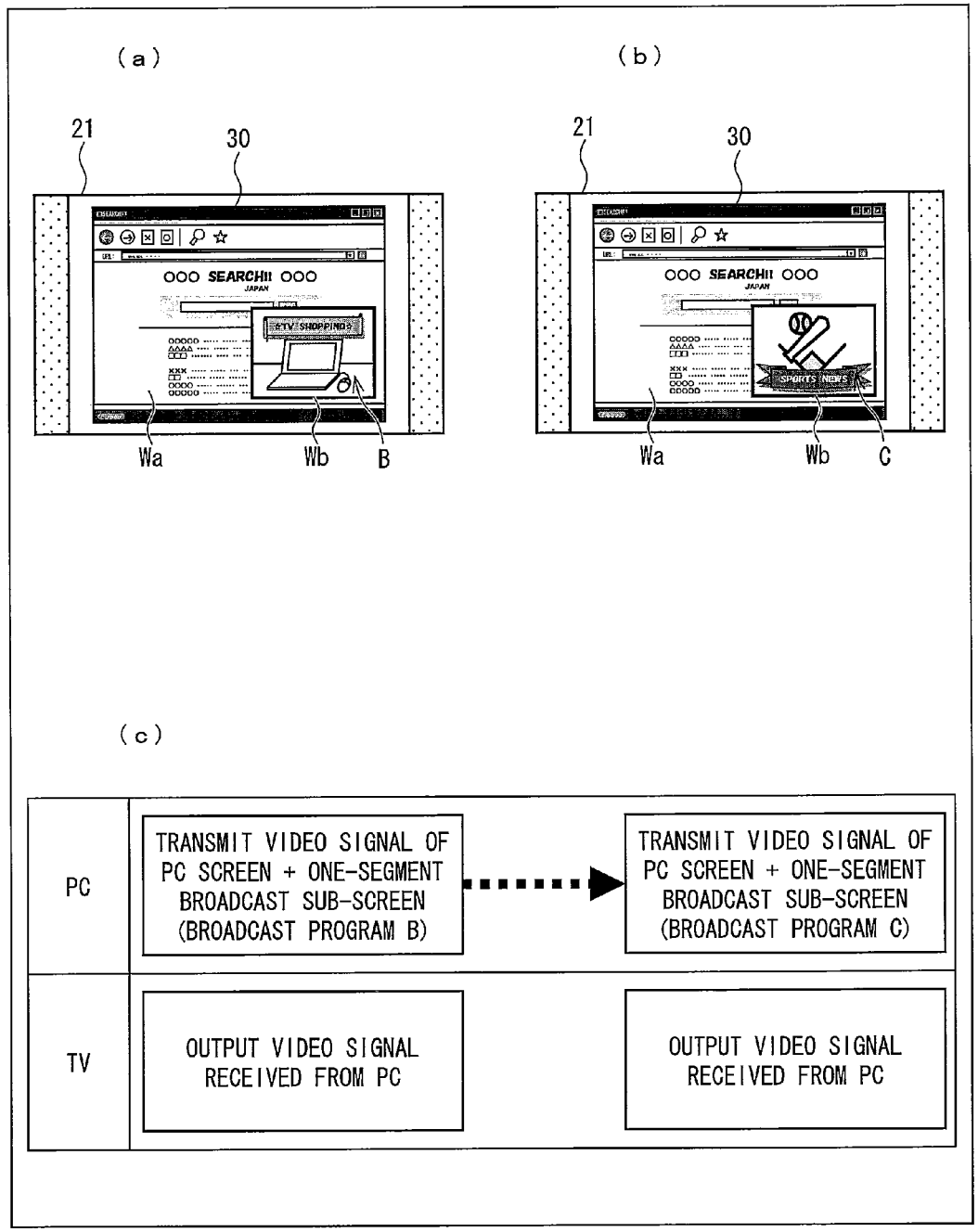
FIG. 7

After the TV-PC relay coordination process is completed, processing returns to S2. Accordingly, the video image display system 1 enters the PC mode again. With reference to FIG. 7, the following describes a transition between video images which are displayed on the display section 30 before and after channels are switched in the PC mode. (a) of FIG. 7 is a diagram illustrating one example of a video image which is displayed on the display section 30 before the channels are switched. (b) of FIG. 7 is a diagram illustrating one example of a video image which is displayed on the display section 30 after the channels are switched. (c) of FIG. 7 is a diagram showing those main operations of the PC 11 and the TV 21 which are carried out before and after the channel are switched.

As illustrated in (a) of FIG. 7, before the channel are switched, the windows Wa and Wb are displayed on the display section 30, and the broadcast program B is displayed in the window Wb. The broadcast program B is a broadcast program received by the one-segment broadcast tuner 16 of the PC 11.

As illustrated in (b) of FIG. 7, after the channels are switched, the windows Wa and Wb are displayed on the display section 30, and a broadcast program C is displayed in the window Wb. That is, FIG. 7 assumes that the channels are switched so that the broadcast program B is switched to the broadcast program C. The channel switching in the PC mode is assumed to be carried out in a case where a user performs a predetermined input operation of an input device of the PC 11, such as a mouse and a keyboard.

In this case, as shown in (c) of FIG. 7, the TV 21 does not output any video signal received from the TV-side tuner but outputs a video signal received from the PC 11. On the other hand, before the channel switching, the PC 11 outputs a video signal of the PC screen and a video signal of the sub-screen showing the broadcast program B. After the channel switching, the PC 11 outputs the video signal of the PC screen and a video signal of the sub-screen showing the broadcast program C. As a result, the video images as illustrated in (a) and (b) of FIG. 7 are displayed on the display section 30. As described above, the TV-side tuner is not involved in the channel switching in the PC mode, and video images which are displayed on the display section 30 are switched by the process carried out in the PC 11.

[PC-TV Relay Coordination Process]

Figure 8:
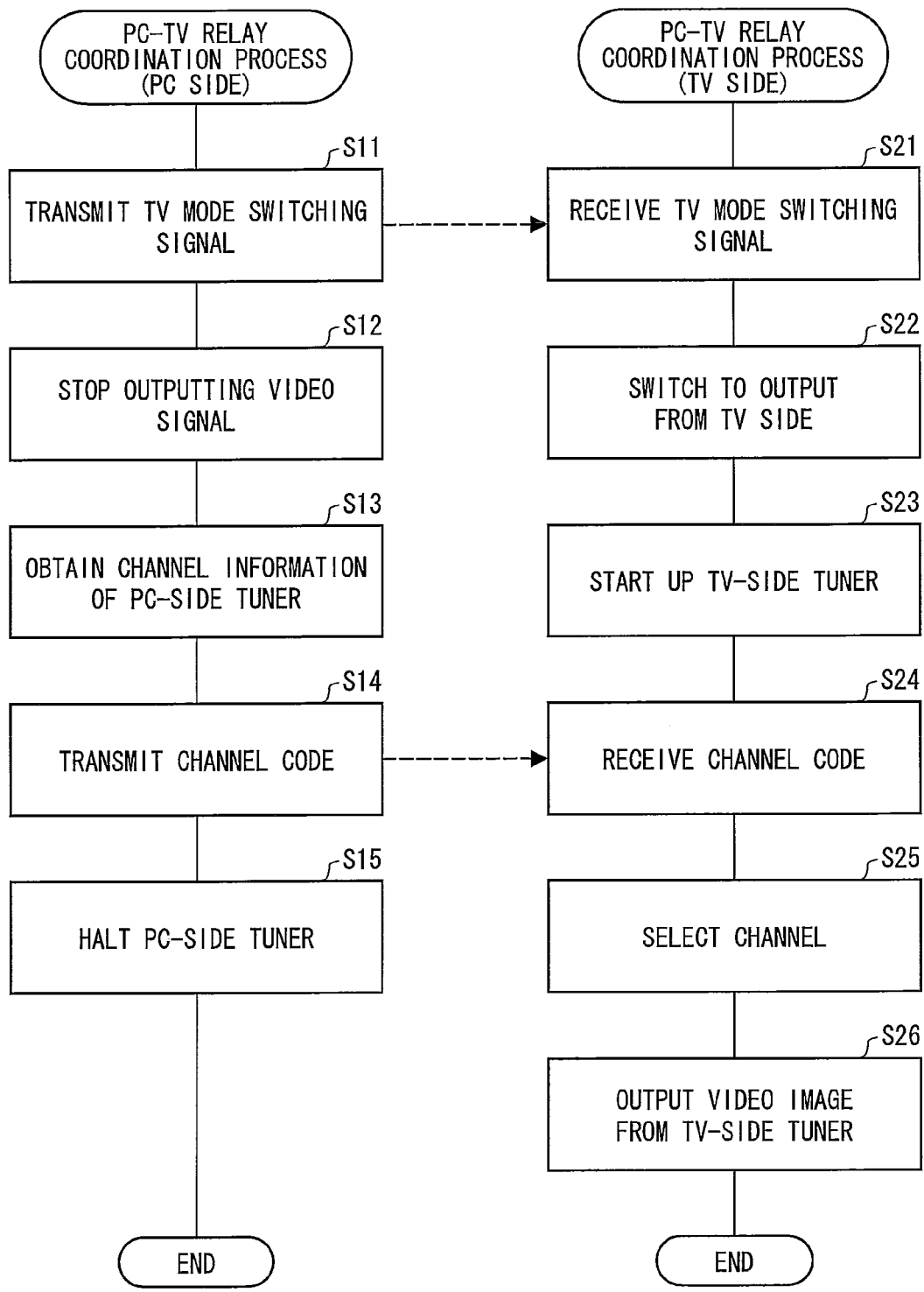
FIG. 8

With reference to FIG. 8, the following describes a flow of the PC-TV relay coordination process illustrated in the flowchart of FIG. 2. FIG. 8 is a flowchart showing one example of the PC-TV relay coordination process. The following first describes a processing flow on the PC 11 side. As described above, the PC-TV relay coordination process is carried out in a case where the PC-side relay coordination control section 14 determines that the instruction to switch to the TV mode is issued.

If the PC-side relay coordination control section 14 finds that the instruction is issued, the PC-side relay coordination control section 14 transmits, to the TV 21 via the PC-side communication I/F 15, a TV mode switching signal (switching notification information) for switching an output of the TV 21 to that of the TV mode (S11). Then, the PC-side relay coordination control section 14 halts outputting of a video signal from the display output I/F 18, i.e., halts outputting of the PC output data (S12).

Then, the PC-side relay coordination control section 14 obtains channel information of the PC-side tuner, i.e., of the one-segment broadcast tuner 16 (S13), and transmits a PC-side channel code to the TV 21 via the PC-side communication I/F 15 (S14). Then, the PC-side relay coordination control section 14 transmits a halt instruction to the one-segment broadcast tuner 16 so that the one-segment broadcast tuner 16 stops the broadcast reception (S15).

The following describes the channel information and the PC-side channel code. The channel information is information indicative of a channel at which the one-segment broadcast tuner 16 is receiving a broadcast. The channel information is stored in the auxiliary memory section 13, and is updated every time channels are switched. As a result, the auxiliary memory section 13 always stores channel information indicative of a channel at which the one-segment broadcast tuner 16 is receiving the broadcast. The channel information may be stored anywhere, provided that the PC-side relay coordination control section 14 can read out the channel information. For example, a memory section may be provided to the one-segment broadcast tuner 16 so that the one-segment broadcast tuner 16 may store and update the channel information.

The PC-side channel code (broadcast program switching information) is a code indicative of a channel at which the PC-side tuner is receiving the broadcast, and is information for allowing the TV-side tuner to receive the broadcast at the channel at which the PC-side tuner is receiving the broadcast. In some cases, the PC-side tuner and the TV-side tuner would receive the same broadcast program at different channels, respectively. For example, a channel of the one-segment broadcasting to receive a broadcast program A can differ from a channel of the terrestrial digital broadcasting to receive the broadcast program A.

In such a case, the PC-side relay coordination control section 14 determines a TV-side channel corresponding to a channel at which the PC-side tuner is receiving the broadcast. The PC-side relay coordination control section 14 determines the TV-side channel on the basis of channel correspondence information which indicates correspondence relations between channels of the PC-side tuner and channels of the TV-side tuner. Then, the PC-side relay coordination control section 14 transmits the determined channel, as a PC-side channel code, to the TV 21 via the PC-side communication I/F 15.

A broadcast wave which is received by the PC-side tuner is different from a broadcast wave which is received by the TV-side tuner. Therefore, a broadcast program which is received by the PC-side tuner and a broadcast program which is received by the TV-side tuner do not have to be identical with each other, that is, can be broadcast programs containing the same content or containing mutually-related content. For example, since broadcast programs of the one-segment broadcasting and broadcast programs of the terrestrial digital broadcasting correspond to each other, a broadcast program to be received on the PC-side tuner can be one corresponding to a broadcast program having been received on the TV-side tuner, and vice versa. Further, for example, in a case where a user watches a live broadcast of a game of a sport which is broadcasted by a certain broadcast station, a broadcast program to be outputted after switching the output modes does not necessarily have to be a broadcast program being broadcasted by the same broadcast station, provided that the broadcast program to be outputted is a broadcast program of a live broadcast of the game.

The channel correspondence information can be referred to by the PC-side relay coordination control section 14. For example, the channel correspondence information may be stored in the auxiliary memory section 13 as table data. In a case where the channel correspondence information is contained in a broadcast wave received by the PC-side tuner, the PC-side relay coordination control section 14 may read out the channel correspondence information from the broadcast wave (i.e., from data outputted from the PC-side tuner).

Further, a PC-side channel code can be determined from the channel information, without use of the channel correspondence information. For example, in a case where the PC-side tuner and the TV-side tuner can receive a same broadcast program on a same channel, the PC-side relay coordination control section 14 can transmit the channel information to the TV 21, as it is, as a PC-side channel code, without using the channel correspondence information. Also in a case where the channel information is a broadcast program code indicating a broadcast program being received by the PC-side tuner or is a broadcast station code indicating a broadcast station of a broadcast program being received, the PC-side relay coordination control section 14 can transmit the channel information to the TV 21, as it is, as a PC-side channel code.

The following describes a processing flow on the TV side. The TV mode switching signal transmitted by the PC-side relay coordination control section 14 via the PC-side communication I/F 15 is transmitted to the TV-side relay coordination control section 24 via the TV-side communication I/F 22. After receiving the TV mode switching signal (S21), the TV-side relay coordination control section 24 instructs the output switching section 28 to switch an output to be supplied to the display section 30, to an output of the TV-side tuner (S22), and starts up the TV-side tuner (starts up the digital tuner 26 or the analog tuner 27) (S23).

In S14 which is a process on the PC side, a channel code (PC-side channel code) is transmitted to the TV 21 via the PC-side communication I/F 15. The transmitted PC-side channel code is received by the TV-side relay coordination control section 24 via the TV-side communication I/F 22. After receiving the PC-side channel code (S24), the TV-side relay coordination control section 24 determines a channel in accordance with the received PC-side channel code (S25). Specifically, the TV-side relay coordination control section 24 causes the TV-side tuner to receive a broadcast program indicated by the PC-side channel code.

As a result, the broadcast program received by the TV-side tuner is transmitted to the output switching section 28 as a video signal. As described above, in S22, the output switching section 28 switches, to the output of the TV-side tuner, the output to be supplied to the display section 30. Accordingly, the video signal is transmitted through the output switching section 28, and is subjected to predetermined image processing in the image processing control section 29. Finally, the video signal is outputted to the display section 30 (S26).

The instruction to switch the outputs can be issued to the output switching section 28 anytime before S26 and after S21. According to the flowchart of FIG. 8, no video image is displayed on the display section 30 during a time period before S26 in which a video image from the TV-side tuner is displayed and after S22 in which the output to be supplied to the display section 30 is switched to the output from the TV 21. In view of this, for example, the PC-side relay coordination control section 14 carries out S12 in which outputting of a video signal is halted, after S15 is carried out in which the PC-side tuner is halted. Accordingly, the TV-side control section 24 issues, to the output switching section 28, the instruction to switch the outputs, immediately before a video image from the TV-side tuner is outputted in S26. This makes it possible to reduce or eliminate the time period in which no video image is displayed on the display section 30.

[TV-PC Relay Coordination Process]

Figure 9:
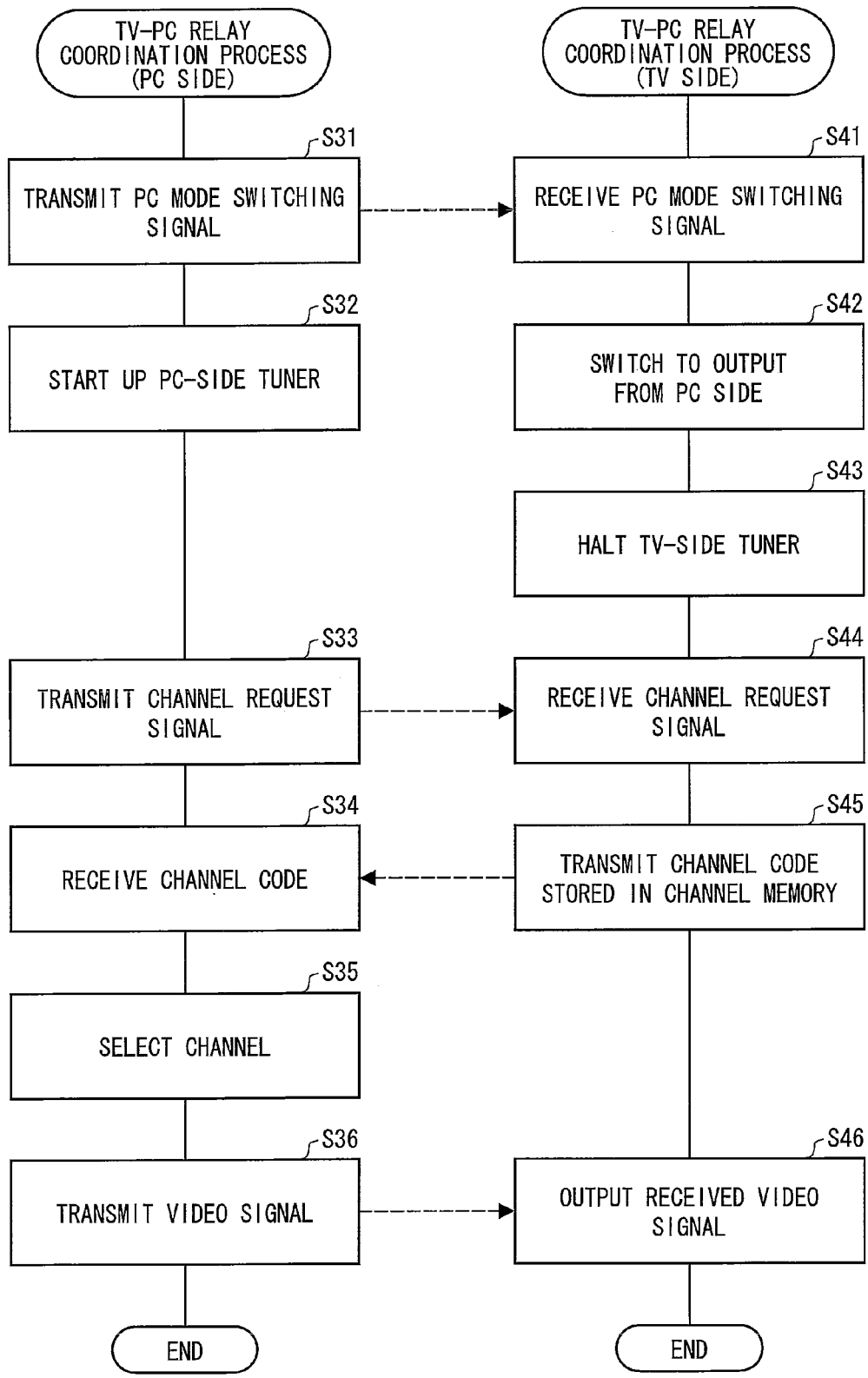
FIG. 9

With reference to FIG. 9, the following describes a flow of the TV-PC relay coordination process illustrated in the flowchart of FIG. 2. FIG. 9 is a flowchart illustrating one example of the TV-PC relay coordination process. The following first describes a processing flow on the PC side. As described above, the TV-PC relay coordination process is carried out in a case where the PC-side relay coordination control section 14 determines that the instruction to switch to the PC mode is issued.

If the PC-side relay coordination control section 14 finds that the instruction is issued, the PC-side relay coordination control section 14 transmits a PC mode switching signal to the TV 21 via the PC-side communication I/F 15 (S31). Further, the PC-side relay coordination control section 14 starts up the PC-side tuner, i.e., the one-segment broadcast tuner 16 (S32).

Then, the PC-side relay coordination control section 14 transmits a channel request signal (currently-tuned broadcast program request information) to the TV 21 via the PC-side communication I/F 15 (S33). The channel request signal is a signal for requesting that information which channel is being selected to watch a broadcast program on the TV 21 be transmitted to the PC 11. In response to the transmission of the channel request signal, the TV 21 transmits, via the TV-side communication I/F 22 and the PC-side communication I/F 15, a TV-side channel code (currently-tuned broadcast program information) indicating the channel of the broadcast program being watched on the TV 21.

After receiving the channel code (TV-side channel code) (S34), the PC-side relay coordination control section 14 determines a channel in accordance with the received TV-side channel code (S35). Specifically, the PC-side relay coordination control section 14 causes the PC-side tuner to receive the broadcast program indicated by the TV-side channel code. It follows that the broadcast program received by the PC-side tuner is transmitted to the image output control section 17 as a video signal so as to be subjected to predetermined processing, and then, the video signal is transmitted to the TV 21 via the display output I/F 18 (S36).

The following describes a processing flow on the TV side. The PC mode switching signal, transmitted from the PC-side relay coordination control section 14 to the TV 21 via the PC-side communication I/F 15, is received by the TV-side relay coordination control section 24 via the TV-side communication I/F 22. After receiving the PC mode switching signal (S41), the TV-side relay coordination control section 24 instructs the output switching section 28 to switch, to the output of the PC input I/F 23, the output to be supplied to the display section 30 (S42). Then, the TV-side relay coordination control section 24 halts the operation of the TV-side tuner (S43).

As described above, the channel request signal is transmitted to the TV 21 via the PC-side communication I/F 15 in S33, which is a process on the PC side. Accordingly, the channel request signal is received by the TV-side relay coordination control section 24 via the TV-side communication I/F 22. After receiving the channel request signal (S44), the TV-side relay coordination control section 24 reads out a TV-side channel code from the channel memory of the memory section 25, and transmits the TV-side channel code to the PC 11 via the TV-side communication I/F 22 (S45).

The TV-side channel code is a code indicating a channel at which the TV-side tuner is receiving a broadcast, and is stored in the channel memory of the memory section 25. As described above, the channel to receive the same broadcast program can differ between the PC-side tuner and the TV-side tuner.

In such a case, the PC-side relay coordination control section 14 determines a PC-side channel corresponding to a received TV-side channel code, on the basis of the channel correspondence information which indicates correspondence relations between channels of the PC-side tuner and channels of the TV-side tuner.

In a case where the PC-side tuner and the TV-side tuner can receive the same broadcast program on the same channel, or in a case where the TV-side channel code is (i) a broadcast program code indicating a broadcast program being received by the TV-side tuner or (ii) a broadcast station code indicating a broadcast station of a broadcast program being received, the PC-side relay coordination control section 14 can determine a channel to be received by the PC-side tuner, in accordance with the received TV-side channel code, without using the channel correspondence information.

As described above, then, a channel of the PC 11 is determined in accordance with the TV-side channel code transmitted in S45 (S35), and the video signal containing the broadcast program on the channel thus determined is transmitted to the TV 21 via the display output I/F 18 (S36). The video signal is transmitted to the output switching section 28 via the PC input I/F 23. As described above, in S42, the output switching section 28 switches, to the output of the PC input I/F 23, the output to be supplied to the display section 30. Accordingly, the video signal is transmitted through the output switching section 28, and then subjected to the predetermined image processing in the image processing control section 29. Finally, the video signal is outputted to the display section 30 (S46).

[Second Embodiment]

The embodiment above shows an example in which the PC-TV relay coordination process and the TV-PC relay coordination process are carried out at the initiative of the PC-side relay coordination control section 14. Specifically, the embodiment above shows that the processes are carried out in such a manner that the PC-side relay coordination control section 14 transmits, to the TV 21, the TV mode switching signal, the PC mode switching signal, and the channel request signal, etc. However, the PC-TV relay coordination process and TV-PC relay coordination process can be also carried out at the initiative of the TV-side relay coordination control section 24. The following describes an example in which the processes are carried out at the initiative of the TV-side relay coordination control section 24, with reference to FIGS. 10 and 11. As to the same processes and arrangements as those described in the aforementioned embodiment, the same reference signs are used, and explanations of the processes and arrangements are omitted.

A video image display system of the present embodiment has the same arrangement as that of the aforementioned embodiment. Further, video image display processing of the video image display system of the present embodiment is carried out in the same manner as the processing flow illustrated in the flowchart of FIG. 2. Therefore, the following deals with differences between the aforementioned embodiment and the present embodiment, that is: the operations of the PC-side relay coordination control section 14 and the TV-side relay coordination control section 24, the PC-TV relay coordination process, and the TV-PC relay coordination process.

[PC-TV Relay Coordination Process]

Figure 10:
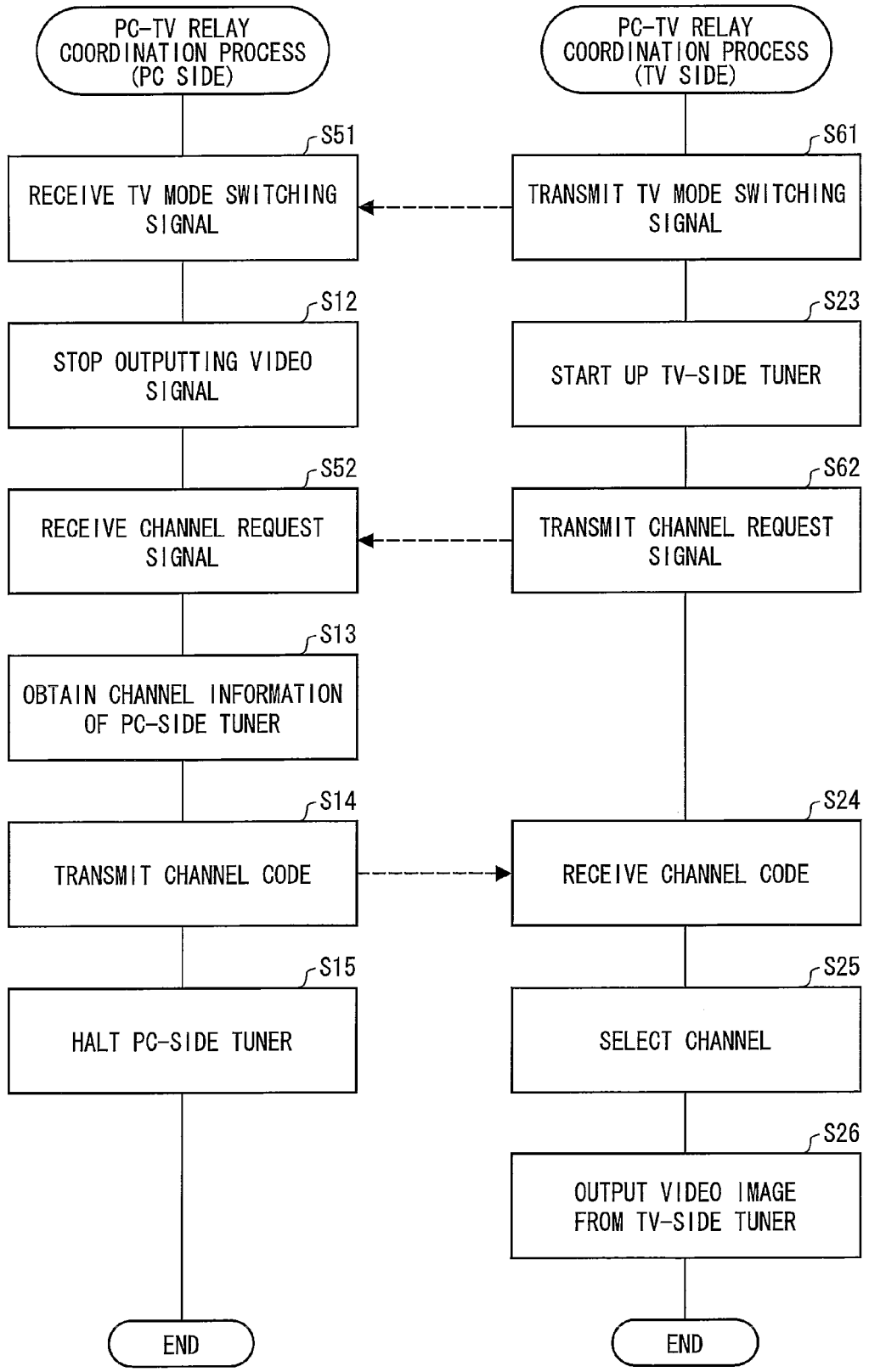
FIG. 10

FIG. 10 is a flowchart illustrating one example of the PC-TV relay coordination process of the present embodiment. The following first describes a processing flow on the PC side. Unlike the aforementioned embodiment, the PC-TV relay coordination process of the present embodiment is carried out in a case where a TV-side relay coordination control section 24 determines that an instruction to switch to the TV mode is issued.

If the TV-side relay coordination control section 24 determines that the instruction to switch to the TV mode is issued, the TV-side relay coordination control section 24 transmits, to the PC 11 via the TV-side communication I/F 22, a TV mode switching signal for notifying a switching to the TV mode. The PC-side relay coordination control section 14 receives the TV mode switching signal via the PC-side communication I/F 15 (S51). After receiving the TV mode switching signal, the PC-side relay coordination control section 14 instructs the display output I/F 18 to stop outputting a video signal (S12).

In S63, which is a process on the TV side, a channel request signal is transmitted via the TV-side communication I/F 22 (this is described later). The channel request signal is received by the PC-side relay coordination control section 14 via the PC-side communication I/F 15. After receiving the channel request signal (S52), the PC-side relay coordination control section 14 obtains channel information of the PC-side tuner from the auxiliary memory section 13 (S13), and transmits, to the TV 21 via the PC-side communication I/F 15, a PC-side channel code indicating a broadcast program being received by the PC-side tuner (S14). Then, the PC-side relay coordination control section 14 transmits a halt instruction to the PC-side tuner so that the PC-side tuner stops receiving a one-segment broadcast (S15).

The following describes a processing flow on the TV side. If the TV-side relay coordination control section 24 determines that the instruction to switch to the TV mode is issued, the TV-side relay coordination control section 24 transmits the TV mode switching signal via the TV-side communication I/F 22 (S61), and then starts up the TV-side tuner (S23). Further, the TV-side relay coordination control section 24 instructs the output switching section 28 to switch, to the output of the TV-side tuner, the output to be supplied to the display section 30. Then, the TV-side relay coordination control section 24 transmits the channel request signal to the PC 11 via the TV-side communication I/F 22 (S62).

In S14, which is a process on the PC-side, the PC-side channel code is transmitted to the TV 21 via the PC-side communication I/F 15. The PC-side channel code is received by the TV-side relay coordination control section 24 via the TV-side communication I/F 22. After receiving the PC-side channel code (S24), the TV-side relay coordination control section 24 determines a channel in accordance with the received PC-side channel code (S25).

It follows that the broadcast program received by the TV-side tuner is transmitted to the output switching section 28 as a video signal. As described above, in S61, the output to be supplied from the output switching section 28 to the display section 30 is switched to the output of the TV-side tuner. Accordingly, the video signal is transmitted through the output switching section 28, and then, subjected to the predetermined image processing in the image processing control section 29. Finally, the video signal is outputted to the display section 30 (S26).

[TV-PC Relay Coordination Process]

Figure 11:
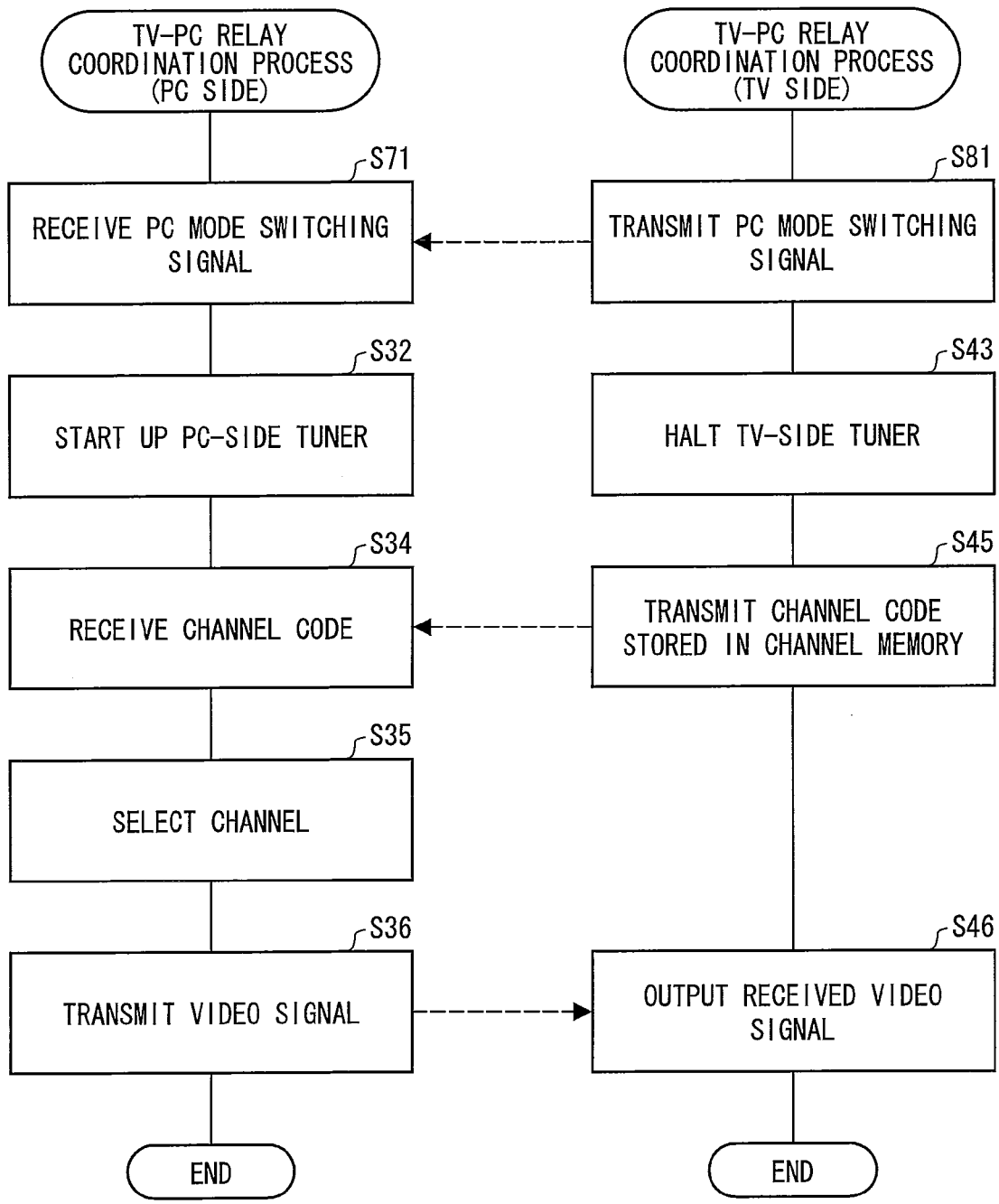
FIG. 11
Figure 13:
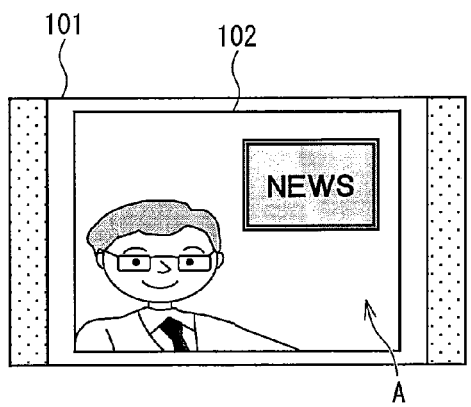
FIG. 13(a)
FIG. 13(b)
FIG. 13(c)
Figure 13:
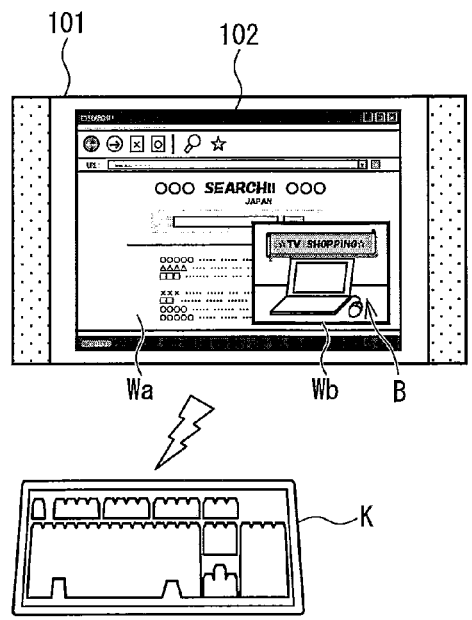
Figure 13:
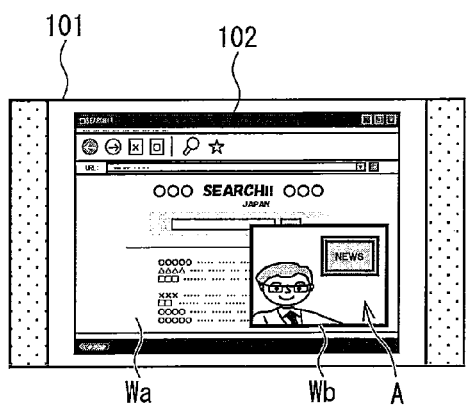

FIG. 11 is a flowchart illustrating one example of the TV-PC relay coordination process of the present embodiment. The following first describes a processing flow on the PC side. Unlike the aforementioned embodiment, the TV-PC relay coordination process of the present embodiment is carried out in a case where the TV-side relay coordination control section 24 determines that the instruction to switch to the PC mode is issued. That is, in the video image display system of the present embodiment, the TV-side relay coordination control section 24 determines whether or not to switch between the TV mode and the PC mode.

If the TV-side relay coordination control section 24 determines that the instruction to switch to the PC mode is issued, the TV-side relay coordination control section 24 transmits, to the PC 11 via the TV-side communication I/F 22, a PC mode switching signal for notifying a switching to the PC mode. Then, the PC-side relay coordination control section 14 receives the TV mode switching signal via the PC-side communication I/F 15 (S71).

After receiving the PC mode switching signal, the PC-side relay coordination control section 14 starts up the PC-side tuner (S32). Then, in S45 (to be described later), which is process on the TV side, a TV-side channel code is transmitted to the PC 11 via the TV-side communication I/F 22. The TV-side channel code is received by the PC-side relay coordination control section 14 via the PC-side communication I/F 15 (S34).

After receiving the TV-side channel code, the PC-side relay coordination control section 14 determines a channel in accordance with the received TV-side channel code (S35). The broadcast program received by the PC-side tuner is transmitted to the image output control section 17 as a video signal so as to be subjected to predetermined processing, and then, transmitted to the TV 21 via a display output I/F 18 (S36).

The following describes a processing flow on the TV side. If the TV-side relay coordination control section 24 finds that the instruction to switch to the PC mode is issued, the TV-side relay coordination control section 24 transmits, to the PC 11 via the TV-side communication I/F 22, a PC mode switching signal for notifying a switching to the PC mode (S81), and instructs the output switching section 28 to set, to the output of the PC input I/F 23, the output to be supplied to the display section 30. Further, the TV-side relay coordination control section 24 halts the operation of the TV-side tuner (S43).

Then, the TV-side relay coordination control section 24 reads out a TV-side channel code from the channel memory of the memory section 25, and transmits the TV-side channel code to the PC 11 via the TV-side communication I/F 22 (S45).

It follows that the video signal containing the broadcast program received by the PC-side tuner is transmitted to the output switching section 28 via the display output I/F 18 and the PC input I/F 23. As described above, in S81, the output switching section 28 switches the output to be supplied to the display section 30 from the output of the TV-side tuner to the output of the PC input I/F 23. Accordingly, the video signal is transmitted through the output switching section 28, and then, subjected to the predetermined image processing in the image processing control section 29. Finally, the video signal is outputted to the display section 30 (S46).

As described above, even though the TV mode is switched to the PC mode or the PC mode is switched to the TV mode, a broadcast program displayed on the display section 30 remains the same also in the video image display system of the present embodiment, as is the case with the aforementioned embodiment. Therefore, even though an output mode is switched between the TV mode and the PC mode, a user can continuously watch the same broadcast program as before the switching, without being interrupted.

[Modification]

As described above, in the video image display system of the present invention, a user can continuously watch a same broadcast program as before switching between the output from the PC 11 and the output from the TV 21, without performing any operation. Assume that the broadcast program being watched by the user in the PC mode or in the TV mode is a captioned broadcast or the like. In this case, a caption mode and an audio mode which are specified before the switching of the outputs can differ from those specified after the switching.

For example, in a case where the user switches from the TV mode to the PC mode while watching, in the TV mode, a broadcast program in English and with Japanese captions, the switching can cause the PC 11 to output the same broadcast program but in Japanese and with English captions. In such a case, the user is required to change the caption mode and the audio mode after switching the outputs. This prevents the user from continuously watching the broadcast program.

In view of this, for example, mode switching information for designating a caption mode, an audio mode, etc., may be transmitted together with a channel code, at a switching between the output from the PC 11 and the output from the TV 21. The arrangement allows a caption mode, an audio mode, etc. to remain the same before and after the switching. Specifically, the mode switching information for designating at least one of a caption mode and an audio mode of a broadcast program being received by the PC 11 is transmitted to TV 21 so that at least one of a caption mode and an audio mode of a broadcast program which is received by the TV 21 may be matched with the caption mode and/or the audio mode of the broadcast program being received by the PC 11. Similarly, the mode switching information for designating at least one of a caption mode and an audio mode of the broadcast program being received by the TV 21 is transmitted to the PC 11 so that at least one of a caption mode and an audio mode of a broadcast program which is received by the PC 11 may be matched with the caption mode and/or the audio mode of the broadcast program being received by the TV 21.

Further, in a case where scenario information is available which indicates which time period of a broadcast program covers what scenes, the output from the PC 11 and the output from the TV 21 can be switched therebetween by use of the scenario information. A method for providing the scenario information to the PC 11 and the TV 21 is not particularly limited. For example, the method may be such that the scenario information is provided, together with a broadcast program, in a form of a broadcast wave, or provided via another communication network such as the Internet.

For example, by referring to the scenario information, it is possible to find out in which time period of a broadcast program a commercial is inserted. By use of this, the PC-side relay coordination control section 14 or the TV-side relay coordination control section 24 may switch between the PC mode and the TV mode so that the output is in the PC mode during the time period in which the commercial is broadcasted and so that the output is in the TV mode during the time period in which the broadcast program is broadcasted. This allows a user to (i) concentrate on watching the broadcast program in the TV mode, and (ii) watch the commercial while operating the PC 11.

Further, for example, by referring to the scenario information, it is possible to find out which entertainer shows up in which time period of a broadcast program, or find out which time period of a broadcast program covers what scenes. By use of this, the PC-side relay coordination control section 14 or the TV-side relay coordination control section 24 may switch between the PC mode and the TV mode so that the output is in the TV mode during a time period in which an entertainer registered in advance by the user shows up in a broadcast program, or during a time period in which a scene which matches information indicative of the user's preference is broadcasted. This allows the user to concentrate on watching, in the TV mode, a scene which matches the user's preference.

SUMMARY

As described above, a data supply apparatus of the present invention includes: a second tuner; broadcast program data transmitting means for transmitting, to the data output apparatus, the data of the broadcast program received by the second tuner; and relay coordination control means for transmitting broadcast program switching information to the data output apparatus, the broadcast program switching information (i) causing the first tuner to receive data of a broadcast program containing same content as the broadcast program received by the second tuner, and (ii) causing the data output apparatus to output the data thus received by the first tuner. As a result, in a case where the output of the data output apparatus is switched from the broadcast program received by the second tuner to the broadcast program received by the first tuner, a user of the data supply apparatus can continuously watch the broadcast program containing the same content as the broadcast program that displayed before the switching.

The data supply apparatus may cause the data output apparatus to output not only the data of the broadcast program received by the second tuner but also data generated by the data supply apparatus. With this arrangement, in a case where a setting is such that the broadcast program received by the second tuner is the output of the data output apparatus, the data generated by the data supply apparatus is outputted together with the broadcast program.

Accordingly, in this case, the user of the data supply apparatus can browse the data generated by the data supply apparatus while watching the broadcast program. In a case a where a setting is such that the broadcast program received by the first tuner is the output of the data output apparatus, the user can concentrate on watching the broadcast program only.

Further, it is preferable that the relay coordination control means transmit, to the data output apparatus, the broadcast program switching information when the data supply apparatus receives a predetermined input operation of the user of the data supply apparatus.

According to the arrangement, the broadcast program switching information is transmitted in a case where the user performs the predetermined input operation on the data supply apparatus. Then, a broadcast program containing the same content as the broadcast program being received by the second tuner is received by the first tuner, and outputted from the data output apparatus.

That is, according to the arrangement, the output of the data output apparatus is switched from the broadcast program being received by the second tuner to the broadcast program being received by the first tuner, at timing when the user performs the predetermined input operation. The broadcast program outputted from the first tuner contains the same content as the broadcast program being received by the second tuner.

Accordingly, the user merely performs the predetermined input operation so as to switch the outputs of the data output apparatus, and watch, after the switching, the broadcast program containing the same content as the broadcast program that the user watches before the switching is carried out.

The predetermined input operation can be obtained by use of a publicly-known input device or the like. For example, an output switching button may be provided to the data supply apparatus or a remote controller for remotely controlling the data supply apparatus so that the broadcast program switching information may be transmitted in a case where the relay coordination control means detects a push of the output switching button.

Further, the relay coordination control means may transmit the broadcast program switching information after receiving, from the data output apparatus, switching notification information indicating that the data to be outputted from the data output apparatus has been switched from the data of the broadcast program received by the second tuner to the data of the broadcast program received by the first tuner.

According to the arrangement, the data supply apparatus transmits the broadcast program switching information to the data output apparatus after receiving the switching notification information so that the broadcast program containing the same content as the broadcast program being received by the second tuner is received by the first tuner, and outputted from the data output apparatus.

That is, according to the arrangement, the output of the data output apparatus is switched from the broadcast program being received by the second tuner to the broadcast program being received by the first tuner at timing when the data outputted from the data output apparatus is switched from the data of the broadcast program received by the second tuner to the data of the broadcast program received by the first tuner.

The broadcast program outputted from the first tuner contains the same content as the broadcast program being received by the second tuner.

Therefore, the user merely switches the output of the data output apparatus to the broadcast program being received by the first tuner so as to watch, after the switching, the broadcast program containing the same content as the broadcast program that the user watches before the switching is carried out.

The switching notification information is transmitted from the data output apparatus to the data supply apparatus in a case where, e.g., the user performs the predetermined input operation on the data output apparatus so as to switch the output of the data output apparatus from the data of the broadcast program received by the second tuner to the data of the broadcast program received by the first tuner.

Further, it is preferable that the relay coordination control means transmit, together with the broadcast program switching information, the mode switching information for designating at least one of an audio mode and a caption mode of the broadcast program to be received by the first tuner.

According to the arrangement, at least one of an audio mode and a caption mode of the broadcast program to be received by the first tuner is designated by the mode switching signal. Accordingly, at least one of the audio mode and the caption mode of the broadcast program to be received by the first tuner can be matched with an audio mode and/or a caption mode of the broadcast program being received by the second tuner.

In other words, according to the arrangement, in a case where the output of the data output apparatus is switched from the data of the broadcast program received by the second tuner to the data of the broadcast program received by the first tuner, at least one of an audio mode and a caption mode remains the same before and after the switching.

Accordingly, the user is not required to designate an audio mode and/or a caption mode again in a case where the output of the data output apparatus is switched from the data of the broadcast program received by the second tuner to the data of the broadcast program received by the first tuner.

Further, a data output system of the present invention includes the data supply apparatus and the data output apparatus.

According to the arrangement, in a case where the output of the data output apparatus is switched from the broadcast program being received by the first tuner to the broadcast program being received by the second tuner, or switched from the broadcast program being received from the second tuner to the broadcast program being received by the first tuner, the user can continuously watch the broadcast program containing the same content as before the switching.

The data supply apparatus and the data output apparatus may be realized by computer. In this case, the present invention encompasses (i) a program for causing the computer to operate as the respective means of the data supply apparatus and the data output apparatus, and thereby realizing the data supply apparatus and the data output apparatus by the computer, and (ii) a computer-readable recording medium storing the program.

[Third Embodiment]

Figure 14:
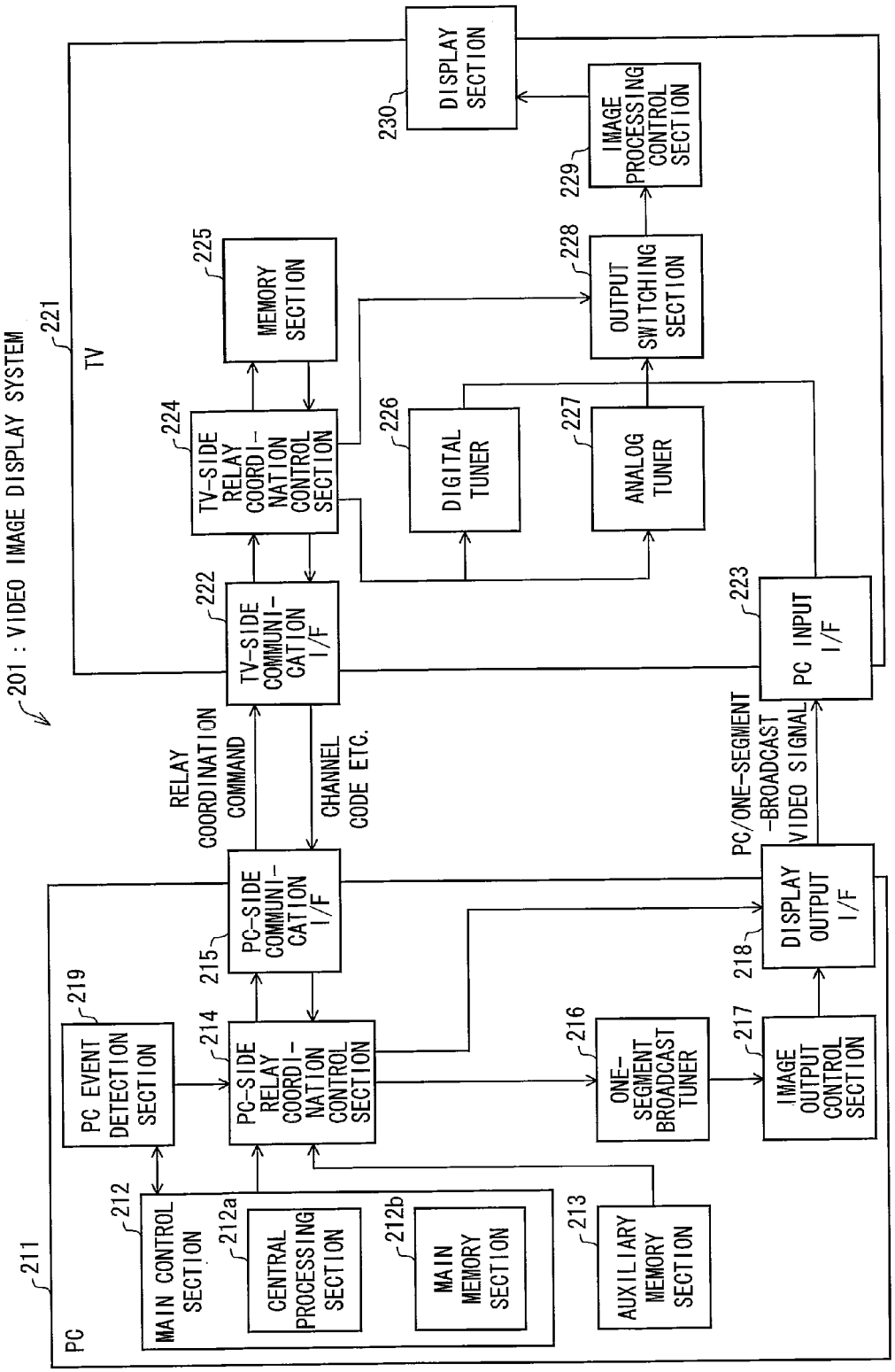
FIG. 14

The following describes one embodiment of the present invention, with reference to FIGS. 14 through 22. The following first describes an overview of a video image display system of the present embodiment, with reference to FIG. 14. FIG. 14 is a block diagram illustrating a main part of a video image display system 1. As illustrated in FIG. 14, the video image display system (data display system) 201 includes a PC (data supply apparatus) 211 and a TV (display apparatus) 221.

The PC 211 is a general-purpose computer, and includes: a main control section 212; an auxiliary memory section 213; a PC-side relay coordination control section (relay coordination control means) 214; a PC-side communication I/F (currently-tuned broadcast program information receiving section) 215; a one-segment broadcast tuner (second tuner) 216; an image output control section 217; a display output I/F (data transmitting section) 218; and a PC event detection section (event detection means and mail display control means) 219, as illustrated in FIG. 14. Further, the PC 211 includes an input device (not illustrated) such as a mouse and a keyboard so that a user of the video image display system 201 may operate the PC 211 by use of the input device.

The main control section 212 performs overall control of functions of the PC 211, and includes a central processing section 212a and a main memory section 212b, as illustrated in FIG. 14. The main memory section 212b includes a ROM (Read Only Memory) and an RAM (Random Access Memory), which are not illustrated in FIG. 14. The ROM stores data minimally required for an operation of the PC 211, for example, program data of a BIOS (Basic Input Output System), program data of an OS (Operating System), and the like. The RAM functions as a working memory which is used in information processing which is carried out by the main control section 212.

That is, a function of the main control section 212 is realized in such a manner that the central processing section 212a performs program execution, a computation, etc. by use of the RAM of the main memory section 212b as a working memory. In addition to illustrated components, the main control section 212 includes components, such as timer means (e.g., a clock), which are necessary for the central processing section 212a to perform program execution, a computation, etc.

The auxiliary memory section 13 is a device which is used for purposes such as supplement of a capacity of the main memory section 212b. The auxiliary memory section 213 stores a program, data, etc. which are necessary for an operation of the PC 211. The auxiliary memory section 213 is a device which can store the program and data so that the program and data can be read out by the components of the PC 11 such as the main control section 212. For example, a hard disk or the like can be adopted as the auxiliary memory section 213. The auxiliary memory section 213 may be a storage medium which can be attached to and detached from the PC 211.

The PC-side relay coordination control section 214 transmits/receives a control signal to/from the TV 221 via the PC-side communication I/F 215, so as to function as switching signal transmitting means for controlling switching between an output from a PC 211 and an output from a TV 221. In addition, the PC-side relay coordination control section 214 carries out a PC-TV relay coordination process and a TV-PC relay coordination process. Each of the processes is for matching a broadcast program received by the one-segment broadcast tuner 216 with a broadcast program received by the TV. Details of the processes are described later.

The PC-side communication I/F 215 is an interface for communication between the PC 211 and the TV 221. Specifically, as illustrated in FIG. 14, the PC-side communication I/F 215 transmits, to the TV 221, a relay coordination command etc., for matching a channel of the PC 211 with a channel of the TV 221. Further, the TV 221 transmits a channel code (to be described later) etc. to the PC-side communication I/F 215.

The PC-side communication I/F 215 is assumed to be an HDMI (High-Definition Multimedia Interface) terminal.

A method for the communication between the PC 211 and the TV 221 is not particularly limited but may be a publicly-known communication method. For example, the communication between the PC 211 and the TV 221 can be enabled by use of RS232C, i.Link®, Bluetooth®, ZigBee®, Wi-Fi®, UWB (Ultra Wide Band), IrDA, or the like. The PC-side communication I/F 215 can be changed in accordance with a communication method to adopt.

The one-segment broadcast tuner 216 is a tuner for receiving a one-segment broadcast. Specifically, the one-segment broadcast tuner 216 demodulates an electric wave on a channel specified, by the PC-side relay coordination control section 214, among broadcast waves received by an antenna (not illustrated), thereby generating video data. Then, the one-segment broadcast tuner 216 transmits the video data thus generated to the image output control section 217.

The PC 211 has a tuner for receiving a broadcast, and the tuner is not limited to the one-segment broadcast tuner 216. However, video data outputted from the tuner of the PC 11 is outputted from the PC 211, together with data which is outputted from the PC 211, such as video data related to application software being executed by the main control section 212. Therefore, from a viewpoint of those processing capabilities of the PC 211 and the TV 221 which are required for displaying video data, it is preferable that the video data to be outputted from the tuner of the PC 211 be small in its data amount.

For this reason, the PC 211 preferably includes the one-segment broadcast tuner 216 for receiving a one-segment broadcast, which is smaller in its data amount than a terrestrial digital broadcast. From this viewpoint, the tuner provided to the PC 211 may be one which receives mobile broadcasting, which is broadcasting for portable receivers. Further, the tuner provided to the PC 211 may be one which receives radio broadcasting. In this case, data such as a sound or the like of the radio broadcasting is outputted from a speaker (not illustrated) or the like of the TV 221.

The image output control section 217 carries out predetermined image processing on the video data received from the one-segment broadcast tuner 216, and then, transmits the video data to the display output I/F 218. Specifically, since the video data is encoded by a predetermined method (e.g., MPEG-2, H.264, or the like), the image output control section 217 decodes the video data, and transmits the video data to the display output I/F 218.

The display output I/F 218 is an interface for transmitting, to the TV 221, data to be outputted by the TV 221, such as the video data received from the image output control section 217. Hereinafter, the data to be transmitted from the display output I/F 218 to the TV 221 is referred to as PC output data. The display output I/F 218 is not particularly limited, provided that the video data can be transmitted from the display output I/F 218 to the TV 221. As is the case with the PC-side communication I/F 215, the display output I/F 218 can be modified in various ways according to a method for transmitting the video data. Although FIG. 14 illustrates the display output I/F 218 and the PC-side communication I/F 215 as separate blocks for explanation, the display output I/F 218 and the PC-side communication I/F 215 may be integrated into one.

The PC event detection section 219 detects a predetermined event carried out on the PC 211. The PC-side relay coordination control section 214 carries out a switching to the PC mode when the PC event detection section 219 detects the predetermined event. The predetermined event is a predetermined operation of the PC 211. The present embodiment deals with an example in which the predetermined event is reception of an e-mail. That is, the PC event detection section 219 periodically accesses a mail server to check whether or not a newly-arriving e-mail is received. The example assumes that the PC-side relay coordination control section 214 switches the TV mode to the PC mode when the PC event detection section 219 determines that an e-mail is received.

Note that the predetermined event is not limited to the reception of an e-mail. For example, in a case where Skype® or software for instant messaging is installed on the PC 211, or in a case where the PC 211 has a videophone function, the predetermined event may be an incoming call of Skype or a videophone, or reception of an instant message. Further, it may be arranged such that the PC event detection section 219 detects, as the predetermined event, (i) an update of a homepage designated by a user in advance, or (ii) a new post written on an electronic bulletin board or a weblog (blog), which is designated by a user in advance.

The TV 221 is an apparatus for receiving a broadcast wave so as to display a video image. As illustrated in FIG. 14, the TV 221 includes a TV-side communication I/F 222, a PC input I/F 223, a TV-side relay coordination control section 224, a memory section 225, a digital tuner (first tuner) 226, an analog tuner (first tuner) 227, an output switching section 228, an image processing control section 229, and a display section 230.

The TV-side communication I/F 222 is an interface for communicating with the PC 211. The PC input I/F 223 is an interface for receiving video data etc. outputted from the PC 211. The TV-side communication I/F 222 and the PC input I/F 223 are arranged so as to communicate with the PC-side communication I/F 215 and the display output I/F 218, respectively.

The TV-side relay coordination control section 224 controls switching between an output from the PC 211 and an output from the TV 221. In addition, the TV-side relay coordination control section 224 carries out a PC-TV relay coordination process and a TV-PC relay coordination process. Each of the processes is for matching a broadcast program which is received by the one-segment broadcast tuner 216 with a broadcast program which is received by the digital tuner 226 or by the analog tuner 227. Details of the processes are described later.

The memory section 225 is a device for storing a program, data, etc. which are necessary for an operation of the TV 221. The memory section 225 is a component which can store the program and data so that components of the TV 221, such as the TV-side relay coordination control section 224, may read out the program and data. The memory section 225 includes a channel memory for storing channel information indicative of a channel at which the digital tuner 226 or the analog tuner 227 is receiving a broadcast or a channel at which the digital tuner 226 or the analog tuner 227 has last received a broadcast.

The digital tuner 226 is a tuner for receiving a terrestrial digital broadcast. The analog tuner 227 is a tuner for receiving a terrestrial analog broadcast. Hereinafter, the digital tuner 226 and the analog tuner 227 are referred to as TV-side tuners. In addition, data received by a TV-side tuner is referred to as TV-received data. The TV-side tuners demodulates an electric wave on a channel specified by the TV-side relay coordination control section 224, among broadcast waves received by an antenna (not illustrated), thereby generating video data. Then, the TV-side tuner transmits the video data thus generated to the output switching section 228.

Although the present embodiment shows an example in which the TV 221 includes the two tuners: the digital tuner 226 and the analog tuner 227, the TV 221 sufficiently has at least one tuner for receiving a broadcast. The TV-side tuners are not limited to a tuner for receiving a terrestrial digital broadcast and a tuner for receiving a terrestrial analog broadcast. For example, a TV-side tuner may be a BS tuner or a CS tuner.

The output switching section 228 is a component for switching data to be outputted to the display section 230. Specifically, in accordance with an instruction from the TV-side relay coordination control section 224, the output switching section 228 transmits, to the image processing control section 229, either the TV-received data being received by a TV-side tuner or PC output data being received by the PC input I/F 223.

The image processing control section 229 carries out predetermined image processing on the video data received from the output switching section 228, and then, outputs the video data to the display section 230. By the image processing performed by the image processing control section 229, the video data received from the output switching section 228 is caused to be displayable on the display section 230.

The display section 230 is an apparatus for displaying an image, and displays a video image in accordance with the data received from the image processing control section 229. The display section 230 can be, e.g., a CRT (Cathode Ray Tube) display apparatus, an LC (Liquid Crystal) display apparatus, an EL (Electro Luminescence) display apparatus, or the like.

Although the present embodiment describes only outputting of an (video) image for the sake of easy explanation, data such as a sound is also outputted in the same manner as the video image. For example, in a case where data such as sound data is transmitted from the PC 211 to the TV 221 while the output switching section 228 is configured to output data received from the PC 211 (i.e., set to a PC mode), the sound data is outputted from a speaker (not illustrated) provided to the TV 221. On the other hand, in a case where the output switching section 228 is configured to output the TV-received data (i.e., set to a TV mode), the sound data contained in the TV-received data is outputted from the speaker.

[Flow of Video Image Display Processing]

Figure 15:
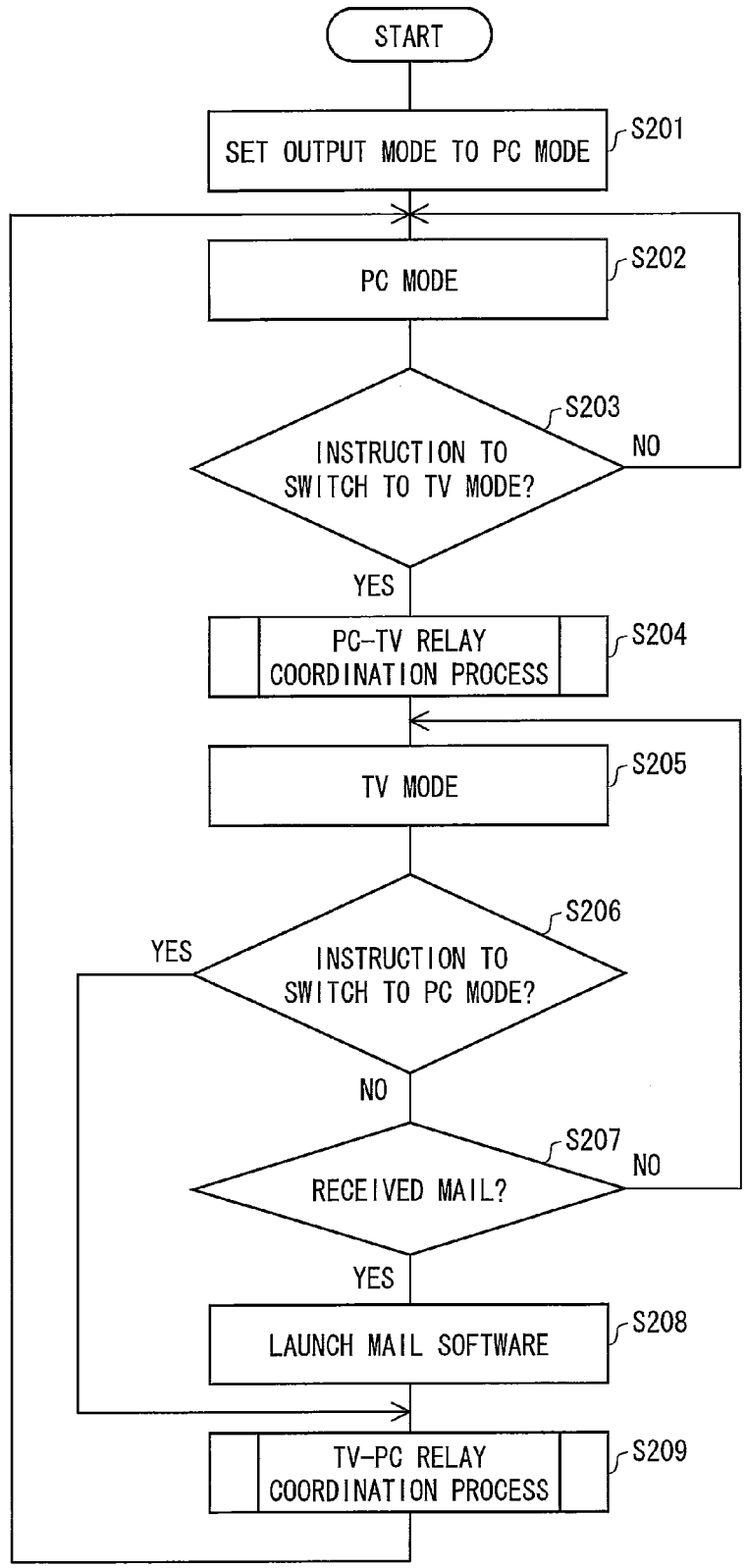
FIG. 15

The following describes a flow of video image display processes of the video image display system 201, with reference to FIG. 15. FIG. 15 is a flowchart showing one example of the video image display processes. As shown in FIG. 15, the example assumes that an output mode is set to the PC mode first (S201). The PC mode refers to a state in which a video signal (PC output data) transmitted from the PC 211 is outputted to the display section 230.

A method for setting an output mode to the PC mode is not particularly limited but is such that, for example, the PC mode is selected when power of the PC 211 is turned on. Specifically, an OS is started up at a start-up of the PC 211. Therefore, for example, the PC-side relay coordination control section 214 transmits, to the TV 221 via the PC-side communication I/F 215, a PC mode switching signal for instructing that an output from the TV 221 be switched to an output from the PC 211.

After an output mode is set to the PC mode (S202), the display section 230 functions as a display apparatus of the PC 211. That is, in the PC mode, PC output data outputted via the display output I/F 218 of the PC 211 is displayed on the display section 230. Specifically, a video image etc. generated by various application programs executed on the PC 211 are displayed in windows on the display section 30.

The PC-side relay coordination control section 214 may output data indicating that the output mode is set to the PC mode, when the PC-mode is selected. For example, as illustrated in FIG. 16, the following text "PC mode has been selected" is displayed on the display section 230. This allows a user to recognize that the output mode is set to the PC mode. The data indicating that the output mode is set to the PC mode is stored in the auxiliary memory section 213 in advance, for example. Then, the PC-side relay coordination control section 214 for example, reads out the data and transmits the data to the TV 221 via the display output I/F 218, when the PC-mode switching signal is transmitted to the TV 221.

The information indicating that the output mode is set to the PC mode is not particularly limited but can be anything, provided that a user can recognize that the output mode is set to the PC mode. For example, a sound or the like may be used to notify a user that the output mode is set to the PC mode.

In the PC mode, the PC-side relay coordination control section 214 checks whether or not an instruction to switch to the TV mode is issued (S203). The TV mode refers to a state in which the TV-received data is outputted to the display section 230. Once the output mode is set to the PC mode, the PC mode continues until the PC-side relay coordination control section 214 determines that the instruction to switch to the TV mode is issued.

A method for setting an output mode to the TV mode is not particularly limited. For example, the PC-side relay coordination control section 214 determines that the instruction to switch to the TV mode is issued, in a case where a selection operation is performed, by use of an input device such as a mouse, on that video image of a broadcast received by the PC-side tuner which is displayed on the display section 230. Alternatively, the PC-side relay coordination control section 14 may determine that the instruction to switch to the TV mode is issued, in a case where, for example, a predetermined input operation for switching to the TV mode is performed (e.g., a predetermined switching button is pressed).

Alternatively, the PC-side relay coordination control section 214 may switch the PC mode to the TV mode, on the basis of content of a broadcast program being received by the PC-side tuner. For example, the PC-side relay coordination control section 214 may switch the PC mode to the TV mode in a case where the PC-side relay coordination control section 214 determines that a broadcast program being received by the PC-side tuner is an emergency broadcast. Accordingly, the emergency broadcast is displayed on an entire surface of the display section 230. As a result, a user never misses the emergency broadcast.

In general, a sound volume increases in a scene of a climax of a broadcast program (e.g., in a scoring scene of a sport program). In view of this, the PC-side relay coordination control section 214 may switch the PC mode to the TV mode in a case where a sound volume of a broadcast program being received by the PC-side tuner exceeds a predetermined value. As a result, a user can closely watch the broadcast program in the TV mode, without missing a scene of a climax of the broadcast program.

If the PC-side relay coordination control section 214 determines that the instruction to switch to the TV mode is issued (YES in S203), the PC-side relay coordination control section 214 carries out the PC-TV relay coordination process (S204). By carrying out the PC-TV relay coordination process, the PC mode is switched to the TV mode. As a result, the TV-received data is displayed on the display section 230.

With reference to FIG. 17, the following describes a transition between video images which are displayed on the display section 230 before and after the PC-TV relay coordination process is carried out. (a) of FIG. 17 is a diagram illustrating one example of a video image which is displayed on the display section 230 before the PC-TV relay coordination process is carried out. (b) of FIG. 17 is a diagram illustrating one example of a video image which is displayed on the display section 230 after the PC-TV relay coordination process is carried out. (c) of FIG. 17 is a diagram showing those main operations of the PC 211 and the TV 221 which are carried out before and after the PC-TV relay coordination process is carried out.

As illustrated in (a) of FIG. 17, windows Wa and Wb are displayed on the display section 230 before the PC-TV relay coordination process is carried out, i.e., in the PC mode. The window Wa is displayed in such a manner that the PC 211 executes a program. In the illustrated example, a web page is displayed in the window Wa. On the other hand, a one-segment broadcast received by the one-segment broadcast tuner 216 is displayed in the window Wb. The example assumes that a one-segment broadcast of a broadcast program A is received by the one-segment broadcast tuner 216. Accordingly, in the PC mode, the one-segment broadcast of the broadcast program A is displayed in the window Wb, as illustrated in (a) of FIG. 17.

In this case, as shown in (c) of FIG. 17, the PC 211 outputs a video signal of a PC screen (window Wa) and a video signal of a one-segment broadcast sub-screen (window Wb). The TV 221 outputs the video signals received from the PC 211. As a result, a video image as illustrated in (a) of FIG. 17 is displayed on the display section 230.

After the PC-TV relay coordination process is carried out, a video image of the broadcast program A is displayed on the display section 230, as illustrated in (b) of FIG. 17. As shown in (c) of FIG. 17, the PC 211 does not output any video signal at this stage. On the other hand, the TV 221 outputs a video signal received by a TV-side tuner (the digital tuner 226 or the analog tuner 227). That is, in the case of (a) of FIG. 17, the broadcast program A received by the one-segment tuner 216 of the PC 211 is displayed on the display section 230 while, in the case of (b) of FIG. 17, the broadcast program A received by the TV-side tuner is displayed on the display section 230.

As described above, in the video image display system 201, carrying out the PC-TV relay coordination process allows a broadcast program displayed on the display section 230 to remain the same even though the PC mode is switched to the TV mode. As a result, even though the PC mode is switched to the TV mode, a user can continuously watch the same broadcast program as before the switching, without being interrupted.

If the output mode is set to the TV mode (S205), the display section 230 functions as a display apparatus of the TV 221. That is, in this case, a video image outputted from the TV-side tuner is displayed on the display section 230. Specifically, displayed on the display section 230 is that video image of a digital broadcast which is outputted from the digital tuner 226, that video image of an analog broadcast which is outputted from the analog tuner 227, or the like. In the TV mode, a user can select a channel to be received by the TV 221, by use of an input device such as a remote control.

With reference to FIG. 18, the following describes a transition between video images which are displayed on the display section 230 before and after channels are switched in the TV mode. (a) of FIG. 18 is a diagram illustrating one example of a video image which is displayed on the display section 230 before the channels are switched. (b) of FIG. 18 is a diagram illustrating one example of a video image which is displayed on the display section 230 after the channels are switched. (c) of FIG. 18 is a diagram showing those main operations of the PC 211 and the TV 221 which are carried out before and after the channels are switched.

As illustrated in (a) of FIG. 18, the broadcast program A is displayed on the display section 230 before the channels are switched. The broadcast program A is a broadcast program received by the TV-side tuner. As illustrated in (b) of FIG. 18, a broadcast program B is displayed on the display section 230 after the channels are switched. That is, FIG. 18 assumes that the channels are switched so that the broadcast program A is switched to the broadcast program B.

As shown in (c) of FIG. 18, the PC 211 does not output any video signal before and after the channel are switched. On the other hand, the TV 221 outputs a video signal of the broadcast program A before the channels are switched, and outputs a video signal of the broadcast program B after the channels are switched. As a result, the video images as illustrated in (a) and (b) of FIG. 18 are displayed on the display section 230. As described above, the PC 211 is not involved in the channel switching carried out in the TV mode, and the video images which are displayed on the display section 230 are switched by the process carried out in the TV 221.

Also in the TV mode, the PC-side relay coordination control section 214 determines whether or not the instruction to switch to the PC mode is issued (S206). That is, in the video image display system 201 of the present embodiment, the PC-side relay coordination control section 214 determines both whether or not to switch the TV mode to the PC mode and whether or not to switch the PC mode to the TV mode. The TV mode continues until the PC-side relay coordination control section 214 determines that the instruction to switch to the PC mode is issued.

For example, in a case where the PC-side relay coordination control section 214 detects a predetermined input operation of an input device such as a mouse and a keyboard, the PC-side relay coordination control section 214 determines that the instruction to switch to the PC mode is issued. The arrangement in which an output mode is set to the PC mode upon a user's input operation related to use of the PC 211 allows the user to smoothly switch to the PC mode. Further, for example, the PC-side relay coordination control section 214 may determine that the instruction to switch to the PC mode is issued, in a case where the PC-side relay coordination control section 214 determines that a predetermined input operation for switching to the PC mode is performed (in a case where a mode switching button is pressed, for example).

The mode switching button for switching between the PC mode and the TV mode is provided onto a surface of a main body of the PC 211, to a remote control for operating the PC 211 and/or the TV 221, or to the like.

In a case where the PC-side relay coordination control section 214 determines that no instruction to switch to the PC mode is issued (No in S206), the PC-side relay coordination control section 214 sends an inquiry to the PC event detection section 219 about whether or not a newly-arriving e-mail is received (hereinafter, simply referred to as a mail) (S207). The PC event detection section 219 periodically accesses the mail server to check whether or not the PC 211 has received a newly-arriving mail. Accordingly, the PC-side relay coordination control section 214 can determine whether or not the PC 211 has received a newly-arriving mail, by sending the inquiry to the PC event detection section 219.

The PC event detection section 219 is not limited to the example above, provided that it is possible to check whether or not the PC 211 has received a newly-arriving mail. For example, the mail server may notify the PC event detection section 219 of the reception of a newly-arriving mail. Further, since common mail software has a function of checking whether or not the PC 211 has received a newly-arriving mail, such mail software can be adopted as the PC event detection section 219. In this case, the mail software is launched at the start-up of the PC 211. This allows the mail software to detect the reception of a mail during the start-up of the PC 211.

If the PC-side relay coordination control section 214 determines that the PC 211 has received no newly-arriving mail (No in S207), the TV mode continues. On the other hand, if the PC-side relay coordination control section 214 determines that the PC 211 has received a newly-arriving mail (Yes in S207), the PC-side relay coordination control section 214 instructs the PC event detection section 219 to launch the mail software (S208).

The mail software launched by the PC event detection section 219 in S208 is the one functioning as mail data generating means for generating mail data which is used to display a received mail as an image. The mail data generated by the mail software is transmitted to the TV 221 together with the data of the broadcast program received by the PC-side tuner, so that the mail data and the data of the broadcast program may be displayed on the display section 230. That is, the PC event detection section 219 also plays a role of mail display control means for controlling how a received mail is displayed. The present embodiment assumes that a program of the mail software is stored in the auxiliary memory section 213, and the main control section 212 executes the program so as to cause the mail software to function.

Further, in the example above, the PC event detection section 219 detects the reception of a mail, and the mail software launched in S208 generates the mail data of the received mail. However, the present embodiment is not limited to this example. For example, in a case where common mail software is adopted as the PC event detection section 219, it is possible to detect the reception of a mail and generate the mail data by use of the one mail software.

As described above, in the video image display system 201, the TV mode continues in a case where the PC-side relay coordination control section 214 determines that the PC 211 has received no newly-arriving mail and no instruction to switch to the PC mode is issued. On the other hand, in a case where the PC-side relay coordination control section 214 determines that the PC 211 has received a newly-arriving mail, the mail software is launched and the TV mode is switched to the PC mode. In a case where the PC-side relay coordination control section 214 determines that the instruction to switch to the PC mode is issued, the TV mode is switched to the PC mode.

If the PC-side relay coordination control section 214 issues, in 5208, the instruction to launch the mail software, or determines that the instruction to switch to the PC mode is issued in S206, the PC relay coordination control section 214 carries out the TV-PC relay coordination process (S209). Accordingly, the TV mode is switched to the PC mode. As a result, the data outputted from the PC 211 is outputted to the display section 230. That is, the TV-PC relay coordination process causes the video image display system 201 to enter the PC mode.

In a case where the PC 211 has received a newly-arriving mail, the mail software is launched in S208. Accordingly, in this case, the mail software is in execution when the switching to the PC mode causes the data outputted from the PC 211 to be displayed on the display section 230 of the TV 211. This allows a user to check the reception of a mail immediately after the switching to the PC mode.

Further, in the video image display system 201, a broadcast program containing same content as a broadcast program watched in the TV mode is also displayed in the PC mode due to the TV-PC relay coordination process, although the details of this are described later. This allows a user to continuously watch the broadcast program that the user watched in the TV mode, while checking the reception of a mail.

The following describes a transition between video images displayed on the display section 230 before and after the TV-PC relay coordination process is carried out, with reference to FIG. 19. (a) of FIG. 19 illustrates one example of a video image displayed on the display section 230 before the TV-PC relay coordination process is carried out. (b) of FIG. 19 illustrates one example of a video image displayed on the display section 230 after the TV-PC relay coordination process is carried out. (c) of FIG. 19 shows main operations of the PC 211 and the TV 221 which are carried out before and after the TV-PC relay coordination process is carried out. The following describes an example of that transition between video images which is caused in a case where the TV-PC relay coordination process is carried out upon the reception of a mail on the PC 211.

As illustrated in (a) of FIG. 19, the video image of the broadcast program B outputted from the TV-side tuner is displayed on the display section 230 before the TV-PC relay coordination process is carried out. As illustrated in (b) of FIG. 19, the windows Wa and Wb are displayed on the display section 230 after the TV-PC relay coordination process is carried out. Further, as illustrated in (b) of FIG. 19, a screen image in which the mail software is in execution is displayed in the window Wa while the video image of the broadcast program B is displayed in the window Wb. This is because, as shown in (c) of FIG. 19, the PC-side tuner and the mail software are started up upon the reception of a mail on the PC 211.

That is, as shown in (c) of FIG. 19, while the video image illustrated in (a) of FIG. 19 is displayed on the display section 230, the PC 211 does not output any video signal and the TV 221 outputs the video signal of the broadcast program B received by the TV-side tuner.

In response to the reception of the mail, the mail software is launched on the PC211. Accordingly, the screen image in which the mail software is in execution is outputted to the TV 221. Further, in response to the reception of the mail, the PC-side tuner is started up. Accordingly, the broadcast program B (one-segment broadcast) received by the PC-side tuner is outputted to the TV 221. In a state illustrated in (b) of FIG. 19, the TV 221 outputs the video signal received from the PC 211. As a result, the screen image in which the mail software is in execution is displayed in the window Wa while the broadcast program B (one-segment broadcast) received by the PC-side tuner is displayed in the window Wb.

As described above, in the video image display system 201, the TV-PC relay coordination process is automatically carried out upon the reception of a mail so that the TV mode is switched to the PC mode. In the PC mode, the mail software is in execution while the same broadcast program as the broadcast program watched in the TV mode is displayed on the display section 230. Accordingly, a user can (i) surely recognize the reception of a mail even through the video image display system 201 is in the TV mode at the reception of a mail, and (ii) continuously watch, in the PC mode, the same broadcast program as the broadcast program watched in the TV mode.

Although the same broadcast program is displayed in both the TV mode and the PC mode, the TV mode and the PC mode are different in structure of the screen image, as illustrated in (a) and (b) of FIG. 19. Therefore, the user can recognize the switching between the modes. Accordingly, the change in structure of the screen image allows the user to recognize the reception of a mail even if he does not launch the mail software. However, still, the user can smoothly check the reception of a mail, by launching the mail software. Therefore, it is preferable that the mail software be launched at the switching from the TV mode to the PC mode.

Figure 20:
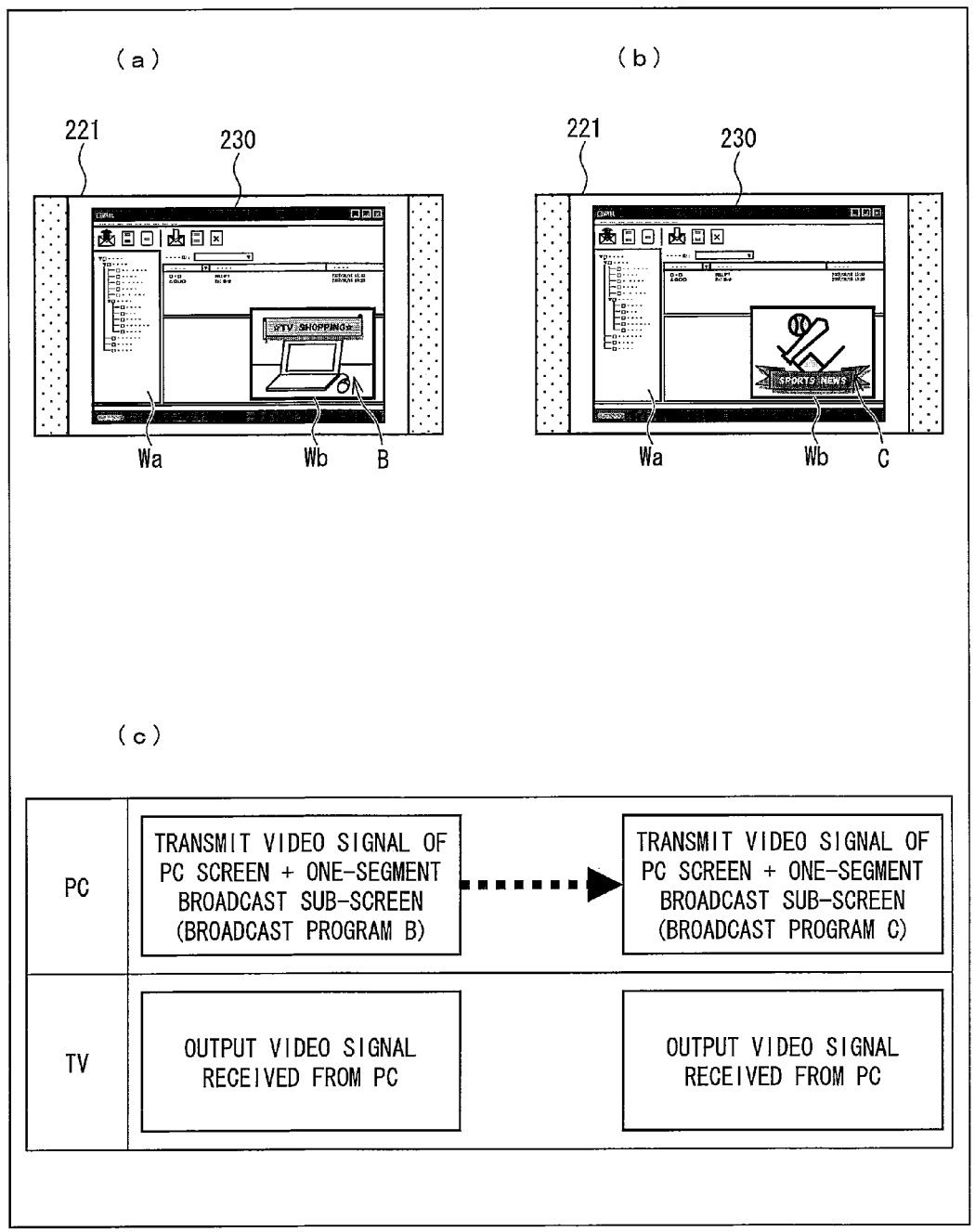
FIG. 20

After the TV-PC relay coordination process is completed, processing returns to S202. Accordingly, the video image display system 201 enters the PC mode again. With reference to FIG. 20, the following describes a transition between video images which are displayed on the display section 230 before and after channels are switched in the PC mode. (a) of FIG. 20 is a diagram illustrating one example of a video image which is displayed on the display section 230 before the channels are switched. (b) of FIG. 20 is a diagram illustrating one example of a video image which is displayed on the display section 230 after the channels are switched. (c) of FIG. 20 is a diagram showing those main operations of the PC 211 and the TV 221 which are carried out before and after the channel are switched.

As illustrated in (a) of FIG. 20, before the channels are switched, the windows Wa and Wb are displayed on the display section 230, and the broadcast program B is displayed in the window Wb. The broadcast program B is a broadcast program received by the one-segment broadcast tuner 216 of the PC 211.

As illustrated in (b) of FIG. 20, after the channels are switched, the windows Wa and Wb are displayed on the display section 230, and a broadcast program C is displayed in the window Wb. That is, FIG. 20 assumes that the channels are switched so that the broadcast program B is switched to the broadcast program C. The channel switching in the PC mode is assumed to be carried out in a case where a user performs a predetermined input operation of an input device of the PC 211, such as a mouse and a keyboard.

In this case, as shown in (c) of FIG. 20, the TV 221 does not output any video signal received from the TV-side tuner but outputs a video signal received from the PC 211. On the other hand, before the channel switching, the PC 211 outputs a video signal of the PC screen and a video signal of the sub-screen showing the broadcast program B. After the channel switching, the PC 211 outputs the video signal of the PC screen and a video signal of the sub-screen showing the broadcast program C. As a result, the video images as illustrated in (a) and (b) of FIG. 20 are displayed on the display section 230. As described above, the TV-side tuner is not involved in the channel switching in the PC mode, and video images which are displayed on the display section 230 are switched by the process carried out in the PC 211.

[PC-TV Relay Coordination Process]

Figure 21:
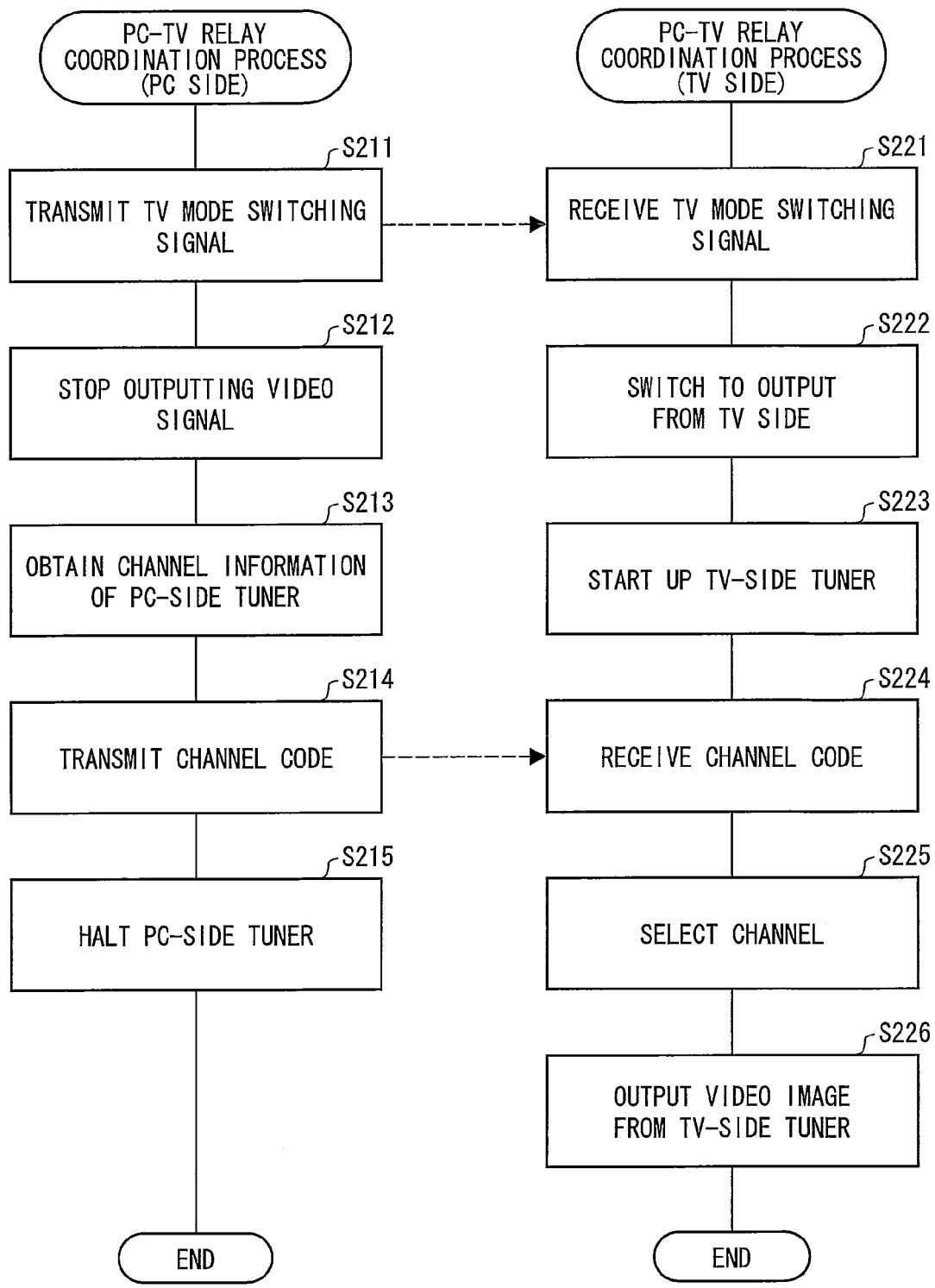
FIG. 21

With reference to FIG. 21, the following describes a flow of the PC-TV relay coordination process illustrated in the flowchart of FIG. 15. FIG. 21 is a flowchart showing one example of the PC-TV relay coordination process. The following first describes a processing flow on the PC 211 side. As described above, the PC-TV relay coordination process is carried out in a case where the PC-side relay coordination control section 214 determines that the instruction to switch to the TV mode is issued.

After determining that the instruction is issued, the PC-side relay coordination control section 214 transmits, to the TV 221 via the PC-side communication I/F 215, a TV mode switching signal which is a control signal for switching an output of the TV 221 to that of the TV mode (S211). Then, the PC-side relay coordination control section 214 halts outputting of a video signal from the display output I/F 218, i.e., halts outputting of the PC output data (S212).

Then, the PC-side relay coordination control section 214 obtains channel information of the PC-side tuner, i.e., of the one-segment broadcast tuner 216 (S213), and transmits a PC-side channel code (broadcast program switching information) to the TV 221 via the PC-side communication I/F 215 (S214). Then, the PC-side relay coordination control section 214 transmits a halt instruction to the one-segment broadcast tuner 216 so that the one-segment broadcast tuner 216 stops receiving a broadcast (S215).

The following describes the channel information and the PC-side channel code. The channel information is information indicative of a channel at which the one-segment broadcast tuner 216 is receiving a broadcast. The channel information is stored in the auxiliary memory section 213, and is updated every time channels are switched. As a result, the auxiliary memory section 213 always stores channel information indicative of a channel at which the one-segment broadcast tuner 216 is receiving a broadcast. The channel information may be stored anywhere, provided that the PC-side relay coordination control section 214 can read out the channel information. For example, a memory section may be provided to the one-segment broadcast tuner 216 so that the one-segment broadcast tuner 216 may store and update the channel information.

The PC-side channel code is a code indicative of a channel at which the PC-side tuner is receiving a broadcast, and is information for causing the TV-side tuner to receive the channel at which the PC-side tuner is receiving the broadcast. A channel to receive a same broadcast program can differ between the PC-side tuner and the TV-side tuner. For example, a channel of the one-segment broadcasting to receive a broadcast program A can differ from a channel of the terrestrial digital broadcasting to receive the broadcast program A.

In such a case, the PC-side relay coordination control section 214 determines a TV-side channel corresponding to a channel at which the PC-side tuner is receiving the broadcast, on the basis of channel correspondence information which indicates correspondence relations between channels of the PC-side tuner and channels of the TV-side tuner. Then, the PC-side relay coordination control section 214 transmits the determined channel, as a PC-side channel code, to the TV 221 via the PC-side communication I/F 215.

A broadcast wave which is received by the PC-side tuner is different from a broadcast wave which is received by the TV-side tuner. Therefore, a broadcast program which is received by the PC-side tuner and a broadcast program which is received by the TV-side tuner do not have to be identical with each other, that is, can be broadcast programs containing the same content or containing mutually-related content. For example, since broadcast programs of the one-segment broadcasting and broadcast programs of the terrestrial digital broadcasting correspond to each other, a broadcast program to be received on the PC-side tuner can be one corresponding to a broadcast program having been received on the TV-side tuner, and vice versa. Further, for example, in a case where a user watches a live broadcast of a game of a sport which is broadcasted by a certain broadcast station, a broadcast program to be outputted after switching the output modes does not necessarily have to be a broadcast program being broadcasted by the same broadcast station, provided that the broadcast program to be outputted is a broadcast program of a live broadcast of the game.

The channel correspondence information can be referred to by the PC-side relay coordination control section 214. For example, the channel correspondence information may be stored in the auxiliary memory section 213 as table data. In a case where the channel correspondence information is contained in a broadcast wave received by the PC-side tuner, the PC-side relay coordination control section 214 may read out the channel correspondence information from the broadcast wave (i.e., from data outputted from the PC-side tuner).

Further, a PC-side channel code can be determined from the channel information, without use of the channel correspondence information. For example, in a case where the PC-side tuner and the TV-side tuner can receive a same broadcast program on a same channel, the PC-side relay coordination control section 214 can transmit the channel information to the TV 221, as it is, as a PC-side channel code, without using the channel correspondence information. Also in a case where the channel information is a broadcast program code indicating a broadcast program being received by the PC-side tuner or is a broadcast station code indicating a broadcast station of a broadcast program being received, the PC-side relay coordination control section 214 can transmit the channel information to the TV 221, as it is, as a PC-side channel code.

The following describes a processing flow on the TV side. The TV mode switching signal transmitted by the PC-side relay coordination control section 214 via the PC-side communication I/F 215 is transmitted to the TV-side relay coordination control section 224 via the TV-side communication I/F 222. After receiving the TV mode switching signal (S221), the TV-side relay coordination control section 224 instructs the output switching section 228 to switch an output to be supplied to the display section 230 from an output of the PC input I/F 223 to an output of the TV-side tuner (S222), and starts up the TV-side tuner (starts up the digital tuner 226 or the analog tuner 227) (S223).

In S214 which is a process on the PC side, a channel code (PC-side channel code) is transmitted to the TV 221 via the PC-side communication I/F 215. The transmitted PC-side channel code is received by the TV-side relay coordination control section 224 via the TV-side communication I/F 222. After receiving the PC-side channel code (S224), the TV-side relay coordination control section 224 determines a channel in accordance with the received PC-side channel code (S225). Specifically, the TV-side relay coordination control section 224 causes the TV-side tuner to receive a broadcast program indicated by the PC-side channel code.

As a result, the broadcast program received by the TV-side tuner is transmitted to the output switching section 228 as a video signal. As described above, in S222, the output switching section 228 switches the output to be supplied to the display section 230 from the output of the PC-side tuner to the output of the TV-side tuner. Accordingly, the video signal is transmitted through the output switching section 228, and is subjected to predetermined image processing in the image processing control section 229. Finally, the video signal is outputted to the display section 230 (S226).

The instruction to switch the outputs can be issued to the output switching section 228 anytime before S226 and after S221. According to the flowchart of FIG. 21, no video image is displayed on the display section 230 during a time period before S226 in which a video image from the TV-side tuner is displayed and after S222 in which the output to be supplied to the display section 230 is switched to the output from the TV 221. In view of this, for example, the PC-side relay coordination control section 214 carries out S212 in which outputting of a video signal is halted, after S215 is carried out in which the PC-side tuner is halted. Accordingly, the TV-side control section 224 issues, to the output switching section 228, the instruction to switch the outputs, immediately before a video image from the TV-side tuner is outputted in S226. This makes it possible to reduce or eliminate a time period in which no video image is displayed on the display section 230.

[TV-PC Relay Coordination Process]

Figure 22:
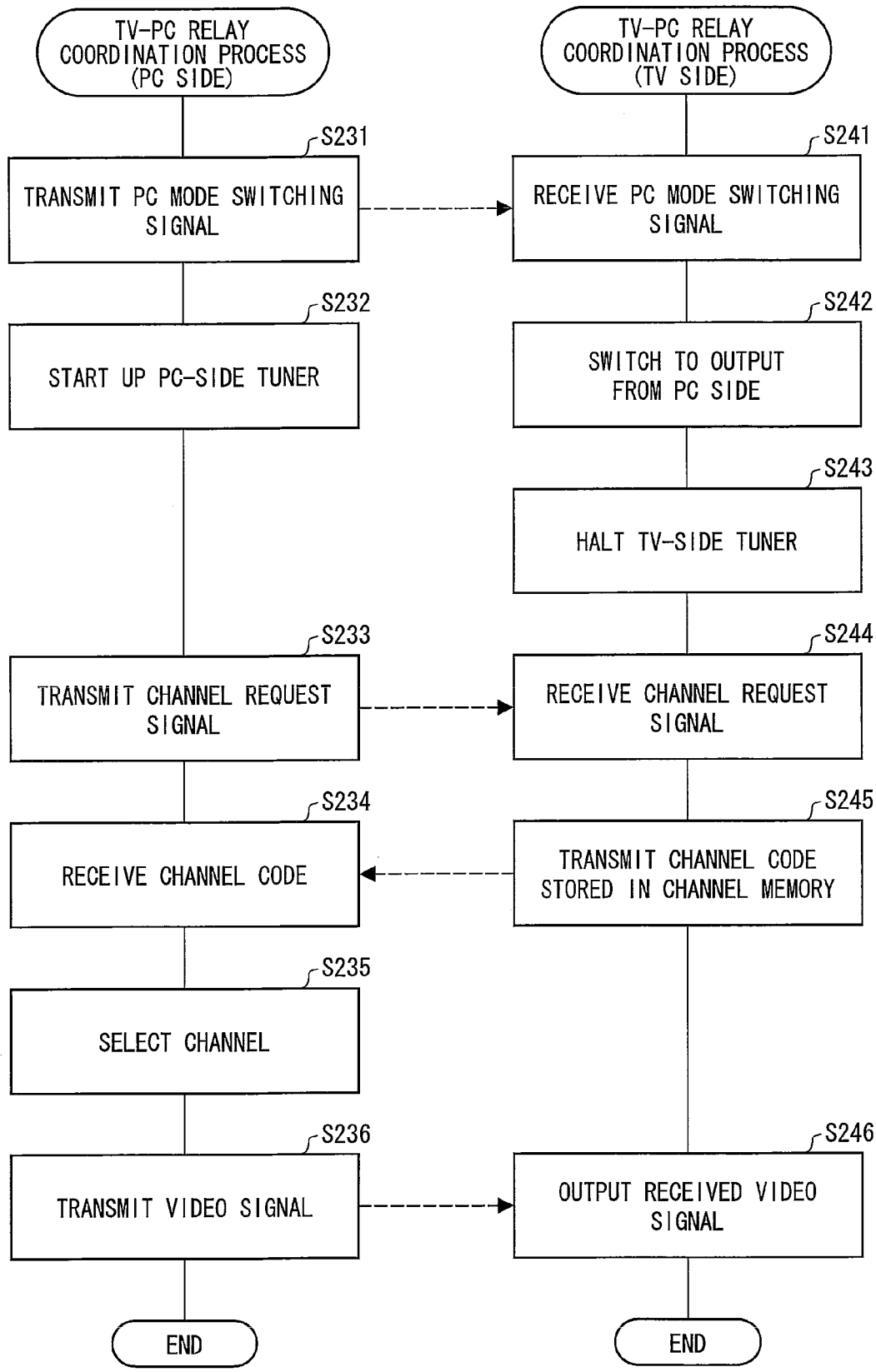
FIG. 22

With reference to FIG. 22, the following describes a flow of the TV-PC relay coordination process illustrated in the flowchart of FIG. 15. FIG. 22 is a flowchart illustrating one example of the TV-PC relay coordination process. The following first describes a processing flow on the PC side. As described above, the TV-PC relay coordination process is carried out in a case where the PC-side relay coordination control section 214 determines that the instruction to switch to the PC mode is issued, or in a case where an event such as the reception of a mail occurs.

After determining that the instruction is issued, the PC-side relay coordination control section 214 transmits a PC mode switching signal to the TV 221 via the PC-side communication I/F 215 (S231). Further, the PC-side relay coordination control section 214 starts up the PC-side tuner, i.e., the one-segment broadcast tuner 216 (S232).

Then, the PC-side relay coordination control section 214 transmits a channel request signal to the TV 221 via the PC-side communication I/F 215 (S233). The channel request signal is a signal for requesting that information which channel is being selected to watch a broadcast program on the TV 221 be transmitted to the PC 211. After receiving the channel request signal, in response, the TV 221 transmits, via the TV-side communication I/F 222 and the PC-side communication I/F 215, a TV-side channel code (currently-tuned broadcast program information) indicating the channel of the broadcast program being watched on the TV 221.

After receiving the channel code (TV-side channel code) (S234), the PC-side relay coordination control section 214 determines a channel in accordance with the received TV-side channel code (S235). Specifically, the PC-side relay coordination control section 214 causes the PC-side tuner to receive the broadcast program indicated by the TV-side channel code. It follows that the broadcast program received by the PC-side tuner is transmitted to the image output control section 217 as a video signal so as to be subjected to predetermined processing, and then, the video signal is transmitted to the TV 221 via the display output I/F 218 (S236).

The following describes a processing flow on the TV side. The PC mode switching signal, transmitted from the PC-side relay coordination control section 214 to the TV 221 via the PC-side communication I/F 215, is received by the TV-side relay coordination control section 224 via the TV-side communication I/F 222. After receiving the PC mode switching signal (S241), the TV-side relay coordination control section 224 instructs the output switching section 228 to switch the output to be supplied to the display section 230 from the output of the TV-side tuner to the output of the PC input I/F 223 (S242). Then, the TV-side relay coordination control section 224 halts the operation of the TV-side tuner (S243).

As described above, the channel request signal is transmitted to the TV 221 via the PC-side communication I/F 215 in S33, which is a process on the PC side. Accordingly, the channel request signal is received by the TV-side relay coordination control section 224 via the TV-side communication I/F 222. After receiving the channel request signal (S244), the TV-side relay coordination control section 224 reads out a TV-side channel code from the channel memory of the memory section 225, and transmits the TV-side channel code to the PC 211 via the TV-side communication I/F 222 (S245).

The TV-side channel code is a code indicating a channel at which the TV-side tuner is receiving the broadcast, and is stored in the channel memory of the memory section 225. As described above, a channel to receive a same broadcast program can differ between the PC-side tuner and the TV-side tuner.

In such a case, the PC-side relay coordination control section 214 determines a PC-side channel corresponding to a received TV-side channel code, on the basis of the channel correspondence information which indicates correspondence relations between channels of the PC-side tuner and channels of the TV-side tuner.

In a case where the PC-side tuner and the TV-side tuner can receive the same broadcast program on the same channel, or in a case where the TV-side channel code is (i) a broadcast program code indicating a broadcast program being received by the TV-side tuner or (ii) a broadcast station code indicating a broadcast station of a broadcast program being received, the PC-side relay coordination control section 214 can determine a channel to be received by the PC-side tuner, in accordance with the received TV-side channel code, without using the channel correspondence information.

As described above, then, a channel of the PC 211 is determined in accordance with the TV-side channel code transmitted in S245 (S235), and the video signal containing the broadcast program on the channel thus determined is transmitted to the TV 221 via the display output I/F 218 (S236). The video signal is transmitted to the output switching section 228 via the PC input I/F 223. As described above, in S242, the output switching section 228 switches the output to be supplied to the display section 230 from the output of the TV-side tuner to the output of the PC input I/F 223. Accordingly, the video signal is transmitted through the output switching section 228, and then subjected to the predetermined image processing in the image processing control section 229. Finally, the video signal is outputted to the display section 230 (S246).

Since the processing flow described above is merely one example, it can be suitably modified as needed. For example, the PC 211 may (i) transmit the channel request signal to the TV 221 first (S233), (ii) receive the TV-side channel code (S234), (iii) start up the PC-side tuner (S232), and (iv) determine a channel (S235) in this order. Then, the PC 211 transmits the PC mode switching signal to the TV 221 (S231). As a result, the PC-side tuner starts receiving a broadcast program before a switching to the PC mode is carried out on the TV 221. This makes it possible to reduce or eliminate a time period in which no video image is displayed on the display section 230.

[Reference Example]

The embodiment above shows an example in which the PC-TV relay coordination process and the TV-PC relay coordination process are carried out at the initiative of the PC-side relay coordination control section 214. Specifically, the embodiment above shows that the processes are carried out in such a manner that the PC-side relay coordination control section 214 transmits, to the TV 221, the TV mode switching signal or the PC mode switching signal, the channel request signal, etc. However, the PC-TV relay coordination process and TV-PC relay coordination process can be also carried out at the initiative of the TV-side relay coordination control section 224. The following describes an example in which the processes are carried out at the initiative of the TV-side relay coordination control section 224, with reference to FIGS. 23 and 24. As to the same processes and arrangements as those described in the aforementioned embodiment, the same reference signs are used, and explanations of the processes and arrangements are omitted.

A video image display system of the present reference example has the same arrangement as that of the aforementioned embodiment. Further, video image display processing of the video image display system of the present reference example is carried out in the same manner as the processing flow illustrated in the flowchart of FIG. 15. Therefore, the following deals with differences between the aforementioned embodiment and the present reference example, that is: the operations of the PC-side relay coordination control section 214 and the TV-side relay coordination control section 224, the PC-TV relay coordination process, and the TV-PC relay coordination process.

[PC-TV Relay Coordination Process]

Figure 23:
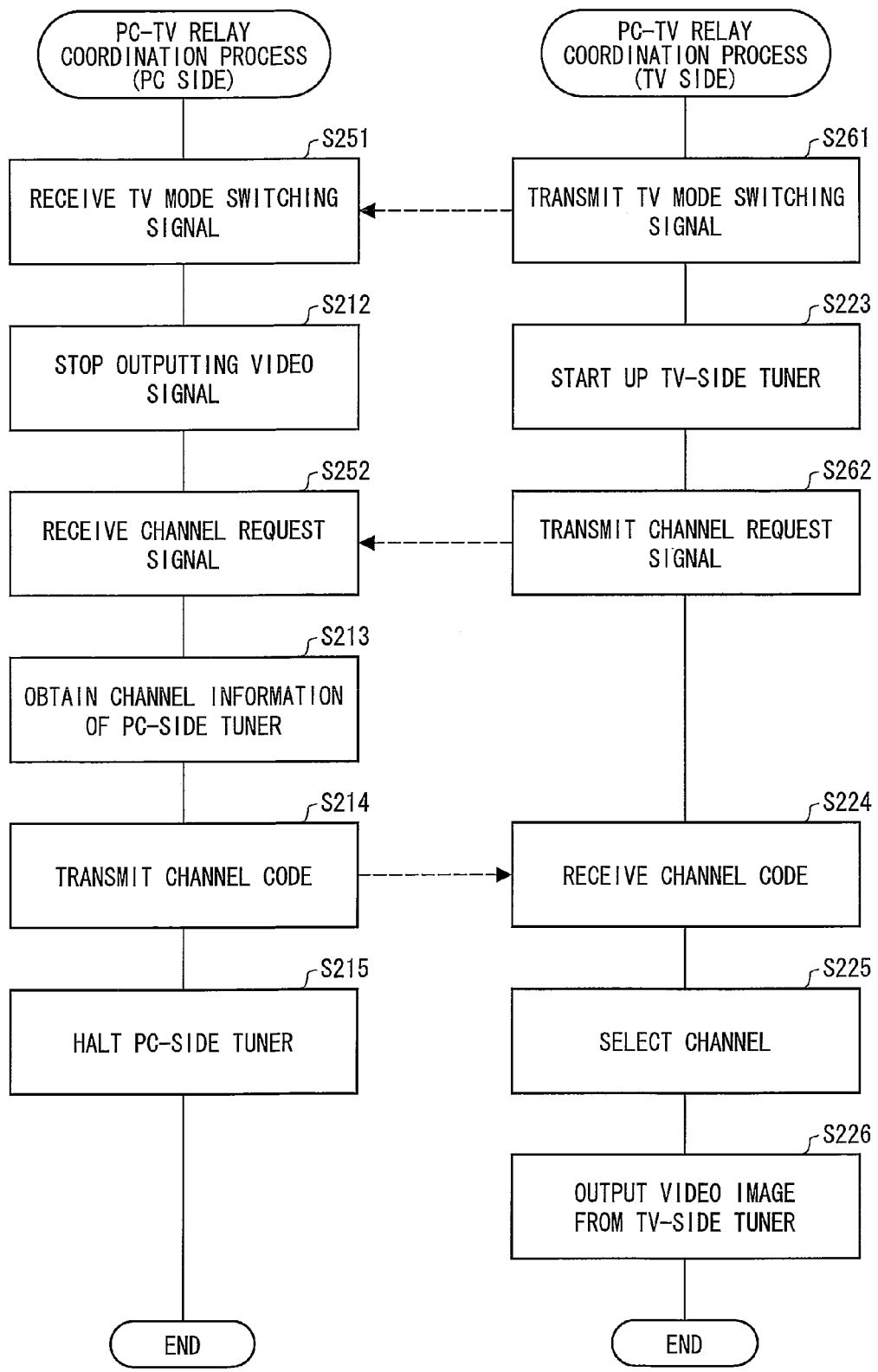
FIG. 23

FIG. 23 is a flowchart illustrating one example of the PC-TV relay coordination process of the present reference example. The following first describes a processing flow on the PC side. Unlike the aforementioned embodiment, the PC-TV relay coordination process of the present reference example is carried out in a case where a TV-side relay coordination control section 224 determines that an instruction to switch to the TV mode is issued.

If the TV-side relay coordination control section 224 finds that the instruction to switch to the TV mode is issued, the TV-side relay coordination control section 224 transmits, to the PC 211 via the TV-side communication I/F 222, a TV mode switching signal for notifying a switching to the TV mode. The PC-side relay coordination control section 214 receives the TV mode switching signal via the PC-side communication I/F 215 (S251). After receiving the TV mode switching signal, the PC-side relay coordination control section 214 instructs the display output I/F 218 to stop outputting a video signal (S212).

In S263, which is a process on the TV side, a channel request signal is transmitted via the TV-side communication I/F 222 (this is described later). The channel request signal is received by the PC-side relay coordination control section 214 via the PC-side communication I/F 215. After receiving the channel request signal (S252), the PC-side relay coordination control section 214 obtains channel information of the PC-side tuner from the auxiliary memory section 213 (S213), and transmits, to the TV 221 via the PC-side communication I/F 215, a PC-side channel code indicating a broadcast program being received by the PC-side tuner (S214). Then, the PC-side relay coordination control section 214 transmits a halt instruction to the PC-side tuner so that the PC-side tuner stops receiving a one-segment broadcast (S215).

The following describes a processing flow on the TV side. If the TV-side relay coordination control section 224 finds that the instruction to switch to the TV mode is issued, the TV-side relay coordination control section 224 transmits the TV mode switching signal via the TV-side communication I/F 222 (S261), and then starts up the TV-side tuner (S223). Further, the TV-side relay coordination control section 224 instructs the output switching section 228 to switch the output to be supplied to the display section 230 from the output of the PC input I/F 223 to the output of the TV-side tuner. Then, the TV-side relay coordination control section 224 transmits the channel request signal to the PC 211 via the TV-side communication I/F 222 (S262).

In S214, which is a process on the PC-side, the PC-side channel code is transmitted to the TV 221 via the PC-side communication I/F 215. The PC-side channel code is received by the TV-side relay coordination control section 224 via the TV-side communication I/F 222. After receiving the PC-side channel code (S224), the TV-side relay coordination control section 224 determines a channel in accordance with the received PC-side channel code (S225).

It follows that the broadcast program received by the TV-side tuner is transmitted to the output switching section 228 as a video signal. As described above, in S261, the output to be supplied from the output switching section 228 to the display section 230 is switched from the output of the PC input I/F 223 to the output of the TV-side tuner. Accordingly, the video signal is transmitted through the output switching section 228, and then, subjected to the predetermined image processing in the image processing control section 229. Finally, the video signal is outputted to the display section 230 (S226).

[TV-PC Relay Coordination Process]

Figure 24:
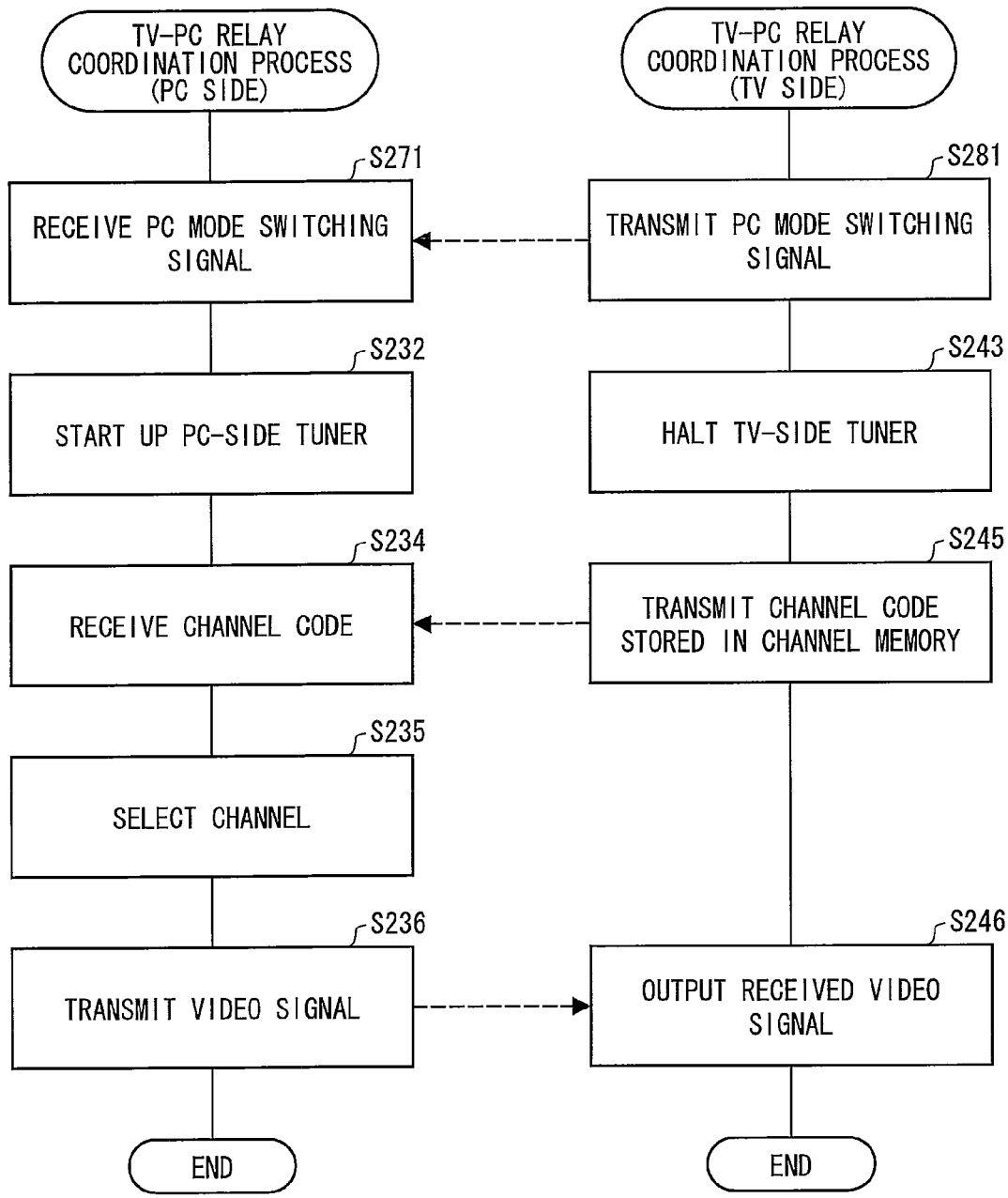
FIG. 24
Figure 25:
FIG. 25(a)
FIG. 25(b)
FIG. 25(c)
Figure 25:
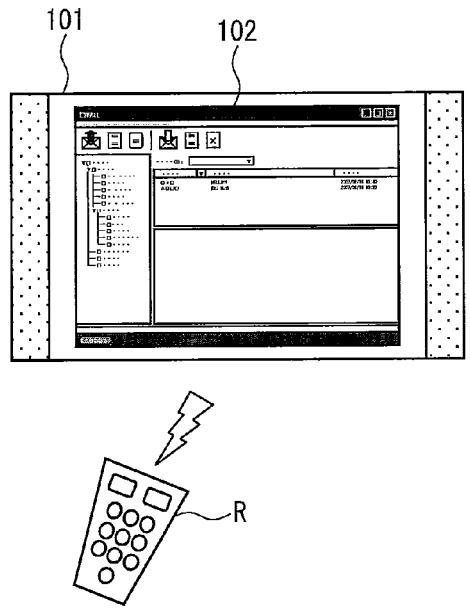
Figure 25:
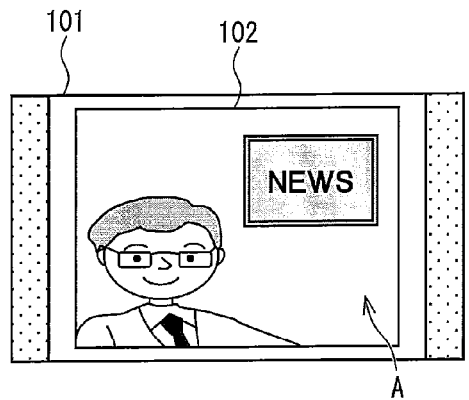

FIG. 24 is a flowchart illustrating one example of the TV-PC relay coordination process of the present reference example. The following first describes a processing flow on the PC side. Unlike the aforementioned embodiment, the TV-PC relay coordination process of the present reference example is carried out in a case where the TV-side relay coordination control section 224 determines that the instruction to switch to the PC mode is issued. That is, in the video image display system of the present reference example, the TV-side relay coordination control section 224 determines whether or not to switch between the TV mode and the PC mode.

If the TV-side relay coordination control section 224 finds that the instruction to switch to the PC mode is issued, the TV-side relay coordination control section 224 transmits, to the PC 211 via the TV-side communication I/F 222, a PC mode switching signal for notifying a switching to the PC mode. Then, the PC-side relay coordination control section 214 receives the TV mode switching signal via the PC-side communication I/F 215 (S271).

After receiving the PC mode switching signal, the PC-side relay coordination control section 214 starts up the PC-side tuner (S232). Then, in S245 (to be described later), which is process on the TV side, a TV-side channel code is transmitted to the PC 211 via the TV-side communication I/F 222. The TV-side channel code is received by the PC-side relay coordination control section 214 via the PC-side communication I/F 215 (S234).

After receiving the TV-side channel code, the PC-side relay coordination control section 214 determines a channel in accordance with the received TV-side channel code (S235). The broadcast program received by the PC-side tuner is transmitted to the image output control section 217 as a video signal so as to be subjected to predetermined processing, and then, transmitted to the TV 221 via a display output I/F 218 (S236).

The following describes a processing flow on the TV side. If the TV-side relay coordination control section 224 finds that the instruction to switch to the PC mode is issued, the TV-side relay coordination control section 224 transmits, to the PC 211 via the TV-side communication I/F 222, a PC mode switching signal for notifying a switching to the PC mode (S281), and instructs the output switching section 228 to switch the output to be supplied to the display section 230 from the output of the TV-side tuner to the output of the PC input I/F 223. Further, the TV-side relay coordination control section 224 halts the operation of the TV-side tuner (S243).

Then, the TV-side relay coordination control section 224 reads out a TV-side channel code from the channel memory of the memory section 225, and transmits the TV-side channel code to the PC 211 via the TV-side communication I/F 222 (S245).

It follows that the video signal containing the broadcast program received by the PC-side tuner is transmitted to the output switching section 228 via the display output I/F 218 and the PC input I/F 223. As described above, in S281, the output switching section 228 switches the output to be supplied to the display section 230 from the output of the TV-side tuner to the output of the PC input I/F 223. Accordingly, the video signal is transmitted through the output switching section 228, and then, subjected to the predetermined image processing in the image processing control section 229. Finally, the video signal is outputted to the display section 230 (S246).

As described above, even though the TV mode is switched to the PC mode or the PC mode is switched to the TV mode, a broadcast program displayed on the display section 230 remains the same also in the video image display system of the present reference example, as is the case with the aforementioned embodiment. Therefore, even though an output mode is switched between the TV mode and the PC mode, a user can continuously watch the same broadcast program as before the switching, without being interrupted.

[Modification]

As described above, in the video image display system of the present invention, a user can continuously watch the same broadcast program as before switching between the output from the PC 211 and the output from the TV 221, without performing any operation. Assume that the broadcast program being watched by the user in the PC mode or in the TV mode is a captioned broadcast or the like. In this case, a caption mode and an audio mode which are specified before the switching of the outputs can differ from those specified after the switching.

For example, in a case where the user switches an output mode from the TV mode to the PC mode while watching, in the TV mode, a broadcast program in English and with Japanese captions, the switching can cause the PC 211 to output the same broadcast program but in Japanese and with English captions. In such a case, the user is required to change the caption mode and the audio mode after switching the outputs. This prevents the user from continuously watching the broadcast program.

In view of this, for example, it may be arranged such that the mode designating information for designating a caption mode, a sound mode, etc. in which the PC 211 or the TV 221 outputs a broadcast program is transmitted together with the channel code at a switching between the output from the PC 211 and the output from the TV 221. In this case, in accordance with the mode designating information, mode setting means for setting the caption mode, the sound mode, etc. at the PC 211 or the TV 221 sets the caption mode, the sound mode, etc. at the PC 211 or the TV 221. The arrangement allows a caption mode, an audio mode, etc. to remain the same before and after the switching.

Specifically, the mode switching information for designating at least one of a caption mode and an audio mode of a broadcast program being received by the PC 211 is transmitted to TV 221 so that at least one of a caption mode and an audio mode of a broadcast program which is received by the TV 221 may be matched with the caption mode and/or the audio mode of the broadcast program being received by the PC 211. Similarly, the mode switching information for designating at least one of a caption mode and an audio mode of the broadcast program being received by the TV 221 is transmitted to the PC 211 so that at least one of a caption mode and an audio mode of a broadcast program which is received by the PC 211 may be matched with the caption mode and/or the audio mode of the broadcast program being received by the TV 221.

Further, in a case where scenario information is available which indicates which time period of a broadcast program covers what scenes, the output from the PC 211 and the output from the TV 221 can be switched therebetween by use of the scenario information. A method for providing the scenario information to the PC 211 and the TV 221 is not particularly limited. For example, the method may be such that the scenario information is provided, together with a broadcast program, in a form of a broadcast wave, or provided via another communication such as the Internet.

For example, by referring to the scenario information, it is possible to find out in which time period of a broadcast program a commercial is inserted. By use of this, the PC-side relay coordination control section 14 or the TV-side relay coordination control section 24 may switch between the PC mode and the TV mode so that the PC mode is selected during a time period in which a commercial is broadcasted and so that the TV mode is selected during a time period in which a broadcast program is broadcasted. This allows a user to (i) concentrate on watching the broadcast program in the TV mode, and (ii) watch the commercial while operating the PC 11.

Further, for example, by referring to the scenario information, it is possible to find out which entertainer shows up in which time period of a broadcast program, or find which time period of a broadcast program covers what scenes. By use of this, the PC-side relay coordination control section 214 or the TV-side relay coordination control section 224 may switch between the PC mode and the TV mode so that the TV mode is selected during a time period in which an entertainer registered in advance by the user shows up in a broadcast program, or during a time period in which a scene which matches information indicative of the user's preference is broadcasted. This allows the user to concentrate on watching, in the TV mode, a scene which matches the user's preference.

Although the embodiment above deals with an example in which the PC 211 is adopted as the data supply apparatus, the data supply apparatus is not limited to the PC 211. For example, the data supply apparatus may be a video intercom. In this case, a press of a button or the like of the video intercom is detected as a predetermined event. In response to this, the output from the TV 221 is switched to an output from the video intercom. This eliminates a possibility that a user will not notice his visitor while intently watching TV. In addition, the user does not undergo an interruption of a TV program.

Furthermore, alternatively, the data supply apparatus may be an image pickup apparatus such as a monitoring camera. In this case, for example, a change in a video image being captured by the monitoring camera is detected as a predetermined event. In response to this, the output from the TV 221 is switched to an output from the image pickup apparatus. This allows a user to concentrate on watching TV while no change is detected in the video image. Also, since the output modes of the TV 221 are switched in a case where a change is caused in the video image, the user does not miss the change in the video image.

SUMMARY

As described above, a data supply apparatus of the present invention comprises: the second tuner; switching signal transmitting means for transmitting a switching signal for causing, in response to a predetermined event, the display apparatus to display the second data instead of the first data; a currently-tuned broadcast program information receiving section for receiving currently-tuned broadcast program information indicating the broadcast program received via the first tuner and currently displayed by the display apparatus; relay coordination control means for causing the second tuner to receive data of a broadcast program indicated by the currently-tuned broadcast program information; and a data transmitting section for transmitting the second data to the display apparatus. As a result, a user can easily recognize an event occurred in the data supply apparatus and continuously watch, without being interrupted, the broadcast program containing the same content.

It is preferable that the data supply apparatus further comprises broadcast program switching information transmitting means for transmitting broadcast program switching information to the display apparatus, the broadcast program switching information (i) causing the first tuner to receive data of a broadcast program containing same content as the broadcast program received by the second tuner, and (ii) causing the display apparatus to display, as the first data, the data of the broadcast program thus received by the first tuner.

According to the arrangement, the broadcast program switching information is transmitted to the display apparatus so that the data to be displayed by the display apparatus is switched from the second data to the first data. The data of a broadcast program to be displayed after the switching contains same content as the data of a broadcast program displayed before the switching. As a result, even though the data to be displayed by the display apparatus is switched from the second data to the first data, a user of the data supply apparatus can continuously watch the broadcast program containing same content as the broadcast program displayed before the switching.

Further, it is preferable that the data supply apparatus further include mode setting means for (i) receiving mode designating information from the display apparatus, the mode designating information designating at least one of an audio mode and a caption mode of the broadcast program received by the first tuner, and (ii) sets the at least one of the audio mode and the caption mode, on the basis of the mode designating information thus received, so that the broadcast program to be received by the second tuner is to be outputted in the at least one of the audio mode and the caption mode of the broadcast program received by the second tuner.

According to the arrangement, at least one of the sound mode and the caption mode of the broadcast program which is received by the second tuner is determined in accordance with the mode designating information. As a result, at least one of the audio mode and the caption mode of the broadcast program which is received by the second tuner can be matched with the audio mode and/or the caption mode of the broadcast program received by the first tuner.

That is, according to the arrangement, in a case where the output of the display apparatus is switched from the data of the broadcast program received by the first tuner to the data of the broadcast program received by the second tuner, at least one of the audio mode and the caption mode remains the same before and after the output switching.

Accordingly, the user is not required to designate the sound mode and the caption mode in a case where the data to be displayed on the display apparatus is switched from the first data containing the data of the broadcast program received by the first tuner to the second data containing the data of the broadcast program received by the second tuner.

Furthermore, it is preferable that the data supply apparatus include: mail reception detection means for detecting reception of an e-mail; mail data generating means for generating mail data based on which the display apparatus displays the received e-mail as an image; and mail display control means for (i) causing, if the mail reception detection means detects the reception of the e-mail, the mail data generating means to generate the mail data of the e-mail, and (ii) then causing the mail data generating means to transmit the mail data to the display apparatus as the second data, the predetermined event being the reception of the e-mail.

According to the arrangement, when the data supply apparatus receives an e-mail while the display apparatus displays the first data, the display apparatus displays, instead of the first data, the second data supplied from the data supply apparatus.

In addition, mail data which is used to display the received e-mail as an image is also transmitted to the display apparatus as the second data. Further, the broadcast program containing the same content as the broadcast program contained in the first data is received by the second tuner, and is also transmitted to the display apparatus as the second data.

Therefore, according to the arrangement, the user can recognize the reception of an e-mail, from a switching of data to be displayed on the display apparatus. In addition, the user can check a received e-mail smoothly because the mail data is displayed on the display apparatus. Furthermore, the user does not undergo an interruption of a broadcast program caused by the switching of the data to be displayed on the display apparatus.

In order to attain the object, a data display system of the present invention includes the data supply apparatus and the display apparatus.

According to the arrangement, the data to be displayed on the display apparatus is switched to another data when an event occurs on the data output apparatus. This allows a user to easily recognize an occurrence of the event in the data output apparatus. In addition, even after the data to be displayed on the display apparatus is switched from the first data to the second data, the user can continuously watch a broadcast program containing same content as a broadcast program that he watches before the switching.

The data supply apparatus may be realized by a computer. In this case, the present invention encompasses (i) a program for causing the computer to operate as the respective means of the data supply apparatus, and thereby realizing the data supply apparatus by the computer, and (ii) a computer-readable recording medium storing the program.

[Fourth Embodiment]

Figure 26:
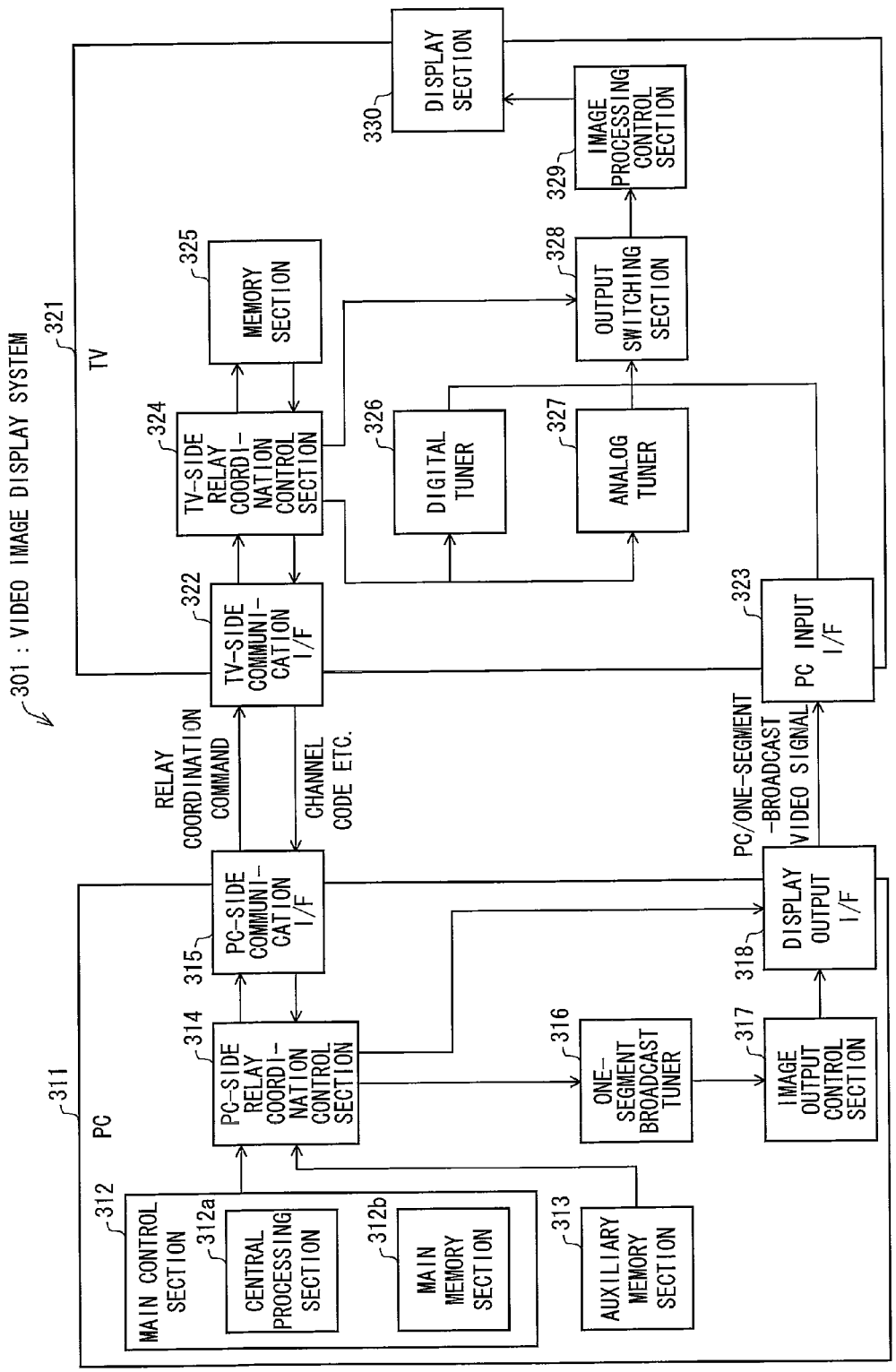
FIG. 26

The following describes one embodiment of the present invention, with reference to FIGS. 26 through 34. First, the following describes an overview of a video image display system of the present embodiment, with reference to FIG. 26. FIG. 26 is a block diagram illustrating an arrangement of a main part of a video image display system 301. As illustrated in FIG. 26, the video image display system (data display system) 301 includes a PC (data supply apparatus) 311 and a TV (display apparatus) 321.

The PC 311 is a general-purpose computer. As illustrated in FIG. 26, the PC 11 includes a main control section 312, an auxiliary memory section 313, a PC-side relay coordination control section (relay coordination control means, switching signal transmitting means, and broadcast program switching information transmitting means) 314, a PC-side communication I/F (currently-tuned broadcast program information receiving means) 315, a one-segment broadcast tuner (second tuner) 316, an image output control section 317, and a display output I/F (data transmitting means) 318. The PC 311 includes, e.g., input devices such as a mouse and a keyboard although they are not illustrated. Accordingly, a user of the video image display system 301 can operate the PC 311 by use of the input devices.

The main control section 312 performs overall control of functions of the PC 311. As illustrated in FIG. 26, the main control section 312 includes a central processing section 312a and a main memory section 312b. The main memory section 312b includes a ROM (Read Only Memory) and a RAM (Random Access Memory) which are not illustrated. The ROM stores data minimally required for an operation of the PC 311, for example, program data of a BIOS (Basic Input Output System), program data of an OS (Operating System), and the like. The RAM functions as a working memory which is used in information processing which is carried out by the main control section 312.

That is, a function of the main control section 312 is realized in such a manner that the central processing section 312a performs program execution, a computation, etc. by use of the RAM of the main memory section 312b as a working memory. In addition to illustrated components, the main control section 312 includes components, such as timer means (e.g., a clock), which are necessary for the central processing section 312a to perform program execution, a computation, etc.

The auxiliary memory section 313 is a device which is used for purposes such as supplement of a capacity of the main memory section 312b. The auxiliary memory section 313 stores a program, data, etc. which are necessary for an operation of the PC 311. The auxiliary memory section 313 is a device which can store the program and data so that the program and data can be read out by the components of the PC 311 such as the main control section 312. For example, a hard disk or the like can be adopted as the auxiliary memory section 313. The auxiliary memory section 313 may be a storage medium which can be attached to and detached from the PC 311.

The PC-side relay coordination control section 314 transmits/receives a control signal to/from the TV 321 via the PC-side communication I/F 315, thereby serving as the switching signal transmitting means for controlling switching between an output from a PC 311 and an output from a TV 321. In addition, the PC-side relay coordination control section 314 carries out a PC-TV relay coordination process and a TV-PC relay coordination process. In each of the processes, a broadcast program received by the one-segment broadcast tuner 316 is matched with a broadcast program received by the TV. Details of the processes are described later.

The PC-side communication I/F 315 is an interface for communication between the PC 311 and the TV 321.

Specifically, as illustrated in FIG. 26, a relay coordination command etc. for matching a channel of the PC 311 with a channel of the TV 321 are transmitted via the PC-side communication I/F 315 to the TV 321. On the other hand, a channel code etc. to be described later are transmitted from the TV 321 to the PC-side communication I/F 315. The PC-side communication I/F 315 is assumed to be an HDMI (High-Definition Multimedia Interface) terminal.

A method for the communication between the PC 311 and the TV 321 is not particularly limited but may be a publicly-known communication method. For example, the communication between the PC 311 and the TV 321 can be enabled by use of RS232C, i.Link®, Bluetooth®, ZigBee®, Wi-Fi®, UWB (Ultra Wide Band), IrDA, or the like. The PC-side communication I/F 315 can be changed in accordance with a communication method.

The one-segment broadcast tuner 316 is a tuner for receiving a one-segment broadcast. Specifically, the one-segment broadcast tuner 316 demodulates an electric wave on a channel specified, by the PC-side relay coordination control section 314, among broadcast waves received by an antenna (not illustrated), thereby generating video data. Then, the one-segment broadcast tuner 316 transmits the video data thus generated to the image output control section 317. Hereinafter, the one-segment broadcast tuner 316 is referred to as a PC-side tuner.

A tuner provided to the PC 311 is not limited to the one-segment broadcast tuner 316, provided that the tuner provided to the PC 311 can receive a broadcast. However, video data outputted from the tuner of the PC 311 is outputted from the PC 311, together with data which is outputted from the PC 311, such as video data related to application software being executed by the main control section 312. Therefore, from a viewpoint of those processing capabilities of the PC 311 and the TV 321 which are required for displaying video data, it is preferable that the video data to be outputted from the tuner of the PC 311 be small in its data amount.

For this reason, the PC 311 preferably includes the one-segment broadcast tuner 316 for receiving a one-segment broadcast, which is smaller in its data amount than a terrestrial digital broadcast. From this viewpoint, the tuner provided to the PC 311 may be one which receives mobile broadcasting, which is broadcasting for portable receivers. Further, the tuner provided to the PC 311 may be one which receives radio broadcasting. In this case, data such as a sound or the like of the radio broadcasting is outputted from a speaker (not illustrated) or the like of the TV 321.

The image output control section 317 carries out predetermined image processing on the video data received from the one-segment broadcast tuner 316, and then, transmits the video data to the display output I/F 318. Specifically, since the video data is encoded by a predetermined method (e.g., MPEG-2, H.264, or the like), the image output control section 317 decodes the video data, and transmits the video data to the display output I/F 318.

The display output I/F 318 is an interface for transmitting, to the TV 321, data to be outputted by the TV 321, such as the video data received from the image output control section 317. Hereinafter, the data to be transmitted from the display output I/F 318 to the TV 321 is referred to as PC output data. The display output I/F 318 is not particularly limited, provided that the video data can be transmitted from the display output I/F 318 to the TV 321. As is the case with the PC-side communication I/F 315, the display output I/F 318 can be modified in various ways according to a method for transmitting the video data. Although FIG. 26 illustrates the display output I/F 318 and the PC-side communication I/F 315 as separate blocks for explanation, the display output I/F 318 and the PC-side communication I/F 315 may be integrated into one.

The TV 321 is an apparatus for receiving a broadcast wave so as to display a video image. As illustrated in FIG. 26, the TV 321 includes a TV-side communication I/F 322, a PC input I/F 323, a TV-side relay coordination control section 324, a memory section 325, a digital tuner (first tuner) 326, an analog tuner (first tuner) 327, an output switching section 328, an image processing control section 329, and a display section 330.

The TV-side communication I/F 322 is an interface for communicating with the PC 311. The PC input I/F 323 is an interface for receiving video data etc. outputted from the PC 311. The TV-side communication I/F 322 and the PC input I/F 323 are arranged so as to communicate with the PC-side communication I/F 315 and the display output I/F 318, respectively.

The TV-side relay coordination control section 324 controls switching between an output from the PC 311 and an output from the TV 321. In addition, the TV-side relay coordination control section 324 carries out a PC-TV relay coordination process and a TV-PC relay coordination process.

Each of the processes is for matching a broadcast program which is received by the one-segment broadcast tuner 316 with a broadcast program which is received by the digital tuner 326 or by the analog tuner 327. Details of the processes are described later.

The memory section 325 is a device for storing a program, data, etc. which are necessary for an operation of the TV 321. The memory section 325 is a component which can store the program and data so that components of the TV 321, such as the TV-side relay coordination control section 324, may read out the program and data. The memory section 325 includes a channel memory for storing channel information indicative of a channel at which the digital tuner 326 or the analog tuner 327 is receiving a broadcast or a channel at which the digital tuner 326 or the analog tuner 327 has last received a broadcast.

The digital tuner 326 is a tuner for receiving a terrestrial digital broadcast. The analog tuner 327 is a tuner for receiving a terrestrial analog broadcast. Hereinafter, the digital tuner 326 and the analog tuner 327 are referred to as TV-side tuners. In addition, data received by a TV-side tuner is referred to as TV-received data. The TV-side tuners demodulates an electric wave on a channel specified by the TV-side relay coordination control section 324, among broadcast waves received by an antenna (not illustrated), thereby generating video data. Then, the TV-side tuner transmits the video data thus generated to the output switching section 328.

Although the present embodiment shows an example in which the TV 321 includes the two tuners: the digital tuner 326 and the analog tuner 327, the TV 321 sufficiently has at least one tuner for receiving a broadcast. The TV-side tuners are not limited to a tuner for receiving a terrestrial digital broadcast and a tuner for receiving a terrestrial analog broadcast. For example, a TV-side tuner may be a BS tuner or a CS tuner.

The output switching section 328 is component for switching data to be outputted to the display section 330. Specifically, in accordance with an instruction from the TV-side relay coordination control section 324, the output switching section 328 transmits, to the image processing control section 329, either the TV-received data being received by a TV-side tuner or PC output data being received by the PC input I/F 323.

The image processing control section 329 carries out predetermined image processing on the video data received from the output switching section 328, and then, outputs the video data to the display section 330. By the image processing performed by the image processing control section 329, the video data received from the output switching section 328 is caused to be displayable on the display section 330.

The display section 330 is an apparatus for displaying an image, and displays a video image in accordance with the data received from the image processing control section 329. The display section 330 can be, e.g., a CRT (Cathode Ray Tube) display apparatus, an LC (Liquid Crystal) display apparatus, an EL (Electro Luminescence) display apparatus, or the like.

Although the present embodiment describes only outputting of an (video) image for the sake of easy explanation, data such as a sound is also outputted in the same manner as the video image. For example, in a case where data such as sound data is transmitted from the PC 311 to the TV 321 while the output switching section 328 is configured to output data received from the PC 311 (i.e., set to a PC mode), the sound data is outputted from a speaker (not illustrated) provided to the TV 321. On the other hand, in a case where the output switching section 328 is configured to output the TV-received data (i.e., set to a TV mode), the sound data contained in the TV-received data is outputted from the speaker.

[Flow of Video Image Display Processing]

Figure 27:
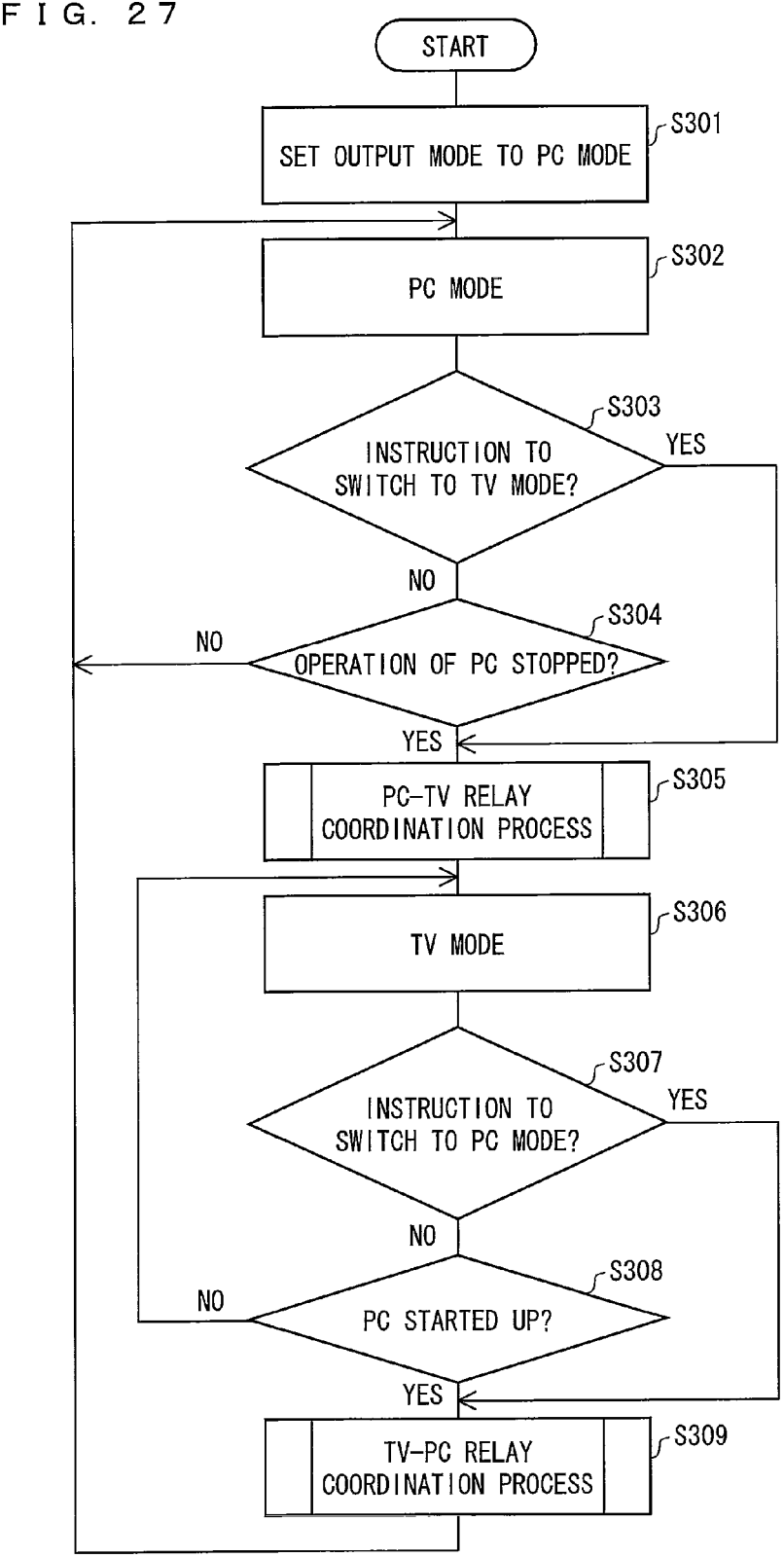
FIG. 27

The following describes a flow of video image display processes of the video image display system 301, with reference to FIG. 27. FIG. 27 is a flowchart showing one example of the video image display processes. As shown in FIG. 27, the example assumes that an output mode is set to the PC mode first (S301). The PC mode refers to a state in which a video signal (PC output data) transmitted from the PC 311 is outputted to the display The video image display system 301 is set to the PC mode at a start-up of the PC 311. Specifically, an OS is started up on the PC 311 when power of the PC 311 is turned on, and then, the PC-side relay coordination control section 314 is started. The PC-side relay coordination control section 314 transmits, to the TV 321 via the PC-side communication I/F 315, a PC mode switching signal for instructing that the output from the TV 321 be switched to the output from the PC 311. That is, a user merely turns on the power of the PC 311 so that the video image display system 301 may be automatically set to the PC mode.

After an output mode is set to the PC mode (S302), the display section 330 functions as a display apparatus of the PC 311. That is, in the PC mode, PC output data outputted via the display output I/F 318 of the PC 311 is displayed on the display section 330. Specifically, a video image etc. generated by various application programs executed on the PC 311 are displayed in a window on the display section 330.

Figure 28:
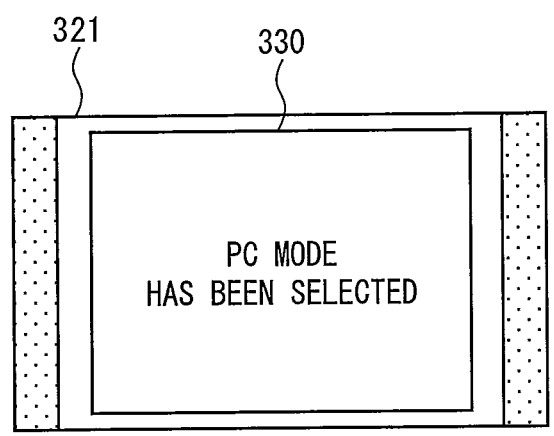
FIG. 28

The PC-side relay coordination control section 314 may output data indicating that the output mode is set to the PC mode, when the PC-mode is selected. For example, as illustrated in FIG. 28, the following text "PC mode has been selected" is displayed on the display section 330. This allows a user to recognize that the output mode is set to the PC mode. The data indicating that the output mode is set to the PC mode is stored in the auxiliary memory section 313 in advance, for example. Then, the PC-side relay coordination control section 314 for example, reads out the data and transmits the data to the TV 321 via the display output I/F 318, when the PC-mode switching signal is transmitted to the TV 321.

The information indicating that the output mode is set to the PC mode is not particularly limited but can be anything, provided that a user can recognize that the output mode is set to the PC mode. For example, a sound or the like may be used to notify a user that an output mode is set to the PC mode.

In the PC mode, the PC-side relay coordination control section 314 checks whether or not an instruction to switch to the TV mode is issued (S303). The TV mode refers to a state in which the TV-received data is outputted to the display section 330. Once an output mode is set to the PC mode, the PC mode continues until (i) the PC-side relay coordination control section 314 determines that the instruction to switch to the TV mode is issued, or (ii) the PC 311 is shut down so as to stop operating, or the PC 311 enters a standby state.

In other words, the PC-TV relay coordination process is carried out (S305) in a case where (i) the PC-side relay coordination control section 314 determines that the instruction to switch to the TV mode is issued (Yes in S303), or (ii) the PC 311 enters a non-operating state or the standby state (Yes in S304). The video image display system 301 thus enters the TV mode. As a result, the TV-received data is outputted from the display section 330.

A method for setting an output mode to the TV mode is not particularly limited. For example, the PC-side relay coordination control section 314 determines that the instruction to switch to the TV mode is issued, in a case where a selection operation is performed, by use of an input device such as a mouse, on that video image of a broadcast received by the PC-side tuner which is displayed on the display section 330. Alternatively, the PC-side relay coordination control section 314 may determine that the instruction to switch to the TV mode is issued, in a case where, for example, a predetermined input operation for switching to the TV mode is performed (e.g., a predetermined switching button is pressed).

Alternatively, the PC-side relay coordination control section 314 may switch the PC mode to the TV mode, on the basis of content of a broadcast program being received by the PC-side tuner. For example, the PC-side relay coordination control section 314 may switch the PC mode to the TV mode in a case where the PC-side relay coordination control section 314 determines that a broadcast program being received by the PC-side tuner is an emergency broadcast. Accordingly, the emergency broadcast is displayed on an entire surface of the display section 330. As a result, a user does not miss the emergency broadcast.

In general, a sound volume increases in a scene of a climax of a broadcast program (e.g., in a scoring scene of a sport program). In view of this, the PC-side relay coordination control section 314 may switch the PC mode to the TV mode in a case where a sound volume of a broadcast program being received by the PC-side tuner exceeds a predetermined value. As a result, a user can closely watch the broadcast program in the TV mode, without missing a scene of a climax of the broadcast program.

Figure 29:
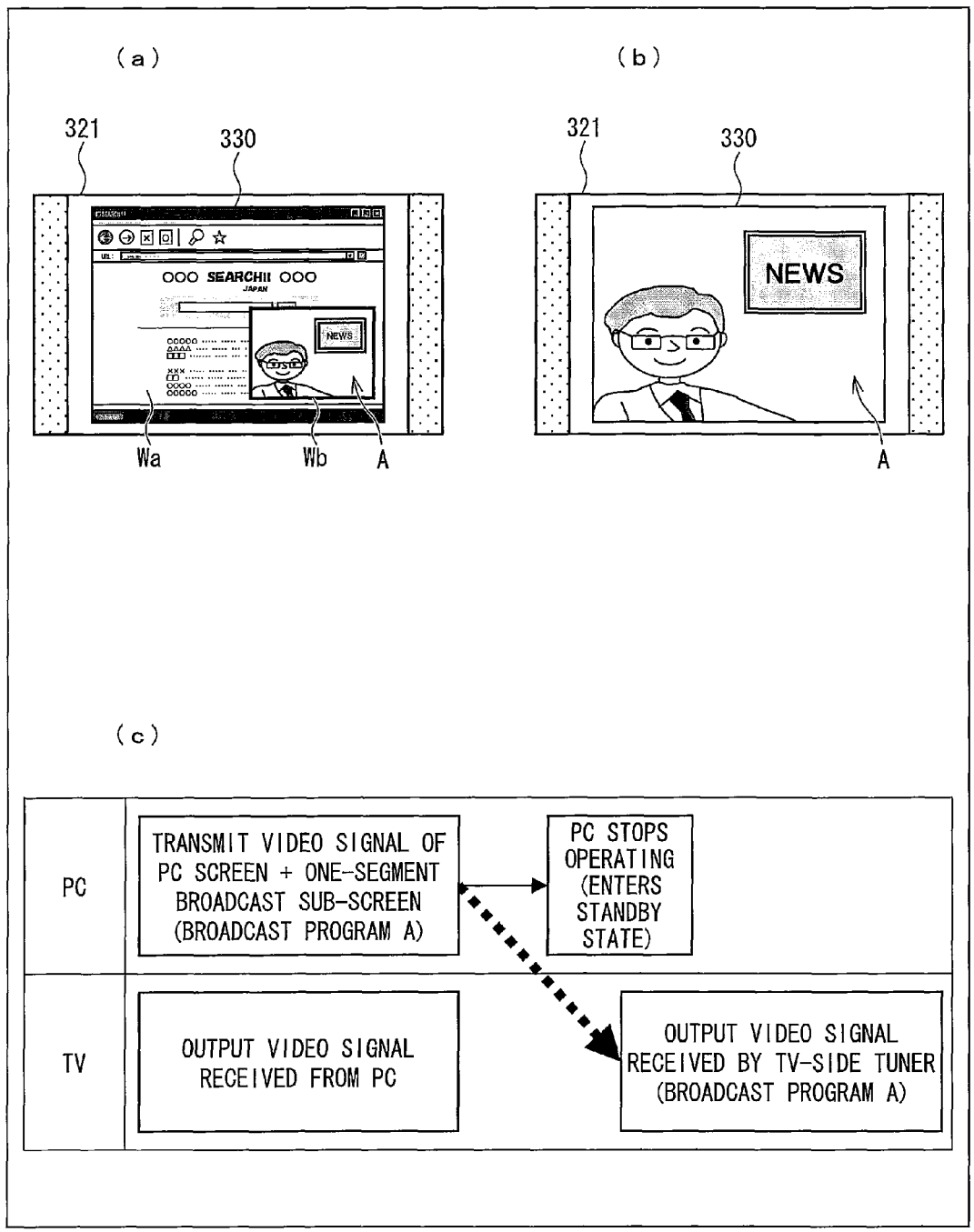
FIG. 29

With reference to FIG. 29, the following describes a transition between video images which are displayed on the display section 330 before and after the PC-TV relay coordination process is carried out. (a) of FIG. 29 is a diagram illustrating one example of a video image which is displayed on the display section 330 before the PC-TV relay coordination process is carried out. (b) of FIG. 29 is a diagram illustrating one example of a video image which is displayed on the display section 330 after the PC-TV relay coordination process is carried out. (c) of FIG. 29 is a diagram showing those main operations of the PC 311 and the TV 321 which are carried out before and after the PC-TV relay coordination process is carried out. As described above, the PC-TV relay coordination process is carried out in a case where (i) the instruction to switch to the TV mode is issued, or (ii) the PC 311 stops operating or enters the standby state. However, the following deals with an example in which the PC-TV relay coordination process is carried out when the PC 311 stops operating.

As illustrated in (a) of FIG. 29, windows Wa and Wb are displayed on the display section 330 before the PC-TV relay coordination process is carried out, i.e., in the PC mode. The window Wa is displayed in such a manner that the PC 311 executes a program. In the illustrated example, a web page is displayed in the window Wa. On the other hand, a one-segment broadcast received by the one-segment broadcast tuner 316 is displayed in the window Wb. The example assumes that a one-segment broadcast of a broadcast program A is received by the one-segment broadcast tuner 316. Accordingly, in the PC mode, the one-segment broadcast of the broadcast program A is displayed in the window Wb, as illustrated in (a) of FIG. 29.

In this case, as shown in (c) of FIG. 29, the PC 311 outputs a video signal of a PC screen (window Wa) and a video signal of a one-segment broadcast sub-screen (window Wb). The TV 321 outputs the video signals received from the PC 311. As a result, a video image as illustrated in (a) of FIG. 29 is displayed on the display section 330.

If the PC-side relay coordination control section 314 finds that the PC 311 stops operating, the PC-side relay coordination control section 314 carries out the PC-TV relay coordination process. After the PC-TV relay coordination process is carried out, a video image of the broadcast program A is displayed on the display section 330, as illustrated in (b) of FIG. 29. As shown in (c) of FIG. 29, the PC 311 does not output any video signal at this stage. On the other hand, the TV 321 outputs a video signal received by a TV-side tuner (the digital tuner 326 or the analog tuner 327). That is, in the case of (a) of FIG. 29, the broadcast program A received by the one-segment tuner 316 of the PC 311 is displayed on the display section 330 while, in the case of (b) of FIG. 29, the broadcast program A received by the TV-side tuner is displayed on the display section 330.

As described above, in the video image display system 301, the PC-TV relay coordination process is carried out when the PC 311 stops operating. In the PC-TV relay coordination process, a broadcast program displayed on the display section 330 is switched to another between the PC mode and the TV mode. However, the broadcast program displayed after the switching is the same as the broadcast program displayed before the switching. That is, in the video image display system 301, the PC mode is automatically switched to the TV mode when a user shuts down the PC 311, and therefore, a broadcast program which is the same as a broadcast program that the user watched in the PC mode is outputted in the TV mode from the display section 330.

After an output mode is set to the TV mode (S306), the display section 330 functions as a display apparatus of the TV 321. That is, in this case, a video image outputted from the TV-side tuner is displayed on the display section 330. Specifically, displayed on the display section 330 is that video image of a digital broadcast which is outputted from the digital tuner 326, that video image of an analog broadcast which is outputted from the analog tuner 327, or the like. In the TV mode, a user can select a channel to be received by the TV 321, by use of an input device such as a remote control.

Figure 30:
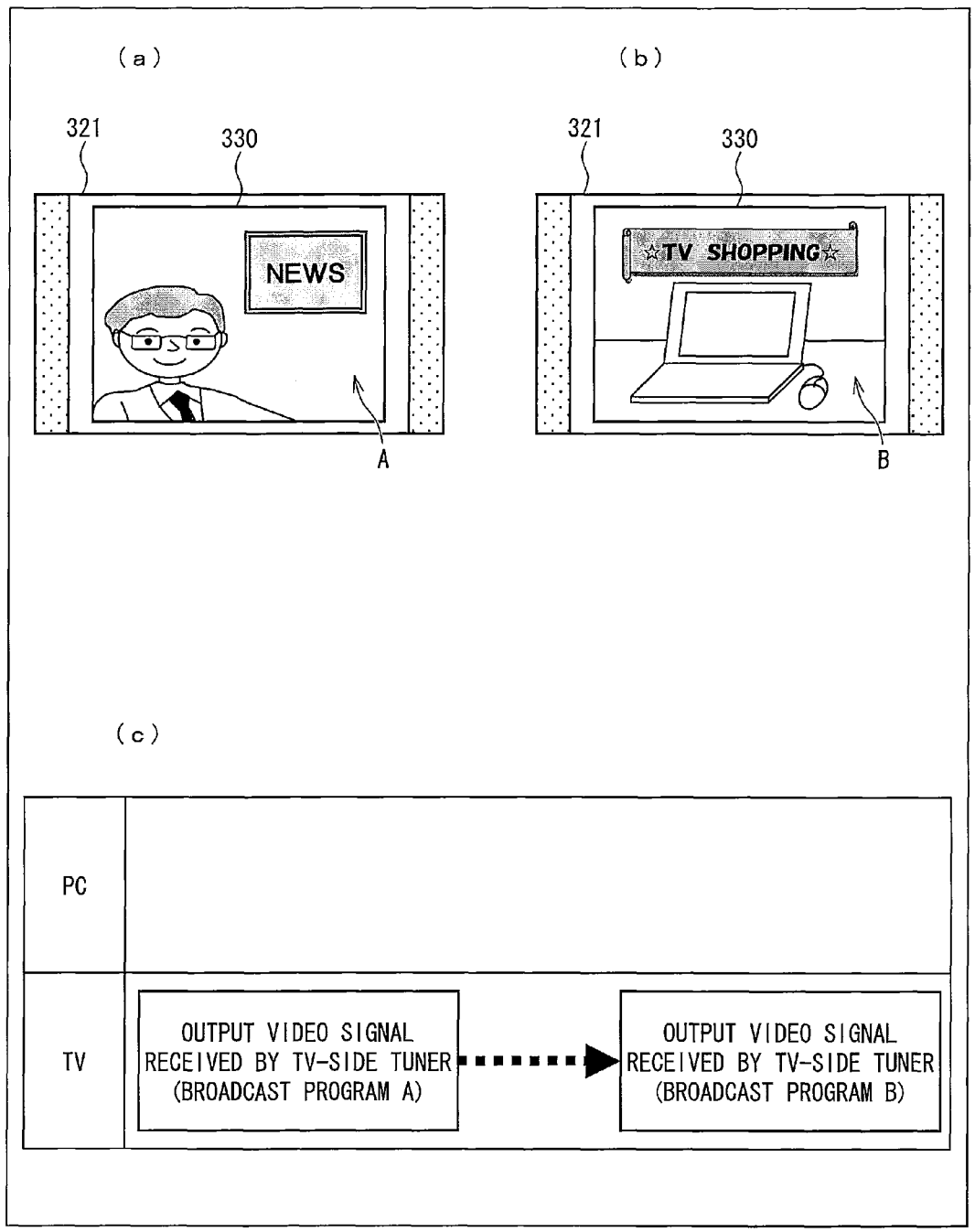
FIG. 30

With reference to FIG. 30, the following describes a transition between video images which are displayed on the display section 330 before and after channels are switched in the TV mode. (a) of FIG. 30 is a diagram illustrating one example of a video image which is displayed on the display section 330 before the channels are switched. (b) of FIG. 30 is a diagram illustrating one example of a video image which is displayed on the display section 330 after the channels are switched. (c) of FIG. 30 is a diagram showing those main operations of the PC 311 and the TV 321 which are carried out before and after the channels are switched.

As illustrated in (a) of FIG. 30, the broadcast program A is displayed on the display section 330 before the channels are switched. The broadcast program A is a broadcast program received by the TV-side tuner. As illustrated in (b) of FIG. 30, a broadcast program B is displayed on the display section 330 after the channels are switched. That is, FIG. 30 assumes that the channels are switched so that the broadcast program A is switched to the broadcast program B.

As shown in (c) of FIG. 30, the PC 311 does not output any video signal before and after the channel are switched. On the other hand, the TV 321 outputs a video signal of the broadcast program A before the channels are switched, and outputs a video signal of the broadcast program B after the channels are switched. As a result, the video images as illustrated in (a) and (b) of FIG. 30 are displayed on the display section 330. As described above, the PC 311 is not involved in the channel switching carried out in the TV mode, and the video images which are displayed on the display section 330 are switched by the process carried out in the TV 321.

As described above, in the TV mode, the video image outputted from the TV-side tuner is displayed on the display section 330, and no data is supplied from the PC 311 to the TV 321. Therefore, in the TV mode, the PC 311 may be in the operating state or in the standby state. The TV mode continues while the PC 311 is not started or is in the standby state.

In a case where the PC 311 operates in the TV mode, the PC-side relay coordination control section 314 determines whether or not the instruction to switch to the PC mode is issued (S307). While the PC 311 operates, the PC-side relay coordination control section 314 always monitors whether or not the instruction is issued. If the PC-side relay coordination control section 314 finds that the instruction is issued (Yes in S307), the PC-side relay coordination control section 314 carries out the TV-PC relay coordination process (S309).

The PC-side relay coordination control section 314 determines that the instruction to switch to the PC mode is issued in a case where, for example, the PC-side relay coordination control section 314 detects a predetermined input operation of an input device such as a mouse and a keyboard. The arrangement in which an output mode is set to the PC mode upon a user's input operation related to use of the PC 311 allows a user to smoothly switch to the PC mode. Further, for example, the PC-side relay coordination control section 314 may determine that the instruction to switch to the PC mode is issued, in a case where the PC-side relay coordination control section 314 determines that a predetermined input operation for switching to the PC mode has been performed (in a case where a mode switching button is pressed, for example).

A mode switching button for switching between the PC mode and the TV mode is provided onto a surface of a main body of the PC 311, to a remote control for operating the PC 311 and/or the TV 321, or to the like.

By carrying out the TV-PC relay coordination process, the TV mode is switched to the PC mode. As a result, data outputted from the PC 311 is displayed on the display section 330. That is, the TV-PC relay coordination process causes the video image display system 301 to enter the PC mode (S302). Further, in the video image display system 301, a broadcast program containing same content as a broadcast program watched in the TV mode is also displayed in the PC mode due to the TV-PC relay coordination process, although the details of this are described later. As a result, also after the switching to the PC mode, a user can continuously watch the broadcast program that the user watched in the TV mode.

On the other hand, in a case where the PC 311 is not started up in the TV mode, or is in the standby state in the TV mode after being started up, S307 is not carried out. In this case, if the PC 311 is started up or returns from the standby state (YES in S308), the PC-side relay coordination control section 314 also starts operating at a start-up of the PC 311. Then, the PC-side relay coordination control section 314 carries out the TV-PC relay coordination process, thereby switching to the PC mode (S309). That is, the start-up of the PC or the instruction to switch to the PC mode triggers the switching to the PC mode.

Figure 31:
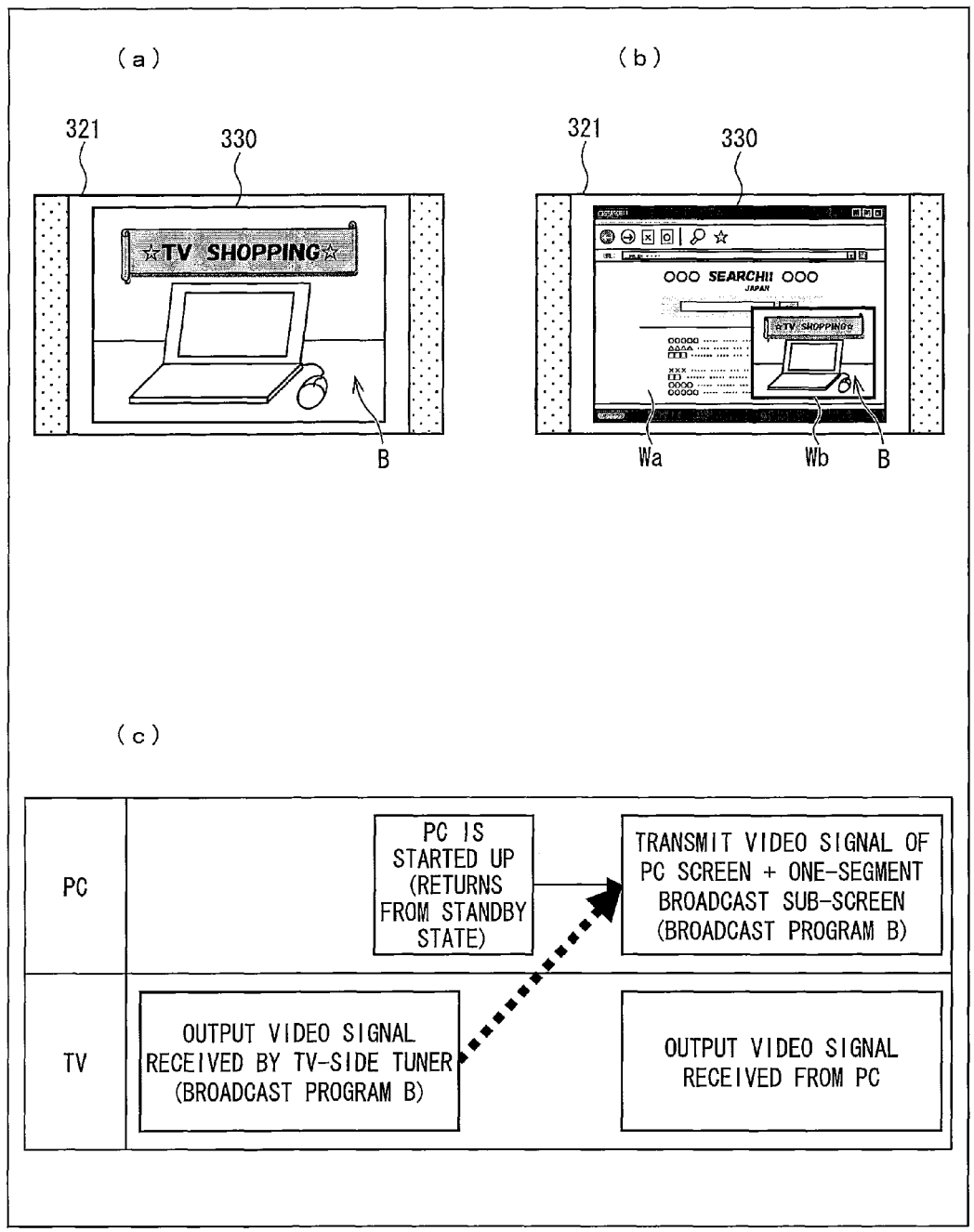
FIG. 31

With reference to FIG. 31, the following describes a transition between video images which are displayed on the display section 330 before and after the TV-PC relay coordination process. (a) of FIG. 31 is a diagram illustrating one example of a video image which is displayed on the display section 330 before the TV-PC relay coordination process is carried out. (b) of FIG. 31 is a diagram illustrating one example of a video image which is displayed on the display section 330 after the TV-PC relay coordination process is carried out. (c) of FIG. 31 is a diagram showing those main operations of the PC 311 and the TV 321 which are carried out before and after the TV-PC relay coordination process is carried out. The following describes an example of that transition between video images which is caused in a case where the TV-PC relay coordination process is carried due to a start-up of the PC 311.

As illustrated in (a) of FIG. 31, displayed on the display section 330 before the TV-PC relay coordination process is carried out is that video image of the broadcast program B which is outputted from the TV-side tuner. After the TV-PC relay coordination process is carried out, the windows Wa and Wb are displayed on the display section 30, as illustrated in (b) of FIG. 6. As illustrated in (b) of FIG. 31, a screen image of a web page is displayed in the window Wa, and the video image of the broadcast program B is displayed in the window Wb.

This is because, as shown in (c) of FIG. 31, the PC-side tuner is started up due to the start-up of the PC 311, and data generated by the PC 311 is supplied to the TV 321. Although (b) of FIG. 31 illustrates an example in which a browser is launched on the PC 311 and therefore the screen image of the web page is displayed in the window Wa, the data to be supplied from the PC 311 to the TV 321 is not particularly limited but may be any data.

That is, as shown in (c) of FIG. 31, while the video image illustrated in (a) of FIG. 31 is displayed on the display section 330, the PC 311 is in the non-operating state or the standby state. Therefore, the PC 311 does not output any video signal. In this case, the TV 321 outputs the video signal of the broadcast program B received by the TV-side tuner.

In a case where the PC 311 is started up or returns from the standby state, the PC-side tuner is started up. Accordingly, the broadcast program B (one-segment broadcast) received by the PC-side tuner is outputted to the TV 321. In a state illustrated in (b) of FIG. 31, the TV 321 outputs the video signal received from the PC 311. Accordingly, the broadcast program B (one-segment broadcast) received by the PC-side tuner is displayed in the window Wb.

Thus, in the video image display system 301, the TV-PC relay coordination process is automatically carried out when the PC 311 is started up or returns from the standby state, thereby switching from the TV mode to the PC mode. In the PC mode, displayed on the display section 330 is the same broadcast program as the broadcast program displayed in the TV mode. Therefore, the user switches the video image display system 301 to the PC mode, without performing any special operation except starting up the PC 311 or causing the PC 311 to return from the standby state. In addition, the user can continuously watch the same broadcast program as the broadcast program that he watched in the TV mode.

Figure 32:
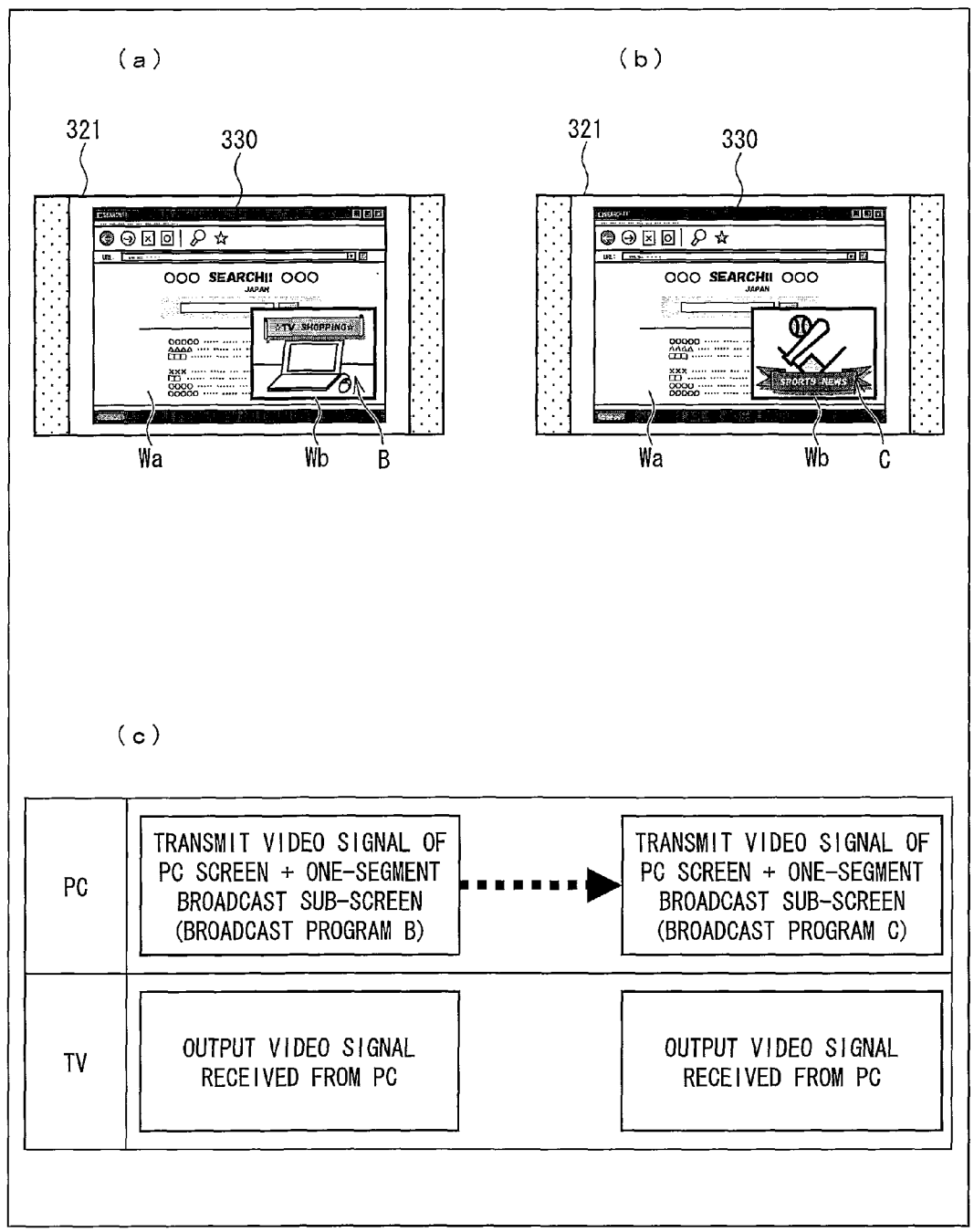
FIG. 32

After the TV-PC relay coordination process is completed, processing returns to S302. Accordingly, the video image display system 301 enters the PC mode again. With reference to FIG. 32, the following describes a transition between video images which are displayed on the display section 330 before and after channels are switched in the PC mode. (a) of FIG. 32 is a diagram illustrating one example of a video image which is displayed on the display section 330 before the channels are switched. (b) of FIG. 32 is a diagram illustrating one example of a video image which is displayed on the display section 330 after the channels are switched. (c) of FIG. 32 is a diagram showing those main operations of the PC 311 and the TV 321 which are carried out before and after the channel are switched.

As illustrated in (a) of FIG. 32, before the channel are switched, the windows Wa and Wb are displayed on the display section 330, and the broadcast program B is displayed in the window Wb. The broadcast program B is a broadcast program received by the PC-side tuner.

As illustrated in (b) of FIG. 32, after the channels are switched, the windows Wa and Wb are displayed on the display section 330, and a broadcast program C is displayed in the window Wb. That is, FIG. 32 assumes that the channels are switched so that the broadcast program B is switched to the broadcast program C. The channel switching in the PC mode is assumed to be carried out in a case where a user performs a predetermined input operation of an input device of the PC 311, such as a mouse and a keyboard.

In this case, as shown in (c) of FIG. 32, the TV 321 does not output any video signal received from the TV-side tuner but outputs a video signal received from the PC 311. On the other hand, before the channel switching, the PC 311 outputs a video signal of the PC screen and a video signal of the sub-screen showing the broadcast program B. After the channel switching, the PC 311 outputs the video signal of the PC screen and a video signal of the sub-screen showing the broadcast program C. As a result, the video images as illustrated in (a) and (b) of FIG. 32 are displayed on the display section 330. As described above, the TV-side tuner is not involved in the channel switching in the PC mode, and video images which are displayed on the display section 330 are switched by the process carried out in the PC 311.

[PC-TV Relay Coordination Process]

Figure 33:
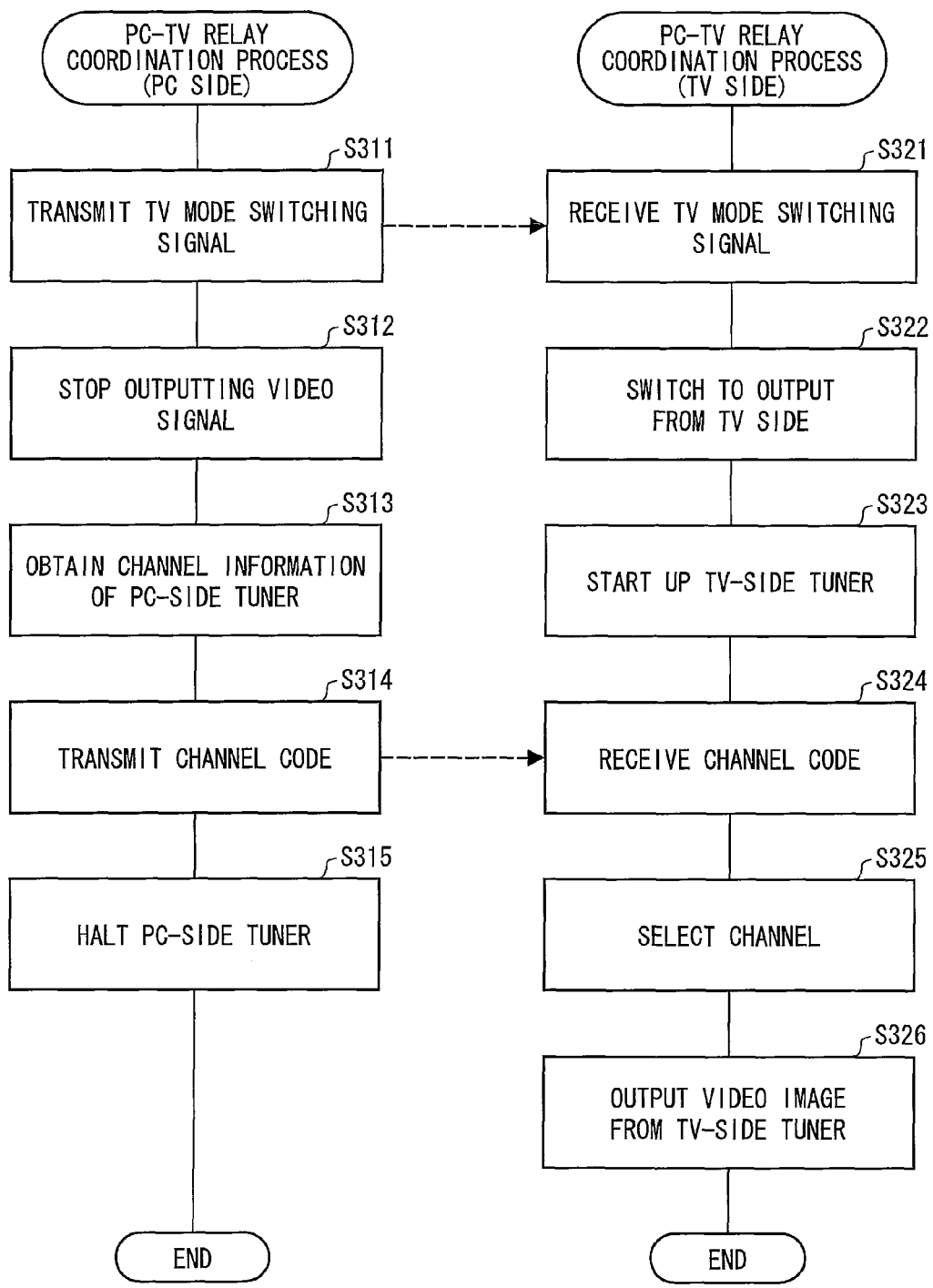
FIG. 33

With reference to FIG. 33, the following describes a flow of the PC-TV relay coordination process illustrated in the flowchart of FIG. 27. FIG. 33 is a flowchart showing one example of the PC-TV relay coordination process. The following first describes a processing flow on the PC 311 side. As described above, the PC-TV relay coordination process is carried out in a case where (i) the PC-side relay coordination control section 314 determines that the instruction to switch to the TV mode is issued, or (ii) the PC 311 stops operating or enters the standby state, i.e., the PC 311 enters a state of not working.

If the PC-side relay coordination control section 314 finds that the instruction is issued or that the PC 311 stops operating (or enters the standby state), the PC-side relay coordination control section 314 transmits, to the TV 321 via the PC-side communication I/F 315, a TV mode switching signal which is a control signal for switching an output of the TV 21 to that of the TV mode (S311). FIG. 33 assumes that a signal indicating that the PC 311 stops operating (or enters the standby state) is transmitted from the main control section 312 to the PC-side relay coordination control section 314, in a case where the PC 311 stops operating (or enters the standby state). Then, the PC-side relay coordination control section 314 halts outputting of a video signal from the display output I/F 318, i.e., halts outputting of the PC output data (S312).

Then, the PC-side relay coordination control section 314 obtains channel information of the PC-side tuner, i.e., of the one-segment broadcast tuner 316 (S313), and transmits a PC-side channel code to the TV 321 via the PC-side communication I/F 315 (S314). Then, the PC-side relay coordination control section 314 transmits a halt instruction to the one-segment broadcast tuner 316 so that the one-segment broadcast tuner 316 stops receiving a broadcast (S315).

The following describes the channel information and the PC-side channel code. The channel information is information indicative of a channel at which the PC-side tuner 316 is receiving a broadcast. The channel information is stored in the auxiliary memory section 313, and is updated every time channels are switched. As a result, the auxiliary memory section 313 always stores channel information indicative of a channel at which the PC-side tuner is receiving the broadcast. The channel information may be stored anywhere, provided that the PC-side relay coordination control section 314 can read out the channel information. For example, a memory section may be provided to the PC-side tuner so that the PC-side tuner may store and update the channel information.

The PC-side channel code is a code indicative of a channel at which the PC-side tuner is receiving a broadcast, and is information for causing the TV-side tuner to receive the channel at which the PC-side tuner is receiving the broadcast. A channel to receive a same broadcast program can differ between the PC-side tuner and the TV-side tuner. For example, a channel of the one-segment broadcasting to receive a broadcast program A can differ from a channel of the terrestrial digital broadcasting to receive the broadcast program A.

In such a case, the PC-side relay coordination control section 314 determines a TV-side channel corresponding to a channel at which the PC-side tuner is receiving a broadcast, on the basis of channel correspondence information which indicates correspondence relations between channels of the PC-side tuner and channels of the TV-side tuner. Then, the PC-side relay coordination control section 314 transmits the determined channel, as a PC-side channel code, to the TV 321 via the PC-side communication I/F 315.

A broadcast wave which is received by the PC-side tuner is different from a broadcast wave which is received by the TV-side tuner. Therefore, a broadcast program which is received by the PC-side tuner and a broadcast program which is received by the TV-side tuner do not have to be identical with each other, that is, can be broadcast programs containing the same content or containing mutually-related content. For example, since broadcast programs of the one-segment broadcasting and broadcast programs of the terrestrial digital broadcasting correspond to each other, a broadcast program to be received on the PC-side tuner can be one corresponding to a broadcast program having been received on the TV-side tuner, and vice versa. Further, for example, in a case where a user watches a live broadcast of a game of a sport which is broadcasted by a certain broadcast station, a broadcast program to be outputted after switching the output modes does not necessarily have to be a broadcast program being broadcasted by the same broadcast station, provided that the broadcast program to be outputted is a broadcast program of a live broadcast of the game.

The channel correspondence information can be referred to by the PC-side relay coordination control section 314. For example, the channel correspondence information may be stored in the auxiliary memory section 313 as table data. In a case where the channel correspondence information is contained in a broadcast wave received by the PC-side tuner, the PC-side relay coordination control section 314 may read out the channel correspondence information from the broadcast wave (i.e., from data outputted from the PC-side tuner).

Further, a PC-side channel code can be determined from the channel information, without use of the channel correspondence information. For example, in a case where the PC-side tuner and the TV-side tuner can receive a same broadcast program on a same channel, the PC-side relay coordination control section 314 can transmit the channel information to the TV 321, as it is, as a PC-side channel code, without using the channel correspondence information. Also in a case where the channel information is a broadcast program code indicating a broadcast program being received by the PC-side tuner or is a broadcast station code indicating a broadcast station of a broadcast program being received, the PC-side relay coordination control section 314 can transmit the channel information to the TV 321, as it is, as a PC-side channel code.

The following describes a processing flow on the TV side. The TV mode switching signal transmitted by the PC-side relay coordination control section 314 via the PC-side communication I/F 315 is transmitted to the TV-side relay coordination control section 324 via the TV-side communication I/F 322. After receiving the TV mode switching signal (S321), the TV-side relay coordination control section 324 instructs the output switching section 328 to switch an output to be supplied to the display section 330 from an output of the PC input I/F 323 to an output of the TV-side tuner (S322), and starts up the TV-side tuner (starts up the digital tuner 326 or the analog tuner 327) (S323).

In S314 which is a process on the PC side, a channel code (PC-side channel code) is transmitted to the TV 321 via the PC-side communication I/F 315. The transmitted PC-side channel code is received by the TV-side relay coordination control section 324 via the TV-side communication I/F 322. After receiving the PC-side channel code (S324), the TV-side relay coordination control section 324 determines a channel in accordance with the received PC-side channel code (S325). Specifically, the TV-side relay coordination control section 324 causes the TV-side tuner to receive a broadcast program indicated by the PC-side channel code.

As a result, the broadcast program received by the TV-side tuner is transmitted to the output switching section 328 as a video signal. As described above, in S322, the output switching section 328 switches the output to be supplied to the display section 330 from the output of the PC-side tuner to the output of the TV-side tuner. Accordingly, the video signal is transmitted through the output switching section 328, and is subjected to predetermined image processing in the image processing control section 329. Finally, the video signal is outputted to the display section 330 (S326).

The instruction to switch the outputs can be issued to the output switching section 328 anytime before S326 and after S321. According to the flowchart of FIG. 33, no video image is displayed on the display section 330 during a time period before S326 in which a video image from the TV-side tuner is displayed and after S322 in which the output to be supplied to the display section 330 is switched to the output from the TV 321. In view of this, for example, the PC-side relay coordination control section 314 carries out S312 in which outputting of a video signal is halted, after S315 is carried out in which the PC-side tuner is halted. Accordingly, the TV-side control section 324 issues, to the output switching section 328, the instruction to switch the outputs, immediately before a video image from the TV-side tuner is outputted in S326. This makes it possible to reduce or eliminate a time period in which no video image is displayed on the display section 330.

In the flowchart of FIG. 33, the step of transmitting the TV mode switching signal (S311) can be omitted. This is because, if the TV-side relay coordination control section 324 confirms the reception of the PC-side channel code, the TV-side relay coordination control section 324 can determine that it is necessary to switch to the TV mode.

That is, in a case where the PC-side relay coordination control section 314 carries out the PC-TV relay coordination process, the PC-side relay coordination control section 314 first obtains the channel information of the PC-side tuner (S313), and then transmits the PC-side channel code (broadcast program switching information) to the TV 321 (S314). Then, after receiving the PC-side channel code (S324), the TV-side relay coordination control section 324 starts up the TV-side tuner (S322), determines a channel (S325), sets, to the output from the TV 321, the output to be supplied to the display section 330 (S322), and causes the display section 330 to display the video image from the TV-side tuner (S326). According to the arrangement, even if the step of transmitting the TV mode switching signal is carried out, the TV-side relay coordination control section 324 can switch the PC mode to the TV mode.

[TV-PC Relay Coordination Process]

Figure 34:
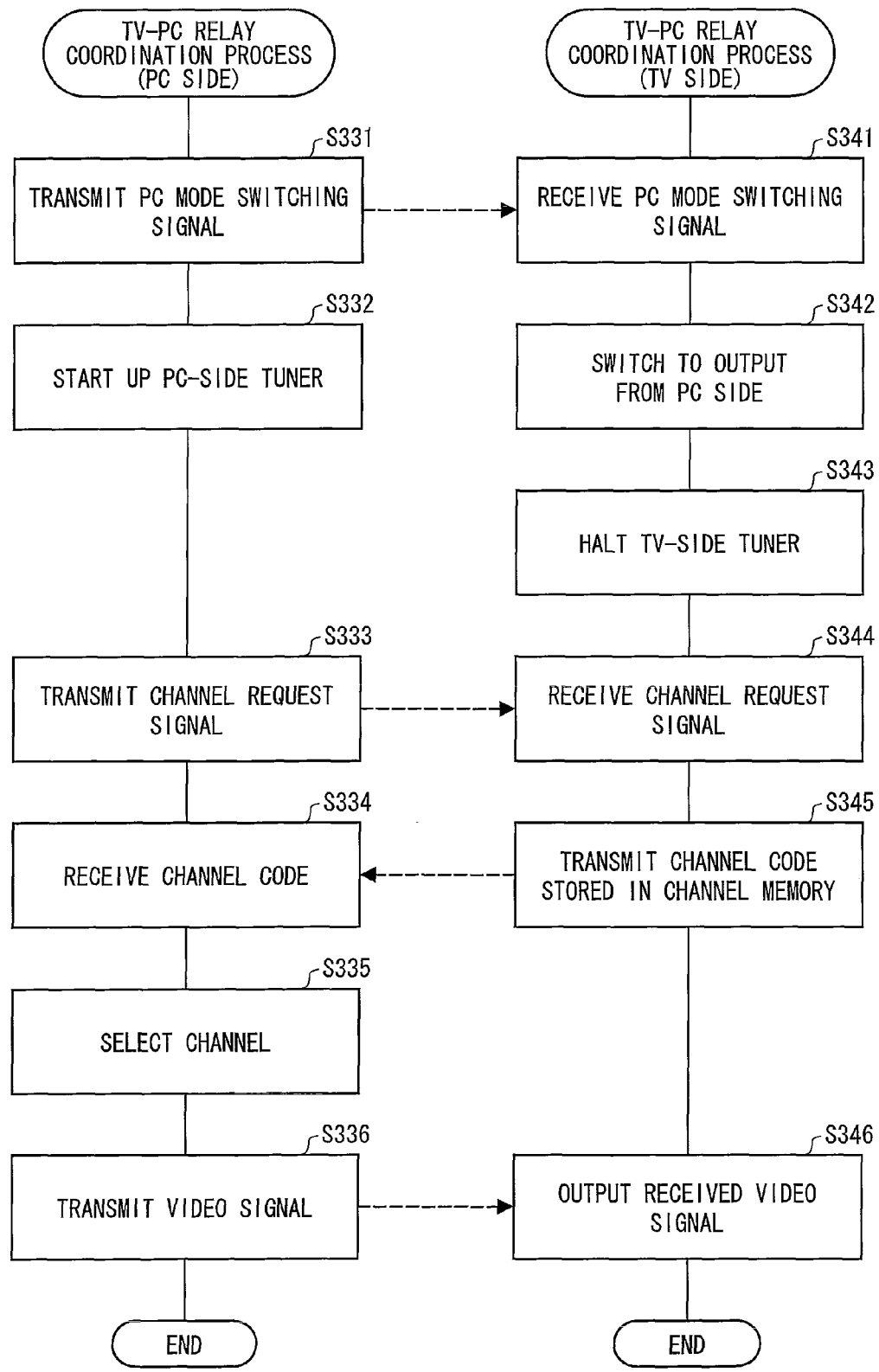
FIG. 34

With reference to FIG. 34, the following describes a flow of the TV-PC relay coordination process illustrated in the flowchart of FIG. 27. FIG. 34 is a flowchart illustrating one example of the TV-PC relay coordination process. The following first describes a processing flow on the PC side. As described above, the TV-PC relay coordination process is carried out in a case where (i) the PC-side relay coordination control section 314 determines that the instruction to switch to the PC mode is issued, or (ii) the PC 311 is started up or returns from the standby state.

In a case where (i) the PC-side relay coordination control section 314 determines that the instruction is issued, or (ii) the PC 311 is started or returns from the standby state, the PC-side relay coordination control section 314 transmits a PC mode switching signal to the TV 321 via the PC-side communication I/F 315 (S331). Further, the PC-side relay coordination control section 314 starts up the PC-side tuner, i.e., the one-segment broadcast tuner 316 (S332).

Then, the PC-side relay coordination control section 314 transmits a channel request signal to the TV 321 via the PC-side communication I/F 315 (S333). The channel request signal is a signal for requesting that information which channel is being selected to watch a broadcast program on the TV 321 be transmitted to the PC 311. After receiving the channel request signal, in response, the TV 321 transmits, via the TV-side communication I/F 322 and the PC-side communication I/F 315, a TV-side channel code (currently-tuned broadcast program information) indicating the channel of the broadcast program being watched on the TV 321.

After receiving the channel code (TV-side channel code) (S334), the PC-side relay coordination control section 314 determines a channel in accordance with the received TV-side channel code (S335). Specifically, the PC-side relay coordination control section 314 causes the PC-side tuner to receive the broadcast program indicated by the TV-side channel code. It follows that the broadcast program received by the PC-side tuner is transmitted to the image output control section 317 as a video signal so as to be subjected to predetermined processing, and then, the video signal is transmitted to the TV 321 via the display output I/F 318 (S336).

The following describes a processing flow on the TV side. The PC mode switching signal, transmitted from the PC-side relay coordination control section 314 to the TV 321 via the PC-side communication I/F 315, is received by the TV-side relay coordination control section 324 via the TV-side communication I/F 322. After receiving the PC mode switching signal (S341), the TV-side relay coordination control section 324 instructs the output switching section 328 to switch the output to be supplied to the display section 330 from the output of the TV-side tuner to the output of the PC input I/F 323 (S342). Then, the TV-side relay coordination control section 324 halts the operation of the TV-side tuner (S343).

As described above, the channel request signal is transmitted to the TV 321 via the PC-side communication I/F 315 in S333, which is a process on the PC side. Accordingly, the channel request signal is received by the TV-side relay coordination control section 324 via the TV-side communication I/F 322. After receiving the channel request signal (S344), the TV-side relay coordination control section 324 reads out a TV-side channel code from the channel memory of the memory section 325, and transmits the TV-side channel code to the PC 311 via the TV-side communication I/F 322 (S345).

The TV-side channel code is a code indicating a channel at which the TV-side tuner is receiving a broadcast, and is stored in the channel memory of the memory section 325. As described above, a channel to receive a same broadcast program can differ between the PC-side tuner and the TV-side tuner.

In such a case, the PC-side relay coordination control section 314 determines a PC-side channel corresponding to a received TV-side channel code, on the basis of the channel correspondence information which indicates correspondence relations between channels of the PC-side tuner and channels of the TV-side tuner.

In a case where the PC-side tuner and the TV-side tuner can receive the same broadcast program on the same channel, or in a case where the TV-side channel code is (i) a broadcast program code indicating a broadcast program being received by the TV-side tuner or (ii) a broadcast station code indicating a broadcast station of a broadcast program being received, the PC-side relay coordination control section 314 can determine a channel to be received by the PC-side tuner, in accordance with the received TV-side channel code, without using the channel correspondence information.

As described above, then, a channel of the PC 311 is determined in accordance with the TV-side channel code transmitted in S345 (S335), and the video signal containing the broadcast program on the channel thus determined is transmitted to the TV 321 via the display output I/F 318 (S336). The video signal is transmitted to the output switching section 328 via the PC input I/F 323. As described above, in S42, the output switching section 328 switches the output to be supplied to the display section 330 from the output of the TV-side tuner to the output of the PC input I/F 323. Accordingly, the video signal is transmitted through the output switching section 328, and then subjected to the predetermined image processing in the image processing control section 329. Finally, the video signal is outputted to the display section 330 (S346).

Since the processing flow described above is merely one example, it can be suitably modified as needed. For example, the PC 311 may (i) transmit the channel request signal to the TV 321 first (S333), (ii) receive the TV-side channel code (S334), (iii) start up the PC-side tuner (S332), and (iv) determine a channel (S335) in this order. Then, the PC 311 transmits the PC mode switching signal to the TV 321 (S331). As a result, the PC-side tuner starts receiving a broadcast program before a switching to the PC mode is carried out on the TV 321. This makes it possible to reduce or eliminate a time period in which no video image is displayed on the display section 330.

[Reference Example]

The embodiment above shows an example in which the PC-TV relay coordination process and the TV-PC relay coordination process are carried out at the initiative of the PC-side relay coordination control section 314. Specifically, the embodiment above shows that the processes are carried out in such a manner that the PC-side relay coordination control section 314 transmits, to the TV 321, the TV mode switching signal or the PC mode switching signal, the channel request signal, etc. However, the PC-TV relay coordination process and TV-PC relay coordination process can be also carried out at the initiative of the TV-side relay coordination control section 324. The following describes an example in which the processes are carried out at the initiative of the TV-side relay coordination control section 324, with reference to FIGS. 35 and 36. As to the same processes and arrangements as those described in the aforementioned embodiment, the same reference signs are used, and explanations of the processes and arrangements are omitted.

A video image display system of the present reference example has the same arrangement as that of the aforementioned embodiment. Further, video image display processing of the video image display system of the present reference example is carried out in the same manner as the processing flow illustrated in the flowchart of FIG. 27. Therefore, the following deals with differences between the aforementioned embodiment and the present reference example, that is: the operations of the PC-side relay coordination control section 314 and the TV-side relay coordination control section 324, the PC-TV relay coordination process, and the TV-PC relay coordination process.

[PC-TV Relay Coordination Process]

Figure 35:
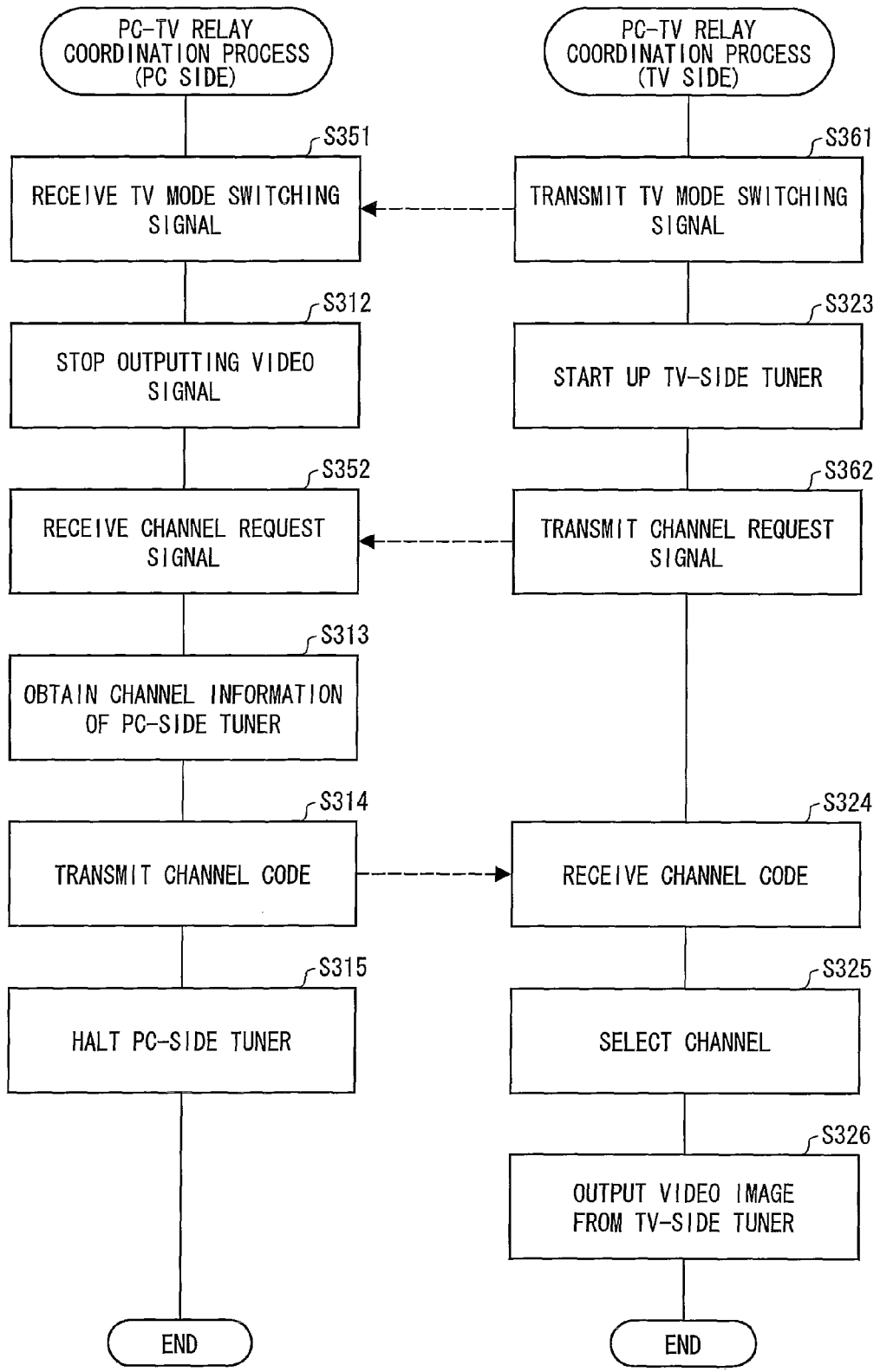
FIG. 35

FIG. 35 is a flowchart illustrating one example of the PC-TV relay coordination process of the present reference example. The following first describes a processing flow on the PC side. Unlike the aforementioned embodiment, the PC-TV relay coordination process of the present reference example is carried out in a case where a TV-side relay coordination control section 324 determines that an instruction to switch to the TV mode is issued, or that the PC 311 stops operating (or enters the standby state). The following first describes a processing flow which is carried out in a case where the TV-side relay coordination control section 324 determines that the instruction to switch to the TV mode is issued, and then, describes a processing flow which is carried out in a case where the PC 311 stops operating (or enters the standby state).

If the TV-side relay coordination control section 324 finds that the instruction to switch to the TV mode is issued, the TV-side relay coordination control section 324 transmits, to the PC 311 via the TV-side communication I/F 322, a TV mode switching signal for notifying switching to the TV mode. The PC-side relay coordination control section 314 receives the TV mode switching signal via the PC-side communication I/F 315 (S351). After receiving the TV mode switching signal, the PC-side relay coordination control section 314 instructs the display output I/F 318 to stop outputting a video signal (S312).

In S363, which is a process on the TV side, a channel request signal is transmitted via the TV-side communication I/F 322 (this is described later). The channel request signal is received by the PC-side relay coordination control section 314 via the PC-side communication I/F 315. After receiving the channel request signal (S352), the PC-side relay coordination control section 314 obtains channel information of the PC-side tuner from the auxiliary memory section 313 (S313), and transmits, to the TV 321 via the PC-side communication I/F 315, a PC-side channel code indicating a broadcast program being received by the PC-side tuner (S314). Then, the PC-side relay coordination control section 314 transmits a halt instruction to the PC-side tuner so that the PC-side tuner stops receiving a one-segment broadcast (S315).

The following describes a processing flow on the TV side. If the TV-side relay coordination control section 324 finds that the instruction to switch to the TV mode is issued, the TV-side relay coordination control section 324 transmits the TV mode switching signal via the TV-side communication I/F 322 (S361), and then starts up the TV-side tuner (S323). Further, the TV-side relay coordination control section 324 instructs the output switching section 328 to switch the output to be supplied to the display section 330 from the output of the PC input I/F 323 to the output of the TV-side tuner. Then, the TV-side relay coordination control section 324 transmits the channel request signal to the PC 311 via the TV-side communication I/F 322 (S362).

In S314, which is a process on the PC-side, the PC-side channel code is transmitted to the TV 321 via the PC-side communication I/F 315. The PC-side channel code is received by the TV-side relay coordination control section 324 via the TV-side communication I/F 322. After receiving the PC-side channel code (S324), the TV-side relay coordination control section 324 determines a channel in accordance with the received PC-side channel code (S325).

It follows that the broadcast program received by the TV-side tuner is transmitted to the output switching section 328 as a video signal. As described above, in S361, the output to be supplied from the output switching section 328 to the display section 330 is switched from the output of the PC input I/F 323 to the output of the TV-side tuner. Accordingly, the video signal is transmitted through the output switching section 328, and then, subjected to the predetermined image processing in the image processing control section 329. Finally, the video signal is outputted to the display section 330 (S326).

The following describes a processing flow which is carried out in a case where the PC 311 stops operating (or enters the standby state). In a case where the PC 311 stops operating or enters the standby state, the PC-side relay coordination control section 314 transmits, to the TV 321 via the PC-side communication I/F 315, a PC operation stop signal indicating that the PC 311 stops operating or enters the standby state. The PC 311 does not stop operating nor enters the standby state at the stage of transmission of the PC operation stop signal.

The PC operation stop signal thus transmitted is received by the TV-side relay coordination control section 324 via the TV-side communication I/F 322. After receiving the PC operation stop signal, the TV-side relay coordination control section 324 starts up the TV-side tuner, and transmits the channel request signal to the PC 311. After receiving the channel request signal, the PC-side relay coordination control section 314 retrieves the channel information of the PC-side tuner from the auxiliary memory section 313 so as to transmit the PC-side channel code to the TV 321.

After transmitting the PC-side channel code, the PC-side relay coordination control section 314 transmits, to the main control section 312, a relay coordination process completion signal indicating that the PC 311 has completed its processes of the PC-TV relay coordination process. Accordingly, the main control section 312 starts a process of stopping the operation of the PC 311 or a process of putting the PC 311 into the standby state. As a result, the PC 311 stops operating or enters the standby state.

On the other hand, After receiving the PC-side channel code, the TV-side relay coordination control section 324 determines a channel on the basis of the received PC-side channel code, and instructs the output switching section 328 to switch the output to be supplied to the display section 330 from the output of the PC-side tuner to the output of the TV-side tuner. As a result, a broadcast program received by the TV-side tuner is outputted to the display section 330.

[TV-PC Relay Coordination Process]

Figure 36:
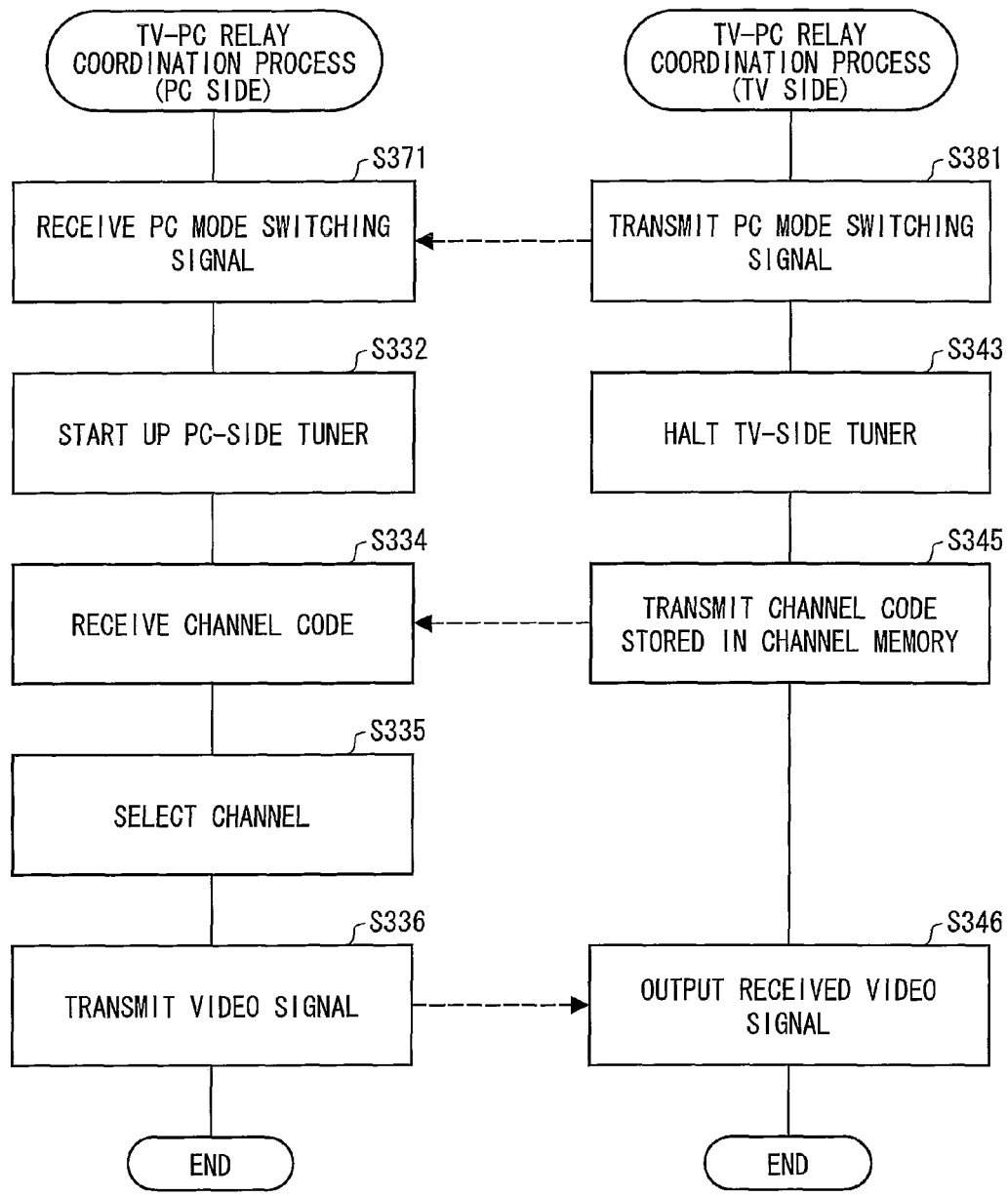
FIG. 36
Figure 37:
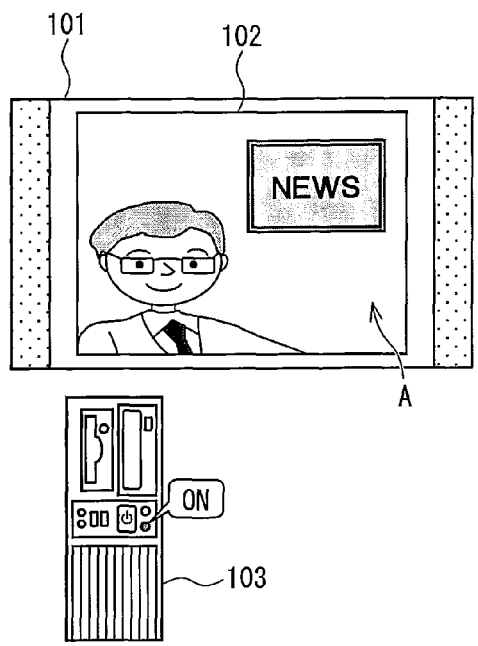
FIG. 37(a)
FIG. 37(b)
FIG. 37(c)
Figure 37:
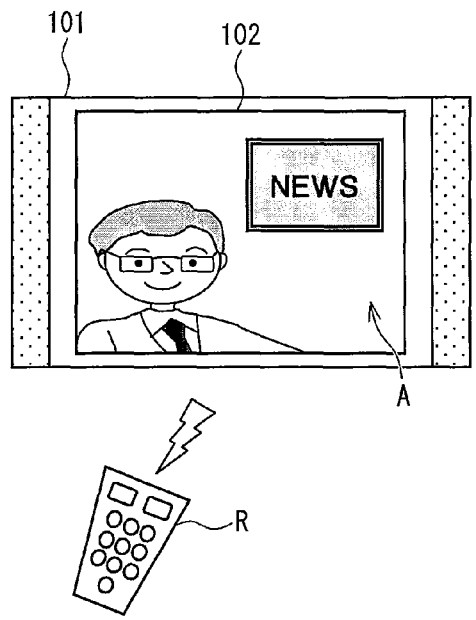
Figure 37:
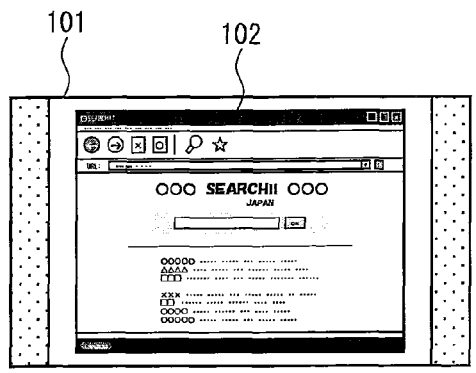

FIG. 36 is a flowchart illustrating one example of the TV-PC relay coordination process of the present reference example. The following first describes a processing flow on the PC side. Unlike the aforementioned embodiment, the TV-PC relay coordination process of the present reference example is carried out in a case where (i) the TV-side relay coordination control section 324 determines that the instruction to switch to the PC mode is issued, or (ii) the PC 311 is started or returns from the standby state. That is, in the video image display system of the present reference example, the TV-side relay coordination control section 324 determines whether or not to switch between the TV mode and the PC mode.

If the TV-side relay coordination control section 324 finds that the instruction to switch to the PC mode is issued, or that the PC 311 is started or returns from the standby state, the TV-side relay coordination control section 324 transmits, to the PC 311 via the TV-side communication I/F 322, a PC mode switching signal for notifying a switching to the PC mode. Then, the PC-side relay coordination control section 314 receives the TV mode switching signal via the PC-side communication I/F 315 (S371).

A method for determining that the PC 311 is started up or returns from the standby state is such that, for example, a PC start signal indicating that the PC 311 is started up or returns from the standby state is transmitted from the PC 311 to the TV 321 when the PC 311 is started up. In this case, the TV-side relay coordination control section 324 can determine, by receiving the PC start signal, that the PC 311 is started up or returns from the standby state. In addition, at a start-up of the PC 311, a video signal etc. outputted from the PC 311 are transmitted to the PC input I/F 323 of the TV 321 via the display output I/F 318. In view of this, the TV-side relay coordination control section 324 may determine, by receiving the video signal etc. via the PC input I/F 323, that the PC 311 is started or returns from the standby state.

After receiving the PC mode switching signal, the PC-side relay coordination control section 314 starts up the PC-side tuner (S332). Then, in S345 (to be described later), which is process on the TV side, a TV-side channel code is transmitted to the PC 311 via the TV-side communication I/F 322. The TV-side channel code is received by the PC-side relay coordination control section 314 via the PC-side communication I/F 315 (S334).

After receiving the TV-side channel code, the PC-side relay coordination control section 314 determines a channel in accordance with the received TV-side channel code (S335). The broadcast program received by the PC-side tuner is transmitted to the image output control section 317 as a video signal so as to be subjected to predetermined processing, and then, transmitted to the TV 321 via a display output I/F 318 (S336).

The following describes a processing flow on the TV side. If the TV-side relay coordination control section 324 finds that the instruction to switch to the PC mode is issued, or that the PC 311 is started up or returns from the standby state, the TV-side relay coordination control section 324 transmits, to the PC 311 via the TV-side communication I/F 322, a PC mode switching signal for notifying a switching to the PC mode (S381), and instructs the output switching section 328 to switch the output to be supplied to the display section 330 from the output of the TV-side tuner to the output of the PC input I/F 323. Further, the TV-side relay coordination control section 324 halts the operation of the TV-side tuner (S343).

Then, the TV-side relay coordination control section 324 reads out a TV-side channel code from the channel memory of the memory section 325, and transmits the TV-side channel code to the PC 311 via the TV-side communication I/F 322 (S345).

It follows that the video signal containing the broadcast program received by the PC-side tuner is transmitted to the output switching section 328 via the display output I/F 318 and the PC input I/F 323. As described above, in S381, the output switching section 328 switches the output to be supplied to the display section 330 from the output of the TV-side tuner to the output of the PC input I/F 323. Accordingly, the video signal is transmitted through the output switching section 328, and then, subjected to the predetermined image processing in the image processing control section 329. Finally, the video signal is outputted to the display section 330 (S346).

Thus, as is the case with the aforementioned embodiment, the video image display system of the present reference example is also (i) automatically switched to the PC mode when the PC 311 is started or returns from the standby state, and (ii) automatically switched to the TV mode when the PC 311 stops operating or enters the standby state. In addition, even though the TV mode is switched to the PC mode or the PC mode is switched to the TV mode, a broadcast program displayed on the display section 330 remains the same. Therefore, a user can smoothly switch between the TV mode and the PC mode, without performing a bothersome operation. Furthermore, even though an output mode is switched between the TV mode and the PC mode, the user can continuously watch a same broadcast program as a broadcast program that he watched before the switching, without being interrupted.

[Modification]

As described above, in the video image display system of the present invention, a user can continuously watch a same broadcast program as before switching between the output from the PC 311 and the output from the TV 321, without performing any operation. Assume that the broadcast program being watched by the user in the PC mode or in the TV mode is a captioned broadcast or the like. In this case, a caption mode and an audio mode which are specified before the switching of the outputs can differ from those specified after the switching.

For example, in a case where the user switches an output mode from the TV mode to the PC mode while watching, in the TV mode, a broadcast program in English and with Japanese captions, the switching can cause the PC 311 to output the same broadcast program but in Japanese and with English captions. In such a case, the user is required to change the caption mode and the audio mode after switching the outputs. This prevents the user from continuously watching the broadcast program.

In view of this, for example, it may be arranged such that the mode designating information for designating a caption mode, a sound mode, etc. in which the PC 311 or the TV 321 outputs a broadcast program is transmitted together with the channel code at a switching between the output from the PC 311 and the output from the TV 321. In this case, in accordance with the mode designating information, mode setting means for setting the caption mode, the sound mode, etc. at the PC 311 or the TV 321 sets the caption mode, the sound mode, etc. at the PC 311 or the TV 321. The arrangement allows a caption mode, an audio mode, etc. to remain the same before and after the switching.

Specifically, provided to the PC 311 is mode setting means for transmitting, to the TV 321, the mode switching information for designating at least one of a caption mode and an audio mode of a broadcast program being received by the PC 311. This makes it possible to match at least one of a caption mode and an audio mode of a broadcast program which is received by the TV 321 with the caption mode and/or the audio mode of the broadcast program being received by the PC 311. Similarly, provided to the TV 321 is means for transmitting, to the PC 311, the mode switching information for designating at least one of a caption mode and an audio mode of the broadcast program being received by the TV 321, and provided to the PC 311 is means for receiving the mode switching information so as to designate at least one of a caption mode and a sound mode. This makes it possible to match at one of a caption mode and an audio mode of a broadcast program which is received by the PC 311 with the caption mode and/or the audio mode of the broadcast program being received by the TV 321.

Further, in a case where scenario information is available which indicates which time period of a broadcast program covers what scenes, the output from the PC 311 and the output from the TV 321 can be switched therebetween by use of the scenario information. A method for providing the scenario information to the PC 311 and the TV 321 is not particularly limited. For example, the method may be such that the scenario information is provided, together with a broadcast program, in a form of a broadcast wave, or provided via another communication network such as the Internet.

For example, by referring to the scenario information, it is possible to find in which time period of a broadcast program a commercial is inserted. By use of this, the PC-side relay coordination control section 314 or the TV-side relay coordination control section 324 may switch between the PC mode and the TV mode so that the PC mode is selected during a time period in which a commercial is broadcasted and so that the TV mode is selected during a time period in which a broadcast program is broadcasted. This allows a user to (i) concentrate on watching the broadcast program in the TV mode, and (ii) watch the commercial while operating the PC 311.

Further, for example, by referring to the scenario information, it is possible to find which entertainer shows up in which time period of a broadcast program, or find which time period of a broadcast program covers what scenes. By use of this, the PC-side relay coordination control section 314 or the TV-side relay coordination control section 324 may switch between the PC mode and the TV mode so that the TV mode is selected during a time period in which an entertainer registered in advance by the user shows up in a broadcast program, or during a time period in which a scene which matches information indicative of the user's preference is broadcasted. This allows the user to concentrate on watching, in the TV mode, a scene which matches the user's preference.

Although the embodiment above deals with an example in which the PC 311 is adopted as the data supply apparatus, the data supply apparatus is not limited to the PC 311. For example, the data supply apparatus may be an intercom which outputs a video image of a visitor to the TV 321. In this case, a press of a button or the like of the video intercom is detected as a predetermined event. In response to this, the output from the TV 321 is switched to an output from the video intercom. This eliminates a possibility that a user will not notice his visitor while intently watching TV. In addition, the user does not undergo an interruption of a TV program.

Furthermore, alternatively, the data supply apparatus may be an image pickup apparatus such as a monitoring camera. In this case, for example, a change in a video image being captured by the monitoring camera is detected as a predetermined event. In response to this, the output from the TV 321 is switched to an output from the image pickup apparatus. This allows a user to concentrate on watching TV while no change is detected in the video image. Also, since the output modes of the TV 321 are switched in a case where a change is caused in the video image, the user does not miss the change in the video image.

SUMMARY

As described above, a data supply apparatus of the present invention comprises: the second tuner; data transmitting means for transmitting the second data containing data of a broadcast program received by the second tuner to the display apparatus; currently-tuned broadcast program information receiving means for receiving currently-tuned broadcast program information for indicating the broadcast program received via the first tuner and currently displayed by the display apparatus; switching signal transmitting means for transmitting a switching signal for causing, when the data supply apparatus starts, the display apparatus to display the second data transmitted by the data transmitting means instead of the first data; and relay coordination control means for causing the second tuner to receive data of a broadcast program containing same content as the broadcast program indicated on the basis of the currently-tuned broadcast program information.

As described above, a data supply method of the present invention is arranged such that the data supply apparatus includes the second tuner; the data supply method includes: (a) transmitting the second data containing data of a broadcast program received by the second tuner to the display apparatus; (b) receiving currently-tuned broadcast program information for indicating the broadcast program received via the first tuner and currently displayed by the display apparatus; (c) transmitting a switching signal for causing, when the data supply apparatus starts, the display apparatus to display the second data transmitted in the step (a) instead of the first data; and (d) performing relay coordination control, which causes the second tuner to receive data of a broadcast program containing same content as the broadcast program indicated on the basis of the currently-tuned broadcast program information.

Therefore, a user of the data output apparatus merely starts up the data output apparatus so as to switch a video image displayed on the display apparatus from a video image of the first data to a video image of the second data. In addition, at the switching, the user does not undergo an interruption of a broadcast program.

As described above, further, a data supply apparatus of the present invention includes: the second tuner; and broadcast program switching information transmitting means for transmitting broadcast program switching information to the display apparatus when the data supply apparatus stops operating, the broadcast program switching information (i) causing the first tuner to receive data of a broadcast program containing same content as the broadcast program received by the second tuner, and (ii) causing the display apparatus to display, as the first data, the data of the broadcast program thus received by the first tuner.

As described above, further, a data supply method of the present invention is arranged such that the data supply apparatus includes the second tuner; the data supply method comprises: transmitting broadcast program switching information to the display apparatus when the data supply apparatus stops operating, the broadcast program switching information (i) causing the first tuner to receive data of a broadcast program containing same content as the broadcast program received by the second tuner, and (ii) causing the display apparatus to display, as the first data, the data of the broadcast program thus received by the first tuner.

Accordingly, the user of the data output apparatus merely halts the operation of the data output apparatus so as to switch a video image displayed on the display apparatus from a video image of the second data to a video image of the first data. In addition, at the switching, the user does not undergo an interruption of a broadcast program.

Further, the data supply apparatus preferably includes mode setting means for (i) receiving mode designating information from the display apparatus, the mode designating information designating at least one of an audio mode and a caption mode of the broadcast program received via the first tuner and currently displayed by the display apparatus, and (ii) setting the at least one of the audio mode and the caption mode, on the basis of the mode designating information thus received, so that the broadcast program to be received by the second tuner is to be outputted in the at least one of the audio mode and the caption mode of the broadcast program received by the second tuner.

According to the arrangement, at least one of an audio mode and a caption mode of the broadcast program which is received by the second tuner is determined in accordance with the mode designating information for designating at least one of the audio mode and the caption mode of the broadcast program received via the first tuner by the display apparatus. Accordingly, at least one of the audio mode and the caption mode of the broadcast program which is received by the second tuner can be matched with the audio mode and/or the caption mode of the broadcast program received by the first tuner.

That is, according to the arrangement, even though the output of the display apparatus is switched, at a start-up of the data supply apparatus, from the data of the broadcast program received by the first tuner to the data of the broadcast program received by the second tuner, at least one of an audio mode and a caption mode remains the same before and after the output switching. As a result, the user is not required to designate the audio mode and the caption mode after starting up the data supply apparatus.

Further, the data supply apparatus preferably includes mode designating information transmitting means for transmitting mode designating information to the display apparatus, the mode designating information designating at least one of an audio mode and a caption mode of the broadcast program received by the second tuner.

According to the arrangement, the mode designating information for designating at least one of an audio mode and a caption mode of the broadcast program received by the second tuner is transmitted to the display apparatus. Accordingly, the display apparatus can match at least one of an audio mode and a caption mode of the broadcast program which is received via the first tuner and displayed by the display apparatus, with the audio mode and/or the caption mode of the broadcast program received by the second tuner. As a result, a user is not required to designate an audio mode and/or a caption mode again after halting the operation of the data supply apparatus.

Further, in order to attain the object, a data display system of the present invention includes the data supply apparatus and the display apparatus.

According to the arrangement, data to be displayed by the display apparatus is automatically switched from the first data to the second data in a case where the data output apparatus is started up. Further, according to the arrangement, data to be displayed by the display apparatus is automatically switched from the second data to the first data in a case where the operation of the data output apparatus is haled. In both cases, a broadcast program containing same content as before the switching is continuously displayed by the display apparatus.

The data supply apparatus may be realized by a computer. In this case, the present invention encompasses (i) a program for causing the computer to operate as the respective means of the data supply apparatus, and thereby realizing the data supply apparatus by the computer, and (ii) a computer-readable recording medium storing the program.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Finally, the following blocks: the PC 11, the TV 21, the PC 211, the TV 221, the PC 311, and the TV 321, particularly, the PC-side relay coordination control section 14, the TV-side relay coordination control section 24, the PC-side relay coordination control section 214, the TV-side relay coordination control section 224, the PC event detection section 219, the PC-side relay coordination control section 314, and the TV-side relay coordination control section 324 may be realized by way of hardware or software as executed by a CPU as follows:

The PC 11, the TV 21, the PC 211, the TV 221, the PC 311, and the TV 321 each include a CPU (central processing unit) and memory devices (memory media). The CPU (central processing unit) executes instructions in control programs realizing the functions. The memory devices include a ROM (read only memory) which contains the programs, a RAM (random access memory) to which the programs are loaded, and a memory containing the programs and various data. The objective of the present invention can also be achieved by mounting, to the PC 11, the TV 21, the PC 211, the TV 221, the PC 311, and the TV 321, a computer-readable storage medium containing control program code (executable program, intermediate code program, or source program) for the PC 11, the TV 21, the PC 211, the TV 221, the PC 311, and the TV 321, which control program code is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The PC 11, the TV 21, the PC 211, the TV 221, the PC 311, and the TV 321 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth®, 802.11 wireless, HDR, mobile telephone network, satellite line, or terrestrial digital network. The present invention can be also realized by the program code in the form of a computer data signal embedded in a carrier wave which is embodied by electronic transmission.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Industrial Applicability

The present invention is applicable not only to a system including a PC and a TV but also to a system including a data output apparatus for outputting data and a data supply apparatus for supplying data to the data output apparatus.

For example, the data output apparatus may be a TV receiver for receiving a TV broadcast, and the data supply apparatus may be a radio receiver for receiving a radio broadcast and causing a speaker of the TV receiver to output the radio broadcast thus received. In this case, the TV broadcast is not the same as the radio broadcast. Accordingly, in the relay coordination process, a relay coordination process is carried out so that a broadcast program containing same content as before the relay coordination process may be outputted after the relay coordination process. For example, in a case where a live broadcast of a baseball game is watched on TV, and the output of the TV receiver is switched to an output of the radio receiver, received is a live radio broadcast of the baseball game previously watched on TV.

The invention claimed is:

1. A data supply apparatus for supplying second video data to a data output apparatus for performing display operation in which a first video data or a second video data is displayed on a display section, the display operation being switchable between a first mode for outputting the first video data outputted from a first tuner for receiving a broadcast program and a second mode for outputting the second video data supplied from an external apparatus, the data supply apparatus comprising:

a second tuner for receiving a broadcast program;

a data transmitting section transmitting to the data output apparatus, as the second video data, video data containing (i) video data of the broadcast program received by the second tuner and (ii) video data generated by an application program executed on the data supply apparatus, the video data generated by the application program being displayed together with the video data of the broadcast program received by the second tuner; and a first relay coordination control section transmitting second-tuner-tuned broadcast program information and first video data switching information to the data output apparatus, the second-tuner-tuned broadcast program information causing the first tuner to receive a broadcast program identical with the broadcast program received by the second tuner, and the first video data switching information instructing switching to the first mode.

2. The data supply apparatus as set forth in claim 1, wherein the first relay coordination control section transmits the second-tuner-tuned broadcast program information and the first video data switching information to the data output apparatus, responsive to a determination by the first relay coordination control section that the data supply apparatus has received a user operation for switching the display operation from displaying the second video data on the display section to displaying the first video data on the display section.

3. The data supply apparatus as set forth in claim 2, wherein the user operation for switching data to be displayed on the display section from displaying the second video data on the display section to displaying the first video data on the display section is an operation for selecting, while the second video data is displayed on the display section, a video image displayed in accordance with the video data of the broadcast program received by the second tuner.

4. The data supply apparatus as set forth in claim 1, wherein the first relay coordination control section transmits, to the data output apparatus, mode switching information for designating at least one of an audio mode and a caption mode of the broadcast program received by the first tuner.

5. The data supply apparatus as set forth in claim 1, further comprising:

a broadcast program information receiving section that receives second video data switching notification information and first-tuner-tuned broadcast program information, the second video data switching notification information notifying the data supply apparatus that switching to the second mode has been performed, the first-tuner-tuned broadcast program information indicating a broadcast program received by the data output apparatus via the first tuner and currently displayed on the display section by the data output apparatus; and a second relay coordination control section that, responsive to the broadcast program information receiving section receiving the second video data switching notification information and the first-tuner-tuned broadcast program information, causes the second tuner to receive a broadcast program indicated by the first-tuner-tuned broadcast program information, the data transmitting section transmitting to the data output apparatus, as the second video data, video data containing (i) video data of the broadcast program thus received by the second tuner and (ii) the video data generated by the application program executed on the data supply apparatus, the video data generated by the application program being displayed together with the video data of the broadcast program received by the second tuner.

6. The data supply apparatus as set forth in claim 5, wherein, responsive to a determination by the second relay coordination control section that a user operation for switching the display operation from displaying the first video data to displaying the second video data is performed, the second relay coordination control section transmits, to the data output apparatus, tuned broadcast program request information for requesting that the data output apparatus transmits the first-tuner-tuned broadcast program information to the data supply apparatus.

7. The data supply apparatus as set forth in claim 5, wherein the second relay coordination control section receives mode switching information for designating at least one of an audio mode and a caption mode of the broadcast program received by the second tuner, and sets the at least one of the audio mode and the caption mode so that the broadcast program to be received by the second tuner is to be outputted in the at least one of the audio mode and the caption mode thus designated.

8. The data supply apparatus as set forth in claim 1, further comprising:

a broadcast program information receiving section (i) requesting, to the data output apparatus, transmission of first-tuner-tuned broadcast program information to the broadcast program information receiving section, the broadcast program information receiving section requesting the transmission when the data supply apparatus is turned on or returns from its standby state, and the first-tuner-tuned broadcast program information indicating a broadcast program received by the data output apparatus via the first tuner and currently displayed on the display section by the data output apparatus, and (ii) receiving the first-tuner-tuned broadcast program information; and a second relay coordination control section causing the second tuner to receive a broadcast program indicated by the first-tuner-tuned broadcast program information thus received by the broadcast program information receiving section, the data transmitting section transmitting to the data output apparatus, as the second video data, video data containing (i) video data of the broadcast program thus received by the second tuner and (ii) the video data generated by the application program executed on the data supply apparatus the video data generated by the application program being displayed together with the video data of the broadcast program received by the second tuner.

9. The data supply apparatus as set forth in claim 8, further comprising:
a switching information transmitting section transmitting, to the data output apparatus, second video data switching information when the data supply apparatus is turned on or returns from its standby state, the second video data switching information instructing switching to the second mode.

10. The data supply apparatus as set forth in claim 1, wherein the first relay coordination control section transmits the second-tuner-tuned broadcast program information and the first video data switching information to the data output apparatus when the data supply apparatus stops operating.

11. A data supply apparatus for supplying second video data to a data output apparatus for performing display operation in which a first video data or a second video data is displayed on a display section, the display operation being switchable between a first mode for outputting the first video data outputted from a first tuner for receiving a broadcast program and a second mode for outputting the second video data supplied from an external apparatus, the data supply apparatus comprising:
a second tuner for receiving a broadcast program;
an event detection section detecting an event occurring in an application program being executed on the data supply apparatus;
a video data generating section generating video data related to the application program;
a switching information transmitting section that, responsive to the event detection section detecting the event, transmits second video data switching information to the data output apparatus, the second video data switching information instructing switching to the second mode;
a broadcast program information receiving section receiving first-tuner-tuned broadcast program information indicative of a broadcast program received by the data output apparatus via the first tuner and currently displayed on the display section; and
a second relay coordination control section causing the second tuner to receive a broadcast program indicated by the first-tuner-tuned broadcast program information,
the data transmitting section transmitting to the data output apparatus, as the second video data, video data containing (i) video data of the broadcast program thus received by the second tuner and (ii) the video data generated by the video data generating section, the video data generated by the video data generating section being displayed together with the video data of the broadcast program thus received by the second tuner.

12. The data supply apparatus as set forth in claim 11, wherein:
the application program is an e-mail software program; the event is reception of an e-mail;
the event detection section detects the reception of the e-mail;
the video data generating section generates video data used for displaying, as an image, the e-mail received by the e-mail software program.

13. A data output system comprising:
a data output apparatus for performing display operation in which a first video data or a second video data is displayed on a display section, the display operation being switchable between a first mode for outputting the first video data outputted from a first tuner for receiving a broadcast program and a second mode for outputting the second video data supplied from an external apparatus; and
a data supply apparatus for supplying the second video data to the data output apparatus, the data supply apparatus comprising:
a second tuner for receiving a broadcast program;
a data transmitting section transmitting to the data output apparatus, as the second video data, video data containing (i) video data of the broadcast program received by the second tuner and (ii) video data generated by an application program executed on the data supply apparatus, the video data generated by the application program being displayed together with the video data of the broadcast program received by the second tuner; and
a first relay coordination control section transmitting second-tuner-tuned broadcast program information and first video data switching information to the data output apparatus, the second-tuner-tuned broadcast program information causing the first tuner to receive a broadcast program identical with the broadcast program received by the second tuner, and the first video data switching information instructing switching to the first mode,
the data output apparatus comprising:
the first tuner;
the display section;
a broadcast program receiving section receiving, as the second video data, video data containing (i) video data of a broadcast program received by the data supply apparatus via the second tuner and (ii) video data generated by an application program executed on the data supply apparatus, the video data generated by the application program being displayed together with the video data of the broadcast program received by the second tuner;
a broadcast program information receiving section receiving second-tuner-tuned broadcast program information and first video data switching information, the second-tuner-tuned broadcast program information indicating the broadcast program contained in the second video data thus received by the broadcast program receiving section, and the first video data switching information instructing switching to the first mode; and
an output control section causing the display section to display, instead of the second video data received by the broadcast program receiving section, the first video data obtained by causing the first tuner to receive a broadcast program indicated by the second-tuner-tuned broadcast program information, the second-tuner-tuned broadcast program information being received by the broadcast program information receiving section.

14. A data supply method of a data supply apparatus, the data supply apparatus for supplying second video data to a data output apparatus for performing display operation in which a first video data or a second video data is displayed on a display section, the display operation being switchable between a first mode for outputting the first video data outputted from a first tuner for receiving a broadcast program and a second mode for outputting the second video data supplied from an external apparatus, wherein the data supply apparatus comprises a second tuner for receiving a broadcast program, the data supply method comprising:

transmitting to the data output apparatus, as the second video data, video data containing (i) video data of the broadcast program received by the second tuner and (ii) video data generated by an application program executed on the data supply apparatus, the video data generated by the application program being displayed together with the video data of the broadcast program received by the second tuner; and performing relay coordination control, by transmitting second-tuner-tuned broadcast program information and first video data switching information to the data output apparatus, the second-tuner-tuned broadcast program information causing the first tuner to receive a broadcast program identical with the broadcast program received by the second tuner, and the first video data switching information instructing switching to the first mode.

15. A non-transitory computer readable medium storing a program for operating a data supply apparatus as set forth in claim 1, the program when executed by a processor causing the processor to function as the first relay coordination control section.

\* \* \* \* \*